US008078474B2

(12) United States Patent
Vos et al.

(10) Patent No.: US 8,078,474 B2
(45) Date of Patent: Dec. 13, 2011

(54) SYSTEMS, METHODS, AND APPARATUS FOR HIGHBAND TIME WARPING

(75) Inventors: Koen Bernard Vos, San Diego, CA (US); Ananthapadmanabhan Aasanipalai Kandhadai, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1182 days.

(21) Appl. No.: 11/397,370

(22) Filed: Apr. 3, 2006

(65) Prior Publication Data

US 2006/0282263 A1 Dec. 14, 2006

Related U.S. Application Data

(60) Provisional application No. 60/667,901, filed on Apr. 1, 2005, provisional application No. 60/673,965, filed on Apr. 22, 2005.

(51) Int. Cl.
*G01L 19/00* (2006.01)
*G01L 21/04* (2006.01)

(52) U.S. Cl. ......................... 704/500; 704/501; 704/502

(58) Field of Classification Search .................. 704/219, 704/500–503, 223, 241
See application file for complete search history.

(56) References Cited

U.S. PATENT DOCUMENTS 3,158,693 A 11/1964 Flanagan et al.
3,855,414 A 12/1974 Alleva et al.
3,855,416 A 12/1974 Fuller
4,616,659 A 10/1986 Prezas et al.
4,630,305 A 12/1986 Borth et al.
4,696,041 A 9/1987 Sakata
4,747,143 A 5/1988 Kroeger et al.
4,805,193 A 2/1989 McLaughlin et al.
4,852,179 A 7/1989 Fette
4,862,168 A 8/1989 Beard
5,077,798 A 12/1991 Ichikawa et al.
5,086,475 A 2/1992 Kutaragi et al.
5,119,424 A 6/1992 Asakawa et al.
5,285,520 A 2/1994 Matsumoto et al.
(Continued)

FOREIGN PATENT DOCUMENTS

CA 2429832 6/2002
(Continued)

OTHER PUBLICATIONS

Kleijn, W. Bastiaan, et al., The RCELP Speech-Coding Algorithm, European Transactions on Telecommunications and Related Technologies, Sep.-Oct. 1994, pp. 39-48, vol. 5, No. 5, Milano, IT, XP 000470678.

(Continued)

*Primary Examiner* — James S Wozniak
*Assistant Examiner* — Jialong He
(74) *Attorney, Agent, or Firm* — Heejong Yoo

(57) ABSTRACT

In one embodiment, a method of signal processing including includes encoding a low-frequency portion of a speech signal into at least an encoded narrowband excitation signal and a plurality of narrowband filter parameters; and generating a highband excitation signal based on a narrowband excitation signal. The encoded narrowband excitation signal includes a time warping, and the method includes applying a time shift to a high-frequency portion of the speech signal based on the information related to the time warping. The method also includes encoding the time-shifted high-frequency portion of the speech signal into at least one (A) a plurality of highband filter parameters and (B) a plurality of high band gain factors.

26 Claims, 34 Drawing Sheets

U.S. PATENT DOCUMENTS

| | | | | |
|---|---|---|---|---|
| 5,455,888 | A | 10/1995 | Iyengar et al. | |
| 5,581,652 | A | 12/1996 | Abe et al. | |
| 5,684,920 | A | 11/1997 | Iwakami et al. | |
| 5,689,615 | A | 11/1997 | Benyassine et al. | |
| 5,694,426 | A | 12/1997 | McCree et al. | |
| 5,699,477 | A | 12/1997 | McCree | |
| 5,699,485 | A | 12/1997 | Shoham | |
| 5,704,003 | A | 12/1997 | Kleijn et al. | |
| 5,706,395 | A | 1/1998 | Arslan et al. | |
| 5,727,085 | A | 3/1998 | Toyama et al. | |
| 5,737,716 | A | 4/1998 | Bergstrom et al. | |
| 5,757,938 | A | 5/1998 | Akagiri et al. | |
| 5,774,842 | A | 6/1998 | Nishio et al. | |
| 5,797,118 | A | 8/1998 | Saito | |
| 5,890,126 | A | 3/1999 | Lindemann | |
| 5,966,689 | A | 10/1999 | McCree | |
| 5,978,759 | A | 11/1999 | Tsushima et al. | |
| 6,009,395 | A | 12/1999 | Lai et al. | |
| 6,014,619 | A | 1/2000 | Wuppermann et al. | |
| 6,029,125 | A | 2/2000 | Hagen et al. | |
| 6,041,297 | A | 3/2000 | Goldberg | |
| 6,097,824 | A | 8/2000 | Lindemann et al. | |
| 6,134,520 | A | 10/2000 | Ravishankar | |
| 6,144,936 | A | 11/2000 | Jarvinen et al. | |
| 6,223,151 | B1 | 4/2001 | Kleijn et al. | |
| 6,263,307 | B1 | 7/2001 | Arslan | |
| 6,301,556 | B1 | 10/2001 | Hagen et al. | |
| 6,330,534 | B1 | 12/2001 | Yasunaga et al. | |
| 6,330,535 | B1 | 12/2001 | Yasunaga et al. | |
| 6,353,808 | B1 | 3/2002 | Matsumoto et al. | |
| 6,385,261 | B1 | 5/2002 | Tsuji et al. | |
| 6,449,590 | B1 | 9/2002 | Gao | |
| 6,523,003 | B1 | 2/2003 | Chandran et al. | |
| 6,564,187 | B1 | 5/2003 | Kikumoto et al. | |
| 6,675,144 | B1 | 1/2004 | Tucker et al. | |
| 6,678,654 | B2 | 1/2004 | Zinser, Jr. et al. | |
| 6,680,972 | B1 | 1/2004 | Liljeryd et al. | |
| 6,681,204 | B2 | 1/2004 | Matsumoto et al. | |
| 6,704,702 | B2 | 3/2004 | Oshiriki et al. | |
| 6,704,711 | B2 | 3/2004 | Gustafsson et al. | |
| 6,715,125 | B1 | 3/2004 | Juang | |
| 6,732,070 | B1 | 5/2004 | Rotola-Pukkila et al. | |
| 6,735,567 | B2 | 5/2004 | Gao et al. | |
| 6,751,587 | B2 | 6/2004 | Thyssen et al. | |
| 6,757,395 | B1 | 6/2004 | Fang et al. | |
| 6,757,654 | B1 | 6/2004 | Westerlund et al. | |
| 6,772,114 | B1 | 8/2004 | Sluijter et al. | |
| 6,826,526 | B1 | 11/2004 | Norimatsu et al. | |
| 6,879,955 | B2 * | 4/2005 | Rao | 704/241 |
| 6,889,185 | B1 | 5/2005 | McCree | |
| 6,895,375 | B2 | 5/2005 | Malah et al. | |
| 6,925,116 | B2 | 8/2005 | Liljeryd et al. | |
| 6,988,066 | B2 | 1/2006 | Malah | |
| 7,003,451 | B2 | 2/2006 | Kjorling et al. | |
| 7,016,831 | B2 | 3/2006 | Suzuki et al. | |
| 7,024,354 | B2 | 4/2006 | Ozawa | |
| 7,031,912 | B2 | 4/2006 | Yajima et al. | |
| 7,050,972 | B2 | 5/2006 | Henn et al. | |
| 7,069,212 | B2 | 6/2006 | Tanaka et al. | |
| 7,088,779 | B2 | 8/2006 | Aarts | |
| 7,136,810 | B2 | 11/2006 | Paksoy et al. | |
| 7,149,683 | B2 | 12/2006 | Jelinek | |
| 7,155,384 | B2 | 12/2006 | Banba | |
| 7,167,828 | B2 | 1/2007 | Ehara | |
| 7,174,135 | B2 | 2/2007 | Sluijter et al. | |
| 7,191,123 | B1 | 3/2007 | Bessette et al. | |
| 7,191,125 | B2 | 3/2007 | Huang | |
| 7,222,069 | B2 | 5/2007 | Suzuki et al. | |
| 7,228,272 | B2 | 6/2007 | Rao | |
| 7,242,763 | B2 | 7/2007 | Etter | |
| 7,330,814 | B2 | 2/2008 | McCree | |
| 7,346,499 | B2 | 3/2008 | Chennoukh et al. | |
| 7,359,854 | B2 | 4/2008 | Nilsson et al. | |
| 7,376,554 | B2 | 5/2008 | Ojala et al. | |
| 7,386,444 | B2 | 6/2008 | Stachurski | |
| 7,392,179 | B2 | 6/2008 | Yasunaga et al. | |
| 7,428,490 | B2 | 9/2008 | Xu et al. | |
| 7,596,492 | B2 | 9/2009 | Sung et al. | |
| 7,613,603 | B2 | 11/2009 | Yamashita | |
| 2002/0007280 | A1 * | 1/2002 | McCree | 704/500 |
| 2002/0072899 | A1 * | 6/2002 | Paksoy et al. | 704/219 |
| 2003/0036905 | A1 | 2/2003 | Toguri et al. | |
| 2004/0015346 | A1 | 1/2004 | Yasunaga et al. | |
| 2004/0019492 | A1 * | 1/2004 | Tucker et al. | 704/500 |
| 2004/0098255 | A1 | 5/2004 | Kovesi et al. | |
| 2004/0128126 | A1 | 7/2004 | Nam et al. | |
| 2004/0153313 | A1 | 8/2004 | Aubauer et al. | |
| 2004/0181398 | A1 | 9/2004 | Sung et al. | |
| 2004/0204935 | A1 | 10/2004 | Anandakumar et al. | |
| 2005/0004793 | A1 * | 1/2005 | Ojala et al. | 704/219 |
| 2005/0071153 | A1 | 3/2005 | Tammi et al. | |
| 2005/0143989 | A1 | 6/2005 | Jelinek | |
| 2005/0251387 | A1 | 11/2005 | Jelinek et al. | |
| 2006/0206334 | A1 | 9/2006 | Kapoor et al. | |
| 2006/0271356 | A1 | 11/2006 | Vos et al. | |
| 2006/0277038 | A1 | 12/2006 | Vos et al. | |
| 2006/0277039 | A1 | 12/2006 | Vos et al. | |
| 2006/0277042 | A1 | 12/2006 | Vos et al. | |
| 2006/0282262 | A1 | 12/2006 | Vos et al. | |
| 2007/0088541 | A1 | 4/2007 | Vos et al. | |
| 2007/0088542 | A1 | 4/2007 | Vos et al. | |
| 2007/0088558 | A1 | 4/2007 | Vos et al. | |
| 2008/0126086 | A1 | 5/2008 | Vos et al. | |

FOREIGN PATENT DOCUMENTS

| | | | |
|---|---|---|---|
| EP | 0732687 | | 9/1996 |
| EP | 1008984 | | 6/2000 |
| EP | 1089258 | | 4/2001 |
| EP | 1126620 | | 8/2001 |
| EP | 1164579 | | 12/2001 |
| EP | 1300833 | | 4/2003 |
| EP | 1498873 | | 1/2005 |
| JP | O8180582 | | 7/1996 |
| JP | 2000206989 | A | 7/2000 |
| JP | 2001237708 | A | 8/2001 |
| JP | 2002268698 | | 9/2002 |
| JP | 2003243990 | A | 8/2003 |
| JP | 2003526123 | T | 9/2003 |
| KR | 1020010023579 | | 3/2001 |
| RU | 2073913 | | 2/1997 |
| RU | 2131169 | | 5/1999 |
| RU | 2233010 | | 7/2004 |
| TW | 525147 | | 3/2003 |
| TW | 526468 | | 4/2003 |
| WO | 9848541 | | 10/1998 |
| WO | 0156021 | | 8/2001 |
| WO | WO02052738 | | 7/2002 |
| WO | 02086867 | | 10/2002 |
| WO | 03021993 | | 3/2003 |
| WO | 03044777 | | 5/2003 |

OTHER PUBLICATIONS

Tammi, Mikko, et al., Coding Distortion Caused by a Phase Difference Between the LP Filter and its Residual, IEEE, 1999, pp. 102-104, XP 10345571A.

International Search Report—PCT/US06/012232—International Search Authority. European Patent Office, Aug. 25, 2006.

International Preliminary Report on Patentability—PCT/US2006/012232, International Search Authority—The International Bureau of WIPO—Geneva, Switzerland—Oct. 3, 2007.

Written Opinion—PCT/US2006/012232, International Search Authority—European Patent Office—Aug. 25, 2006.

Bessette et al, "The Adaptive Multirate Wideband Speech Codec (AMR-WB)," IEEE Tr. on Speech and Audio Processing, vol. 10, No. 8, Nov. 2002, pp. 620-636.

McCree, A., "A 14 kb/s Wideband Speech Coder With a Parametric Highband Model," Int. Conf. on Acoustic Speech and Signal Processing, Turkey, 2000, pp. 1153-1156.

3rd Generation Partnership Project 2 ("3GPP2"). Enhanced Variable Rate Codec, Speech Service Options 3, 68, and 70 for Wideband Spread Spectrum Digital Systems, 3GPP2 C.S0014-C, ver. 1.0, Jan. 2007.

Budagavi. M. et al.: "Speech Coding in Mobile Radio Communications," Proc. IEEE, vol. 86, No. 7, Jul. 1998. pp. 1402-1412.

Chu, W. et al. Optimization of window and LSF interpolation factor for the ITU-T G.729 speech coding standard, 4 pp. (Eurospeech 2003, Geneva, pp. 1061-1064.
D17 So. S. Efficient Block Quantisation for Image and Speech Coding. PhD. Thesis, Griffith Univ., Brisbane, AU, Mar. 2005. Cover and chs. 5 and 6 (pp. 195-293).
Dattoro J et al:"Error spectrum Shaping and Vector Quantization" (Online) Oct. 1997, XP002307027 Stanford University, Retrieved from the Internet: URL: WWW. Stanford. Edu/ {dattorro/proj392c. pdf> [retrieved on Jun. 23, 2006].
Digital Radio Mondiale (DRM): System Specification; ETSI ES 201 980. ETSI Standards, European Telecommunications Standards Institute, Sophia-Antipo, FR, vol. BC, No. V122, Apr. 2003, XP 014004528, ISSN: 0000-0001, pp. 1-188.
Doser, A., et al., Time Frequency Techniques for Signal Feature Detection. IEEE, XP010374021, Oct. 24, 1999, pp. 452-456, vol. 1. Thirty=-Third Asilomar Conference.
Drygajilo, A. Speech Coding Techniques and Standards. Last accessed Dec. 15, 2006 at http://scgwww.epfl.ch/courses/Traitement_de_la_parole-2004-2005-pdf/12-codage%20Ppur-Drygajlo-Chapter-4-3.pdf. 23 pp. (chapter of Speech and Language Engineering.
Epps, J. "Wideband Extension of Narrowband Speech for Enhancement and Coding." Ph.D. thesis, Univ. of New South Wales, Sep. 2000. Cover, chs. 4-6 (pp. 66-121), and ch. 7 (pp. 122-129).
European Telecommunications Standards Institute (ETSI) 3rd Generation partnership Project (3GPP), Digital cellular telecommunications system (Phase 2+), Enhanced Full Rate (EFR) speech transcoding, GSM 06.60, ver. 8.0.1, Release 1999.
European Telecommunications Standards Institute (ETSI) 3rd Generation Partnership Project (3GPP). Digital cellular telecommunications system (Phase 2+), Full rate speech, Transcoding, GSM 06.10, ver. 8.1.1, Release 1999.
Guibe, G. et al. Speech Spectral Quantizers for Wideband Speech Coding. 11 pp. :Last accessed Dec. 14, 2006 at http://eprints.ecs.soton.ac.uk/6376/01/1178_pap.pdf (Euro. Trans. on Telecom., 12(6), pp. 535-545, 2001.
Guleryuz, O et al.: "On the DPCM Compression of Gaussian Authoregressive Sequence," 33 pages. Last accessed Dec. 14, 2006 at http://eeweb.poly.edu/~onur/publish/dpcm.pdf.
Hagen, R et al. ,"Removal of Sparse-excitation artifacts in CELP," Proc. ICASSP, May 1998. vol. 1, pp. 145-148, xp010279147.
Harma, A. et al.: "A comparison of warped and conventional linear predictive coding," 11 pages. Last accessed Dec. 15, 2006 at http://www.acoustics.hut.fi/~aqi/wwwPhD/P8.PDF. (IEEE Trans. Speech Audio Proc., vol. 9, No. 5, Jul. 2001, pp. 579-588.
His-Wen Nein et al: "Incorporating Error Shaping Technique into LSF Vector Quantization" IEEE Transactions on Speech and Audio Processing, IEEE Service Center, vol. 9, No. 2, Feb. 2001 XP011054076 ISSN: 1063-6676.
International Telecommunications Union, ("ITU-T"), Series G: Transmission Systems and Media, Digital Systems and Networks, Digital transmission systems—Terminal equipments—Coding of analogue signals by method other than PCM coding of speech at 8 kbits/s using conjugate-structure algebraic code—Excited linear-Rediction CS-ACELP, Annex E: 11.8 kbits/s CS ACELP Speech Coding algorithm, Sep. 1998.
Jelinek, M. et a.: "Noise reduction method for wideband speech coding," Euro. Sig. Proc. Conf., Vienna, Austria, Sep. 2004, pp. 1959-1962.
Kim, A. et al.: Improving the rate-distribution performance of DPCM. Proc 7th ISSPA, Paris, FR, Jul. 2003. pp. 97-100.
Knagenhjelm, P. H. and Kleijn, W. B., "Spectral dynamics is more important than spectral distortion," Proc. IEEE Int. Conf. on Acoustic Speech and Signal Processing, 1995, pp. 732-735.
Koishida, K. et al. A 16-kbit/s bandwidth scalable audio coder based on the G. 729 standard. Proc. ICASSP, Istanbul, Jun. 200, 4 pp. (vol. 2, pp. 1149-1152).
Lahouti, F. et al. Single and Double Frame Coding of Speech LPC Parameters Using a Lattice-based Quantization Scheme. (Tech. Rpt. UW-E&CE#2004-10, Univ. of Waterloo, ON, Apr. 2004. 22 pp.
Lahouti, F. et al. Single and Double Frame Coding of Speech LPC Parameters Using a Lattice-based Quantization Scheme. IEEE Trans. Audio, Speech, and Lang. Proc., 9pp. (Preprint of vol. 14, No. 5, Sep. 2006, pp. 1624-1632.
Makhoul, J. and Berouti, M.. "High Frequency Regeneration in Speech Coding Systems," Proc. IEEE Int. Conf. on Acoustic Speech and Signal Processing, Washington, 1979, pp. 428-431.
Makinen, J et al.: "The Effect of Source Based Rate Adaptation Extension in AMR-WB Speech Codec" Speech Coding, 2002, IEE Workshop Proceedings. Oct. 6-9, 2002, Piscataway, NJ, USA, IEEE, Oct. 6, 2002. pp. 153-155.
Massimo Gregorio Muzzi, Amelioration d'un codeur parametrique. Rapport Du Stage, XP002388943, Jul. 2003, pp. 1-76.
McCree, A. et al. A 1.7 kb/s MELP coder with improved analysis and quantization. 4 pp. (Proc. ICASSP, Seattle, WA, May 1998, pp. 593-596.
McCree, Alan, et al., An Embedded Adaptive Multi-Rate Wideband Speech Coder, IEEE International Conferen on Acoustics, Speech, and Signal Processing, May 7-11, 2001, pp. 761-764, vol. 1 of 6.
Nilsson M et al.: "Avoiding Over-Estimation in Bandwidth Extension of Telephony Speech" 2001 IEEE International Confeence on Acoustics, Speech, and Signal Processing. Proceedings (ICASSP). Salt Lake City, UT, May 7-11, 2001, IEEE International Conference on Acoustics, Speech, and Signal Processing. (May 7, 2001), pp. 869-872.
Nilsson, M.. Andersen, S.V., Kleijn, W.B., "Gaussian Mixture Model based Mutual Information Estimation between Frequency Based in Speech," Proc. IEEE Int. Conf. on Acoustic Speech and Signal Processing, Florida, 2002, pp. 525-528.
Noise shaping (Wikipedia entry). 3 pages. Last accessed Dec. 15, 2006 at http://en.wikipedia.org/wiki/Noise_shaping.
Nomura, T., et al.,"A bitrate and bandwidth scalable CELP coder," Acoustics, Speech and Signal Processing, May 1998. vol. 1, pp. 341-344, XP010279059.
Nordon, F. et al.: "A speech spectrum distortion measure with interframe memory." 4 pages(Proc. ICASSP, Salt Lake City, UT, May 2001, vol. 2.).
P.P. Vaidyanathan, Multirate Digital Filters, Filter Banks, Polyphase Networks, and Applications: A Tutorial, Proceedings of the IEEE, XP 000125845. Jan. 1990, pp. 56-93, vol. 78, No. 1.
Pereira, W. et al. Improved spectral tracking using interpolated linear prediction parameters. PRC. ICASSP, Orlando FL, May 2002, pp. I-261-I-264.
Postel, Jon, ed., Internet protocol, Request for Comments (Standard) RFC 791, Internet Engineering Task Force, Sep. 1981. (Obsoletes RFC 760), URL: http://www.ietf.org/rfc/rfc791.txt.
Qian, Y et al.: Classified Highband Excitation for Bandwidth Extension of Telephony Signals. Proc. Euro. Sig. proc. Conf. Anatalya, Turkey, Sep. 2005. 4 pages.
Ramachandran, R. et al. Pitch Prediction Filters in Speech Coding. IEEE Trans. Acoustics, Speech, and Sig. Proc., vol. 37, No. 4, Apr. 1989, pp. 467-478.
Roy, G. Low-rate analysis-by-synthesis wideband speech coding. MS thesis, McGill Univ., Montreal, QC, Aug. 1990. Cover, ch. 3 (pp. 19-38, and ch. 6 (pp. 87-91).
Samuelsson, J. et al. Controlling Spectral Dynamics in LPC Quantization for Perceptual Enhancement. 5 pp. (Proc. 31st Asilomar Conf. Sig. Syst. Comp., 1997, pp. 1066-1070.
The CCITT G. 722 Wideband Speech Coding Standard 3 pp. Last Accessed Dec. 15, 2006 at http://www.umiacs.Umd.edu/users/desin/Speech/mode3.html.
TS 26.090 v2.0.0. Mandatory Speech Codec speech processing functions. Jun. 1999. Cover, section 6, pp. 37-41, and figure 4, p. 49. p. 7.
Universal Mobile Telecommunications System (UMTS); audio codec processing functions; Extended Adaptive MultiR-Rate-Wideband (AMR-WB+) code: Transcoding functions (3GPP TS 26.290 version 6.2.0 release 6); ETSI TS 126 290, ETSI Standards, European Telecommunication Standards Institute, vol. 3-SA4, No. v620, Mar. 2005, pp. 1-86.
Valin, J.-M., Lefebvre, R., "Bandwidth Extension of Narrowband Speech for Low Bit-Rate Wideband Coding," Proc. IEEE Speech Coding Workshop (SCW), 2000, pp. 130-132.

Wideband Speech Coding Standards and Applications. VoiceAge Whitepaper. 17 pp. Last accessed Dec. 15, 2006 at http://www.voiceage.com/media/WidebandSpeech.pdf.
Cabral, "Evaluation of Methods for Excitation Regeneration in Bandwidth Extension of Speech", Master Thesis, KTH, Sweden, Mar. 27, 2003.
Hsu, "Robust bandwidth extension of narrowband speech", McGill University, Canada, Nov. 2004.
Normura et al., "A bitrate and bandwidth scalable CELP coder." Proceedings of the 1998 IEEE ICASSP, vol. 1, pp. 341-344, May 12, 1998.
Vaseghi, "Advanced Digital Signal Processing and Noise Reduction", Ch 13, Published by John Wiley and Sons Ltd., 2000.
Anonymous: "Noise Shaping," Wikipedia, Dec. 5, 2004, XP002387163, Retrieved Online: <http://www.wikipedia.org/>.
Translation of Office Action in Japan application 2008-504474 corresponding to U.S. Appl. No. 11/397,872, citing JP2001237708 and JP2003243990 dated Mar. 8, 2011.
Translation of Office Action in Japan application 2008-504477 corresponding to U.S. Appl. No. 11/397,432, citing US20050004793 and JP2003526123 dated Mar. 29, 2011.
Translation of Office Action in Japanese application 2008-504478 corresponding to U.S. Appl. No. 11/397,871, citing EP1498873A1, EP0732687A2 and JP2000206989 dated Mar. 29, 2011.

* cited by examiner

SYSTEMS, METHODS, AND APPARATUS FOR HIGHBAND TIME WARPING

RELATED APPLICATIONS

This application claims benefit of U.S. Provisional Pat. Appl. No. 60/667,901, entitled "CODING THE HIGH-FREQUENCY BAND OF WIDEBAND SPEECH," filed Apr. 1, 2005. This application also claims benefit of U.S. Provisional Pat. Appl. No. 60/673,965, entitled "PARAMETER CODING IN A HIGH-BAND SPEECH CODER," filed Apr. 22, 2005.

This application is also related to the following Patent Applications filed herewith: "SYSTEMS, METHODS, AND APPARATUS FOR WIDEBAND SPEECH CODING," Ser. No. 11/397,794; "SYSTEMS, METHODS, AND APPARATUS FOR HIGHBAND EXCITATION GENERATION," Ser. No. 11/397,870; "SYSTEMS, METHODS, AND APPARATUS FOR ANTI-SPARSENESS FILTERING," Ser. No. 11/397,505; "SYSTEMS, METHODS, AND APPARATUS FOR GAIN CODING," Ser. No. 11/397,871; "SYSTEMS, METHODS, AND APPARATUS FOR HIGHBAND BURST SUPPRESSION," Ser. No. 11/397,433; "SYSTEMS, METHODS, AND APPARATUS FOR SPEECH SIGNAL FILTERING," Ser. No. 11/397,432; and "SYSTEMS, METHODS, AND APPARATUS FOR QUANTIZATION OF SPECTRAL ENVELOPE REPRESENTATION," Ser. No. 11/397,872.

FIELD OF THE INVENTION

This invention relates to signal processing.

BACKGROUND

Voice communications over the public switched telephone network (PSTN) have traditionally been limited in bandwidth to the frequency range of 300-3400 kHz. New networks for voice communications, such as cellular telephony and voice over IP (Internet Protocol, VoIP), may not have the same bandwidth limits, and it may be desirable to transmit and receive voice communications that include a wideband frequency range over such networks. For example, it may be desirable to support an audio frequency range that extends down to 50 Hz and/or up to 7 or 8 kHz. It may also be desirable to support other applications, such as high-quality audio or audio/video conferencing, that may have audio speech content in ranges outside the traditional PSTN limits.

Extension of the range supported by a speech coder into higher frequencies may improve intelligibility. For example, the information that differentiates fricatives such as 's' and 'f' is largely in the high frequencies. Highband extension may also improve other qualities of speech, such as presence. For example, even a voiced vowel may have spectral energy far above the PSTN limit.

One approach to wideband speech coding involves scaling a narrowband speech coding technique (e.g., one configured to encode the range of 0-4 kHz) to cover the wideband spectrum. For example, a speech signal may be sampled at a higher rate to include components at high frequencies, and a narrowband coding technique may be reconfigured to use more filter coefficients to represent this wideband signal. Narrowband coding techniques such as CELP (codebook excited linear prediction) are computationally intensive, however, and a wideband CELP coder may consume too many processing cycles to be practical for many mobile and other embedded applications. Encoding the entire spectrum of a wideband signal to a desired quality using such a technique may also lead to an unacceptably large increase in bandwidth. Moreover, transcoding of such an encoded signal would be required before even its narrowband portion could be transmitted into and/or decoded by a system that only supports narrowband coding.

Another approach to wideband speech coding involves extrapolating the highband spectral envelope from the encoded narrowband spectral envelope. While such an approach may be implemented without any increase in bandwidth and without a need for transcoding, the coarse spectral envelope or formant structure of the highband portion of a speech signal generally cannot be predicted accurately from the spectral envelope of the narrowband portion.

It may be desirable to implement wideband speech coding such that at least the narrowband portion of the encoded signal may be sent through a narrowband channel (such as a PSTN channel) without transcoding or other significant modification. Efficiency of the wideband coding extension may also be desirable, for example, to avoid a significant reduction in the number of users that may be serviced in applications such as wireless cellular telephony and broadcasting over wired and wireless channels.

SUMMARY

In one embodiment, a method of signal processing includes encoding a low-frequency portion of a speech signal into at least an encoded narrowband excitation signal and a plurality of narrowband filter parameters and generating a highband excitation signal based on the encoded narrowband excitation signal. In this method, the encoded narrowband excitation signal describes a signal that is warped in time, with respect to the speech signal, according to a time-varying time warping. The method includes applying, based on information relating to the time warping, a plurality of different time shifts to a corresponding plurality of successive portions in time of a high-frequency portion of the speech signal. The method includes encoding the time-shifted high-frequency portion into at least one among (A) a plurality of highband filter parameters and (B) a plurality of highband gain factors.

In another embodiment, an apparatus includes a narrowband speech encoder configured to encode a low-frequency portion of a speech signal into at least an encoded narrowband excitation signal and a plurality of narrowband filter parameters; and a highband speech encoder configured to generate a highband excitation signal based on the encoded narrowband excitation signal. In this apparatus, the narrowband speech encoder is configured to output a regularization data signal describing a time-varying time warping, with respect to the speech signal, that is included in the encoded narrowband excitation signal. The apparatus includes a delay line configured to apply a plurality of different time shifts to a corresponding plurality of successive portions in time of a high-frequency portion of the speech signal, wherein the different time shifts are based on information from the regularization data signal. In this apparatus, the highband encoder is configured to encode the time-shifted high-frequency portion into at least one among (A) a plurality of highband filter parameters and (B) a plurality of highband gain factors.

In another embodiment, an apparatus includes means for encoding a low-frequency portion of a speech signal into at least an encoded narrowband excitation signal and a plurality of narrowband filter parameters and means for generating a highband excitation signal based on the encoded narrowband excitation signal. In this apparatus, the encoded narrowband excitation signal describes a signal that is warped in time, with respect to the speech signal, according to a time-varying time warping. The apparatus includes means for applying, based on information relating to the time warping, a plurality of different time shifts to a corresponding plurality of successive portions in time of a high-frequency portion of the speech signal. The apparatus includes means for encoding the time-shifted high-frequency portion into at least one among (A) a plurality of highband filter parameters and (B) a plurality of highband gain factors.

In the figures and accompanying description, the same reference labels refer to the same or analogous elements or signals.

DETAILED DESCRIPTION

Embodiments as described herein include systems, methods, and apparatus that may be configured to provide an extension to a narrowband speech coder to support transmission and/or storage of wideband speech signals at a bandwidth increase of only about 800 to 1000 bps (bits per second). Potential advantages of such implementations include embedded coding to support compatibility with narrowband systems, relatively easy allocation and reallocation of bits between the narrowband and highband coding channels, avoiding a computationally intensive wideband synthesis operation, and maintaining a low sampling rate for signals to be processed by computationally intensive waveform coding routines.

Unless expressly limited by its context, the term "calculating" is used herein to indicate any of its ordinary meanings, such as computing, generating, and selecting from a list of values. Where the term "comprising" is used in the present description and claims, it does not exclude other elements or operations. The term "A is based on B" is used to indicate any of its ordinary meanings, including the cases (i) "A is equal to B" and (ii) "A is based on at least B." The term "Internet Protocol" includes version 4, as described in IETF (Internet Engineering Task Force) RFC (Request for Comments) 791, and subsequent versions such as version 6.

Figure 1A:
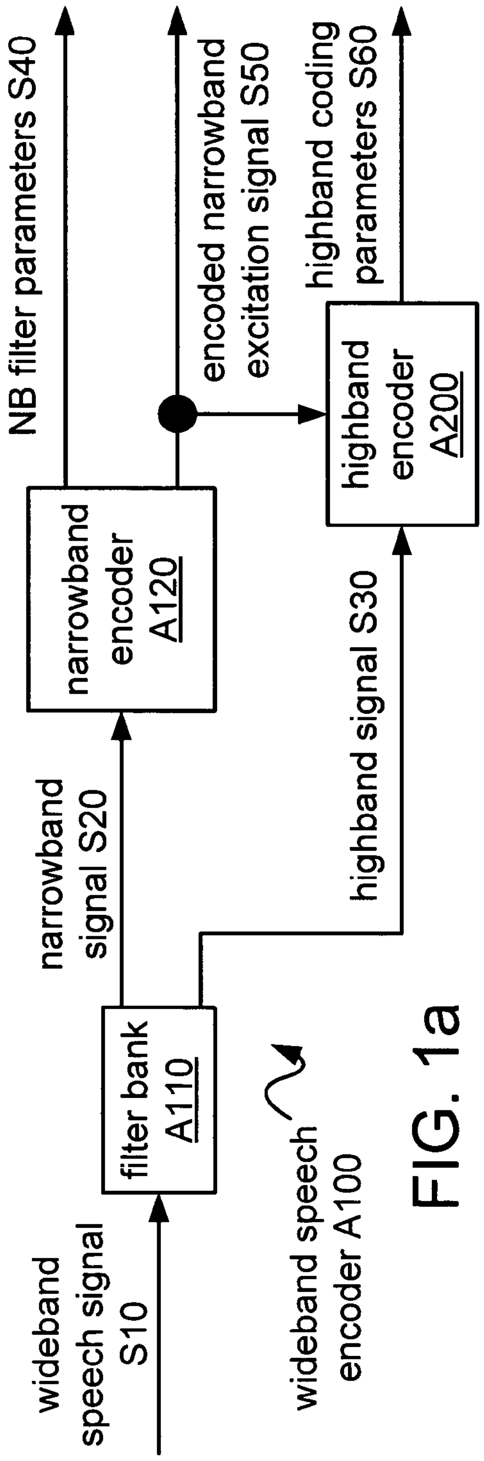
FIG. 1*a* shows a block diagram of a wideband speech encoder A100 according to an embodiment.

FIG. 1*a* shows a block diagram of a wideband speech encoder A100 according to an embodiment. Filter bank A10 is configured to filter a wideband speech signal S10 to produce a narrowband signal S20 and a highband signal S30. Narrowband encoder A120 is configured to encode narrowband signal S20 to produce narrowband (NB) filter parameters S40 and a narrowband residual signal S50. As described in further detail herein, narrowband encoder A120 is typically configured to produce narrowband filter parameters S40 and encoded narrowband excitation signal S50 as codebook indices or in another quantized form. Highband encoder A200 is configured to encode highband signal S30 according to information in encoded narrowband excitation signal S50 to produce highband coding parameters S60. As described in further detail herein, highband encoder A200 is typically configured to produce highband coding parameters S60 as codebook indices or in another quantized form. One particular example of wideband speech encoder A100 is configured to encode wideband speech signal S10 at a rate of about 8.55 kbps (kilobits per second), with about 7.55 kbps being used for narrowband filter parameters S40 and encoded narrowband excitation signal S50, and about 1 kbps being used for highband coding parameters S60.

Figure 1B:
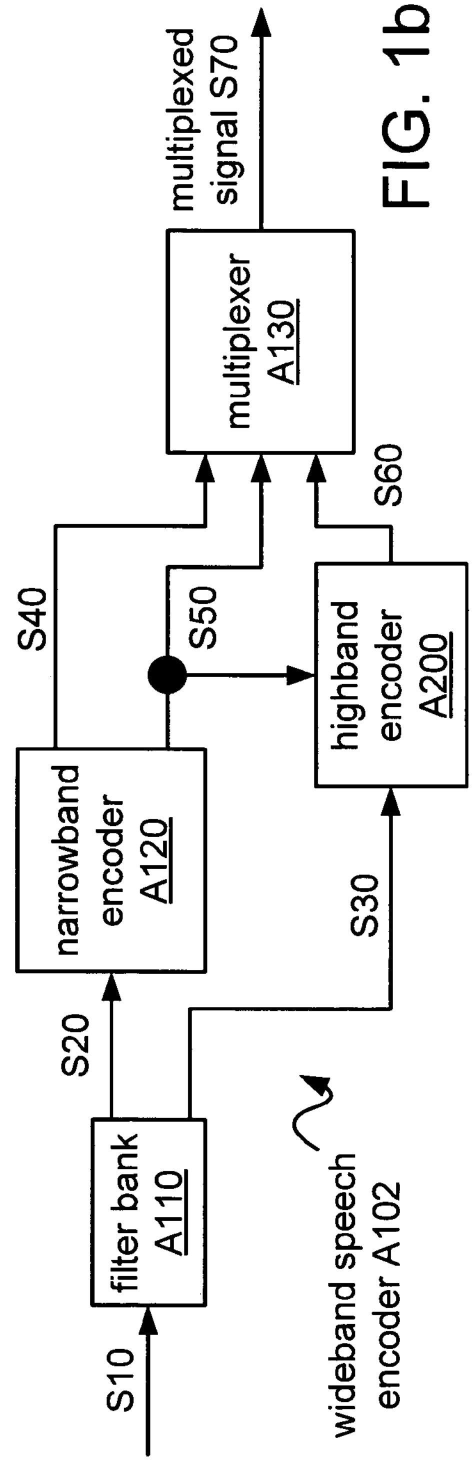
FIG. 1*b* shows a block diagram of an implementation A102 of wideband speech encoder A100.

It may be desired to combine the encoded narrowband and highband signals into a single bitstream. For example, it may be desired to multiplex the encoded signals together for transmission (e.g., over a wired, optical, or wireless transmission channel), or for storage, as an encoded wideband speech signal. FIG. 1*b* shows a block diagram of an implementation A102 of wideband speech encoder A100 that includes a multiplexer A130 configured to combine narrowband filter parameters S40, encoded narrowband excitation signal S50, and highband filter parameters S60 into a multiplexed signal S70.

An apparatus including encoder A102 may also include circuitry configured to transmit multiplexed signal S70 into a transmission channel such as a wired, optical, or wireless channel. Such an apparatus may also be configured to perform one or more channel encoding operations on the signal, such as error correction encoding (e.g., rate-compatible convolutional encoding) and/or error detection encoding (e.g., cyclic redundancy encoding), and/or one or more layers of network protocol encoding (e.g., Ethernet, TCP/IP, cdma2000).

It may be desirable for multiplexer A130 to be configured to embed the encoded narrowband signal (including narrowband filter parameters S40 and encoded narrowband excitation signal S50) as a separable substream of multiplexed signal S70, such that the encoded narrowband signal may be recovered and decoded independently of another portion of multiplexed signal S70 such as a highband and/or lowband signal. For example, multiplexed signal S70 may be arranged such that the encoded narrowband signal may be recovered by stripping away the highband filter parameters S60. One potential advantage of such a feature is to avoid the need for transcoding the encoded wideband signal before passing it to a system that supports decoding of the narrowband signal but does not support decoding of the highband portion.

Figure 2A:
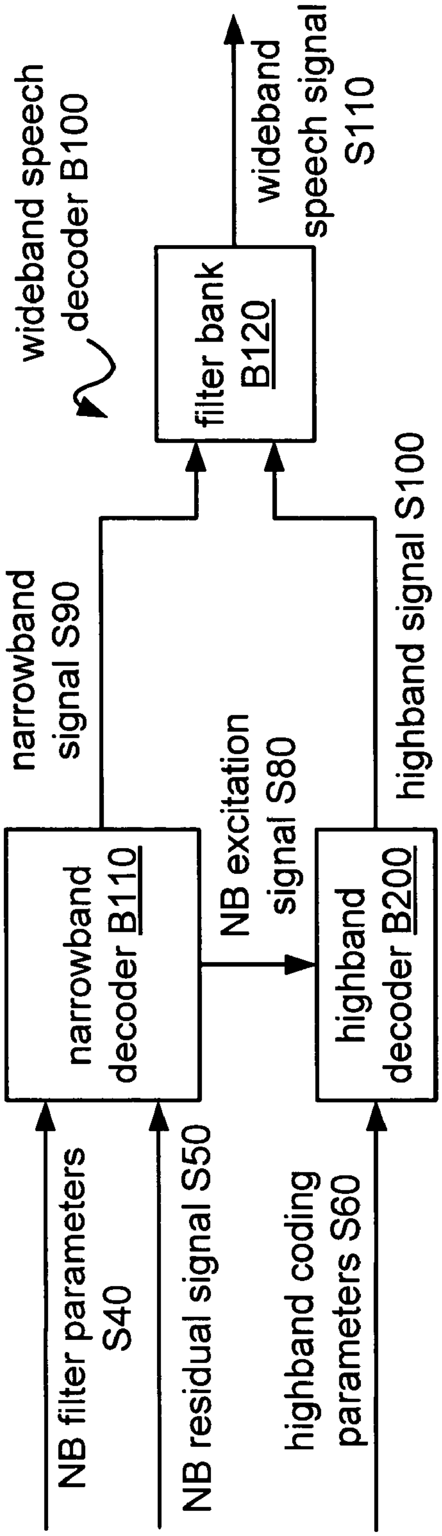
FIG. 2*a* shows a block diagram of a wideband speech decoder B100 according to an embodiment.

FIG. 2*a* is a block diagram of a wideband speech decoder B100 according to an embodiment. Narrowband decoder B110 is configured to decode narrowband filter parameters S40 and encoded narrowband excitation signal S50 to produce a narrowband signal S90. Highband decoder B200 is configured to decode highband coding parameters S60 according to a narrowband excitation signal S80, based on encoded narrowband excitation signal S50, to produce a highband signal S100. In this example, narrowband decoder B110 is configured to provide narrowband excitation signal S80 to highband decoder B200. Filter bank B120 is configured to combine narrowband signal S90 and highband signal S100 to produce a wideband speech signal S110.

Figure 2B:
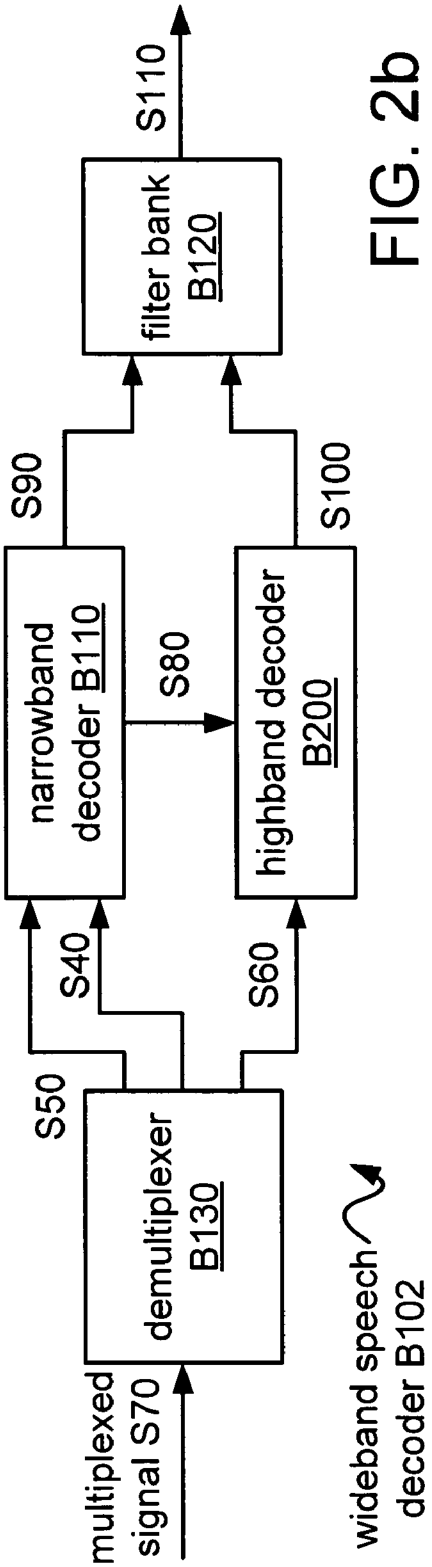
FIG. 2*b* shows a block diagram of an implementation B102 of wideband speech decoder B100.

FIG. 2*b* is a block diagram of an implementation B102 of wideband speech decoder B100 that includes a demultiplexer B130 configured to produce encoded signals S40, S50, and S60 from multiplexed signal S70. An apparatus including decoder B102 may include circuitry configured to receive multiplexed signal S70 from a transmission channel such as a wired, optical, or wireless channel. Such an apparatus may also be configured to perform one or more channel decoding operations on the signal, such as error correction decoding (e.g., rate-compatible convolutional decoding) and/or error detection decoding (e.g., cyclic redundancy decoding), and/or one or more layers of network protocol decoding (e.g., Ethernet, TCP/IP, cdma2000).

Filter bank A110 is configured to filter an input signal according to a split-band scheme to produce a low-frequency subband and a high-frequency subband. Depending on the design criteria for the particular application, the output subbands may have equal or unequal bandwidths and may be overlapping or nonoverlapping. A configuration of filter bank A110 that produces more than two subbands is also possible. For example, such a filter bank may be configured to produce one or more lowband signals that include components in a frequency range below that of narrowband signal S20 (such as the range of 50-300 Hz). It is also possible for such a filter bank to be configured to produce one or more additional highband signals that include components in a frequency range above that of highband signal S30 (such as a range of 14-20, 16-20, or 16-32 kHz). In such case, wideband speech encoder A100 may be implemented to encode this signal or signals separately, and multiplexer A130 may be configured to include the additional encoded signal or signals in multiplexed signal S70 (e.g., as a separable portion).

Figure 3A:
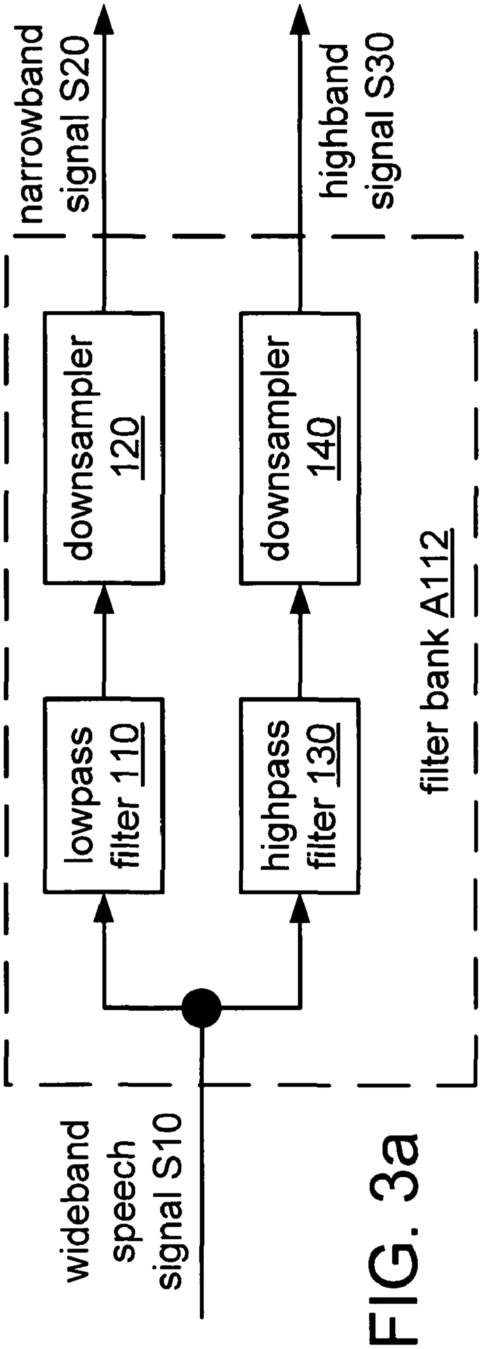
FIG. 3*a* shows a block diagram of an implementation A112 of filter bank A110.

FIG. 3*a* shows a block diagram of an implementation A112 of filter bank A110 that is configured to produce two subband signals having reduced sampling rates. Filter bank A110 is arranged to receive a wideband speech signal S10 having a high-frequency (or highband) portion and a low-frequency (or lowband) portion. Filter bank A112 includes a lowband processing path configured to receive wideband speech signal S10 and to produce narrowband speech signal S20, and a highband processing path configured to receive wideband speech signal S10 and to produce highband speech signal S30. Lowpass filter 110 filters wideband speech signal S10 to pass a selected low-frequency subband, and highpass filter 130 filters wideband speech signal S10 to pass a selected high-frequency subband. Because both subband signals have more narrow bandwidths than wideband speech signal S10, their sampling rates can be reduced to some extent without loss of information. Downsampler 120 reduces the sampling rate of the lowpass signal according to a desired decimation factor (e.g., by removing samples of the signal and/or replacing samples with average values), and downsampler 140 likewise reduces the sampling rate of the highpass signal according to another desired decimation factor.

Figure 3B:
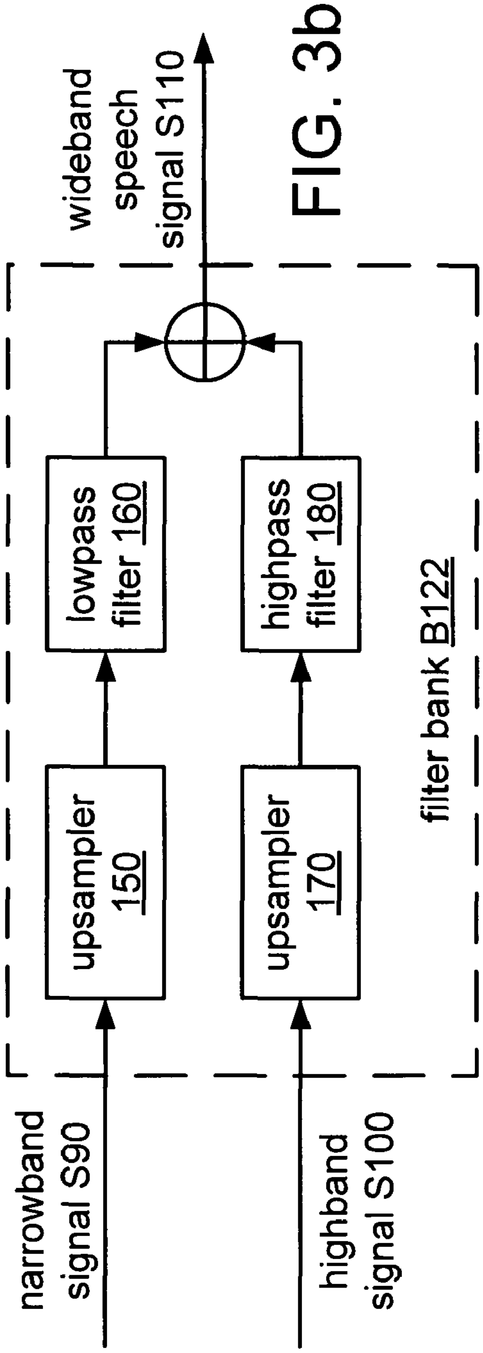
FIG. 3*b* shows a block diagram of an implementation B122 of filter bank B120.

FIG. 3*b* shows a block diagram of a corresponding implementation B122 of filter bank B120. Upsampler 150 increases the sampling rate of narrowband signal S90 (e.g., by zero-stuffing and/or by duplicating samples), and lowpass filter 160 filters the upsampled signal to pass only a lowband portion (e.g., to prevent aliasing). Likewise, upsampler 170 increases the sampling rate of highband signal S100 and highpass filter 180 filters the upsampled signal to pass only a highband portion. The two passband signals are then summed to form wideband speech signal S110. In some implementations of decoder B100, filter bank B120 is configured to produce a weighted sum of the two passband signals according to one or more weights received and/or calculated by highband decoder B200. A configuration of filter bank B120 that combines more than two passband signals is also contemplated.

Each of the filters 110, 130, 160, 180 may be implemented as a finite-impulse-response (FIR) filter or as an infinite-impulse-response (IIR) filter. The frequency responses of encoder filters 110 and 130 may have symmetric or dissimilarly shaped transition regions between stopband and passband. Likewise, the frequency responses of decoder filters 160 and 180 may have symmetric or dissimilarly shaped transition regions between stopband and passband. It may be desirable but is not strictly necessary for lowpass filter 110 to have the same response as lowpass filter 160, and for highpass filter 130 to have the same response as highpass filter 180. In one example, the two filter pairs 110, 130 and 160, 180 are quadrature mirror filter (QMF) banks, with filter pair 110, 130 having the same coefficients as filter pair 160, 180.

Figure 4A:
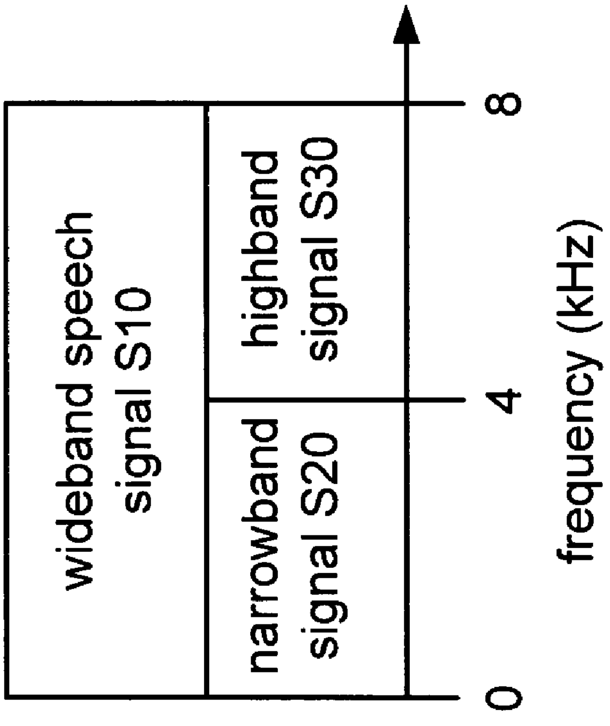
FIG. 4*a* shows bandwidth coverage of the low and high bands for one example of filter bank A110.
Figure 4B:
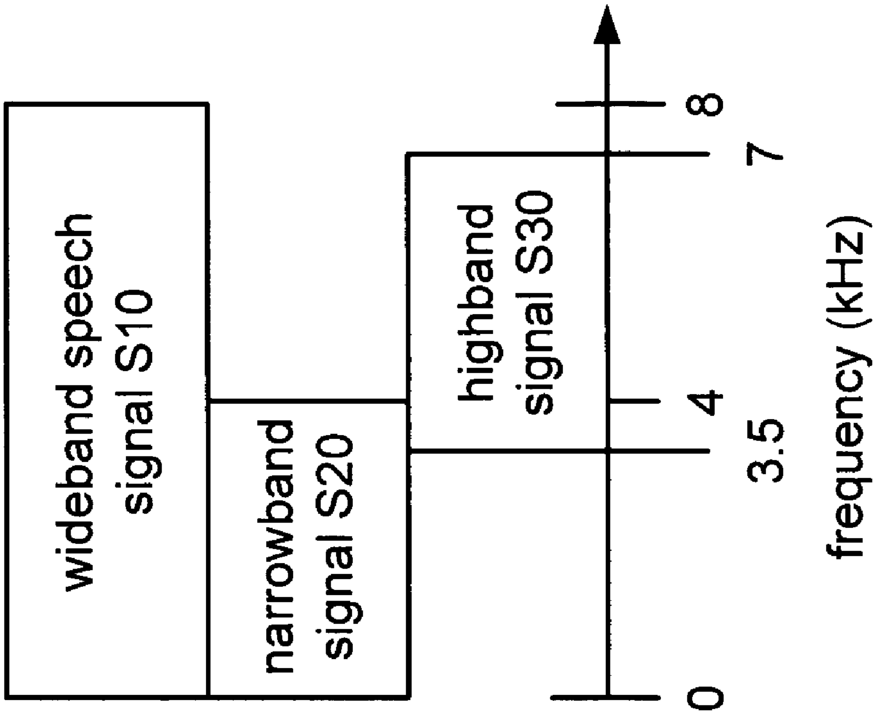
FIG. 4*b* shows bandwidth coverage of the low and high bands for another example of filter bank A110.

In a typical example, lowpass filter 110 has a passband that includes the limited PSTN range of 300-3400 Hz (e.g., the band from 0 to 4 kHz). FIGS. 4*a* and 4*b* show relative bandwidths of wideband speech signal S10, narrowband signal S20, and highband signal S30 in two different implementational examples. In both of these particular examples, wideband speech signal S10 has a sampling rate of 16 kHz (representing frequency components within the range of 0 to 8 kHz), and narrowband signal S20 has a sampling rate of 8 kHz (representing frequency components within the range of 0 to 4 kHz).

In the example of FIG. 4*a*, there is no significant overlap between the two subbands. A highband signal S30 as shown in this example may be obtained using a highpass filter 130 with a passband of 4-8 kHz. In such a case, it may be desirable to reduce the sampling rate to 8 kHz by downsampling the filtered signal by a factor of two. Such an operation, which may be expected to significantly reduce the computational complexity of further processing operations on the signal, will move the passband energy down to the range of 0 to 4 kHz without loss of information.

In the alternative example of FIG. 4*b*, the upper and lower subbands have an appreciable overlap, such that the region of 3.5 to 4 kHz is described by both subband signals. A highband signal S30 as in this example may be obtained using a highpass filter 130 with a passband of 3.5-7 kHz. In such a case, it may be desirable to reduce the sampling rate to 7 kHz by downsampling the filtered signal by a factor of 16/7. Such an operation, which may be expected to significantly reduce the computational complexity of further processing operations on the signal, will move the passband energy down to the range of 0 to 3.5 kHz without loss of information.

In a typical handset for telephonic communication, one or more of the transducers (i.e., the microphone and the earpiece or loudspeaker) lacks an appreciable response over the frequency range of 7-8 kHz. In the example of FIG. 4*b*, the portion of wideband speech signal S10 between 7 and 8 kHz is not included in the encoded signal. Other particular examples of highpass filter 130 have passbands of 3.5-7.5 kHz and 3.5-8 kHz.

In some implementations, providing an overlap between subbands as in the example of FIG. 4*b* allows for the use of a lowpass and/or a highpass filter having a smooth rolloff over the overlapped region. Such filters are typically easier to design, less computationally complex, and/or introduce less delay than filters with sharper or "brick-wall" responses. Filters having sharp transition regions tend to have higher sidelobes (which may cause aliasing) than filters of similar order that have smooth rolloffs. Filters having sharp transition regions may also have long impulse responses which may cause ringing artifacts. For filter bank implementations having one or more IIR filters, allowing for a smooth rolloff over the overlapped region may enable the use of a filter or filters whose poles are further away from the unit circle, which may be important to ensure a stable fixed-point implementation.

Overlapping of subbands allows a smooth blending of lowband and highband that may lead to fewer audible artifacts, reduced aliasing, and/or a less noticeable transition from one band to the other. Moreover, the coding efficiency of narrowband encoder A120 (for example, a waveform coder) may drop with increasing frequency. For example, coding quality of the narrowband coder may be reduced at low bit rates, especially in the presence of background noise. In such cases, providing an overlap of the subbands may increase the quality of reproduced frequency components in the overlapped region.

Moreover, overlapping of subbands allows a smooth blending of lowband and highband that may lead to fewer audible artifacts, reduced aliasing, and/or a less noticeable transition from one band to the other. Such a feature may be especially desirable for an implementation in which narrowband encoder A120 and highband encoder A200 operate according to different coding methodologies. For example, different coding techniques may produce signals that sound quite different. A coder that encodes a spectral envelope in the form of codebook indices may produce a signal having a different sound than a coder that encodes the amplitude spectrum instead. A time-domain coder (e.g., a pulse-code-modulation or PCM coder) may produce a signal having a different sound than a frequency-domain coder. A coder that encodes a signal with a representation of the spectral envelope and the corresponding residual signal may produce a signal having a different sound than a coder that encodes a signal with only a representation of the spectral envelope. A coder that encodes a signal as a representation of its waveform may produce an output having a different sound than that from a sinusoidal coder. In such cases, using filters having sharp transition regions to define nonoverlapping subbands may lead to an abrupt and perceptually noticeable transition between the subbands in the synthesized wideband signal.

Although QMF filter banks having complementary overlapping frequency responses are often used in subband techniques, such filters are unsuitable for at least some of the wideband coding implementations described herein. A QMF filter bank at the encoder is configured to create a significant degree of aliasing that is canceled in the corresponding QMF filter bank at the decoder. Such an arrangement may not be appropriate for an application in which the signal incurs a significant amount of distortion between the filter banks, as the distortion may reduce the effectiveness of the alias cancellation property. For example, applications described herein include coding implementations configured to operate at very low bit rates. As a consequence of the very low bit rate, the decoded signal is likely to appear significantly distorted as compared to the original signal, such that use of QMF filter banks may lead to uncanceled aliasing. Applications that use QMF filter banks typically have higher bit rates (e.g., over 12 kbps for AMR, and 64 kbps for G.722).

Additionally, a coder may be configured to produce a synthesized signal that is perceptually similar to the original signal but which actually differs significantly from the original signal. For example, a coder that derives the highband excitation from the narrowband residual as described herein may produce such a signal, as the actual highband residual may be completely absent from the decoded signal. Use of QMF filter banks in such applications may lead to a significant degree of distortion caused by uncanceled aliasing.

The amount of distortion caused by QMF aliasing may be reduced if the affected subband is narrow, as the effect of the aliasing is limited to a bandwidth equal to the width of the subband. For examples as described herein in which each subband includes about half of the wideband bandwidth, however, distortion caused by uncanceled aliasing could affect a significant part of the signal. The quality of the signal may also be affected by the location of the frequency band over which the uncanceled aliasing occurs. For example, distortion created near the center of a wideband speech signal (e.g., between 3 and 4 kHz) may be much more objectionable than distortion that occurs near an edge of the signal (e.g., above 6 kHz).

While the responses of the filters of a QMF filter bank are strictly related to one another, the lowband and highband paths of filter banks A110 and B120 may be configured to have spectra that are completely unrelated apart from the overlapping of the two subbands. We define the overlap of the two subbands as the distance from the point at which the frequency response of the highband filter drops to −20 dB up to the point at which the frequency response of the lowband filter drops to −20 dB. In various examples of filter bank A110 and/or B120, this overlap ranges from around 200 Hz to around 1 kHz. The range of about 400 to about 600 Hz may represent a desirable tradeoff between coding efficiency and perceptual smoothness. In one particular example as mentioned above, the overlap is around 500 Hz.

Figure 4C:
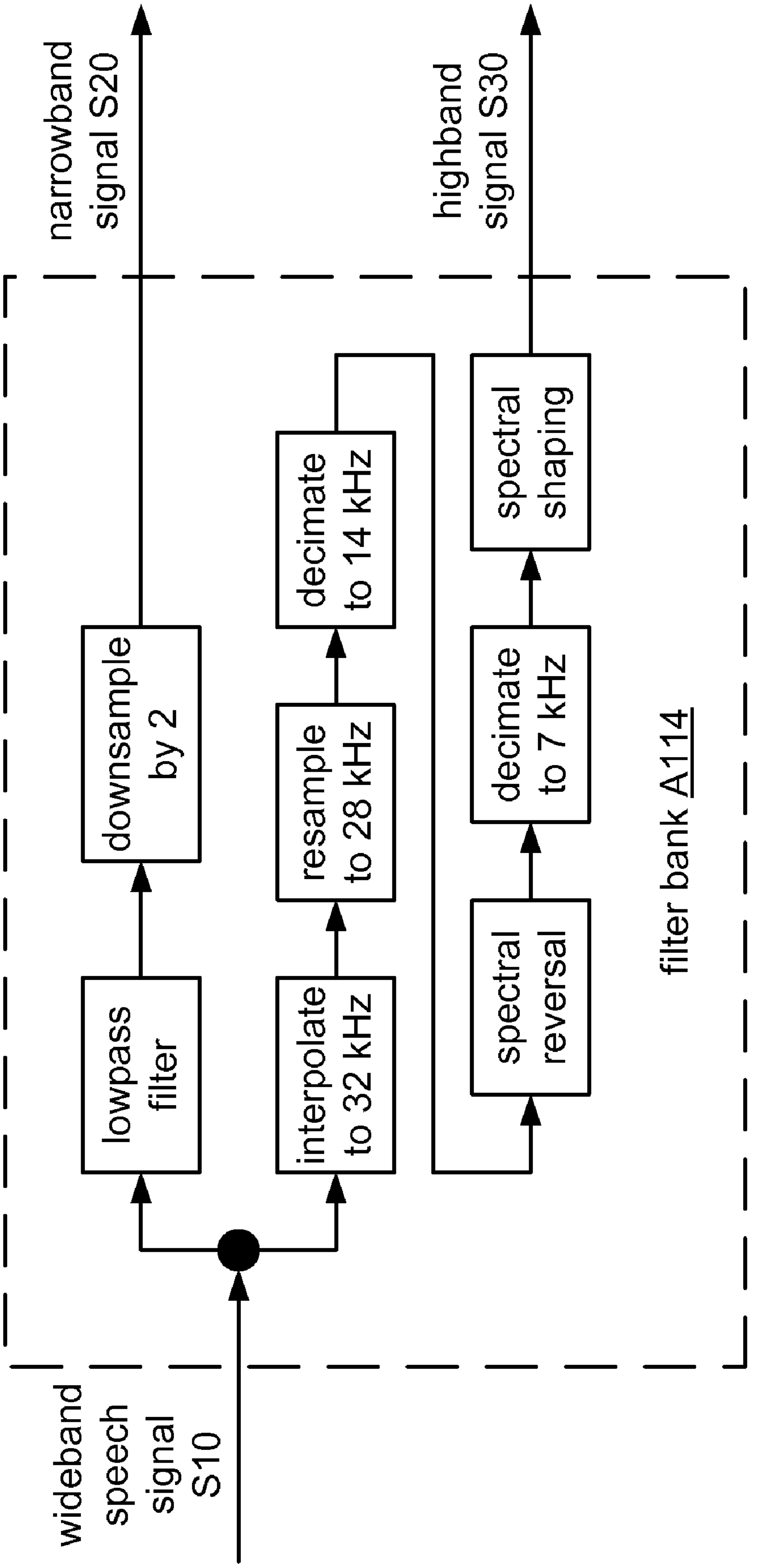
FIG. 4*c* shows a block diagram of an implementation A114 of filter bank A112.

It may be desirable to implement filter bank A112 and/or B122 to perform operations as illustrated in FIGS. 4*a* and 4*b* in several stages. For example, FIG. 4*c* shows a block diagram of an implementation A114 of filter bank A112 that performs a functional equivalent of highpass filtering and downsampling operations using a series of interpolation, resampling, decimation, and other operations. Such an implementation may be easier to design and/or may allow reuse of functional blocks of logic and/or code. For example, the same functional block may be used to perform the operations of decimation to 14 kHz and decimation to 7 kHz as shown in FIG. 4*c*. The spectral reversal operation may be implemented by multiplying the signal with the function $e^{jn\pi}$ or the sequence $(-1)^n$, whose values alternate between +1 and −1. The spectral shaping operation may be implemented as a lowpass filter configured to shape the signal to obtain a desired overall filter response.

It is noted that as a consequence of the spectral reversal operation, the spectrum of highband signal S30 is reversed. Subsequent operations in the encoder and corresponding decoder may be configured accordingly. For example, highband excitation generator A300 as described herein may be configured to produce a highband excitation signal S120 that also has a spectrally reversed form.

Figure 4D:
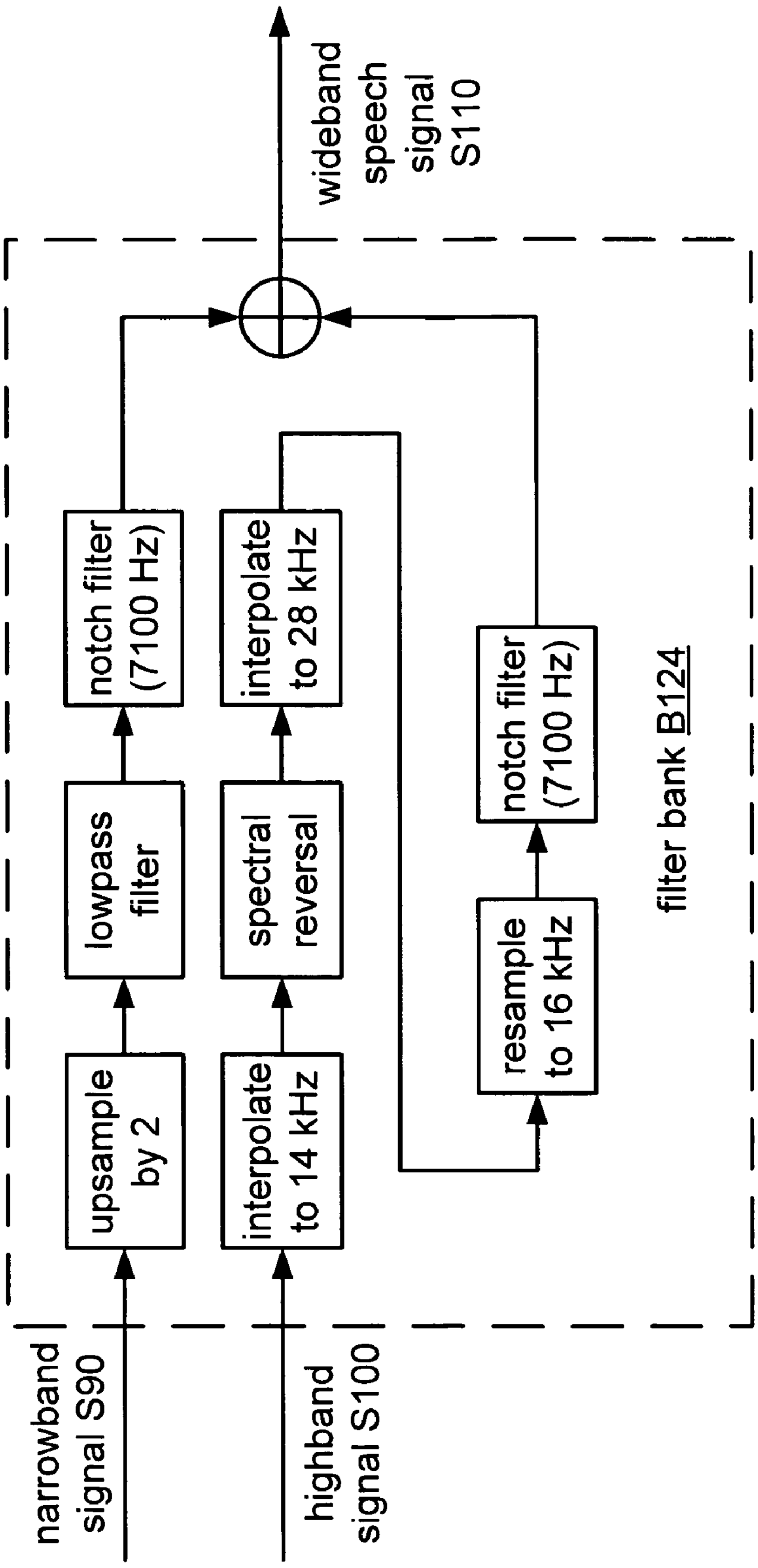
FIG. 4*d* shows a block diagram of an implementation B124 of filter bank B122.

FIG. 4*d* shows a block diagram of an implementation B124 of filter bank B122 that performs a functional equivalent of upsampling and highpass filtering operations using a series of interpolation, resampling, and other operations. Filter bank B124 includes a spectral reversal operation in the highband that reverses a similar operation as performed, for example, in a filter bank of the encoder such as filter bank A114. In this particular example, filter bank B124 also includes notch filters in the lowband and highband that attenuate a component of the signal at 7100 Hz, although such filters are optional and need not be included. The Patent Application "SYSTEMS, METHODS, AND APPARATUS FOR SPEECH SIGNAL FILTERING " filed herewith, now U.S. Pub. No. 2007/0088558, includes additional description and figures relating to responses of elements of particular implementations of filter banks A110 and B120, and this material is hereby incorporated by reference.

Figure 5A:
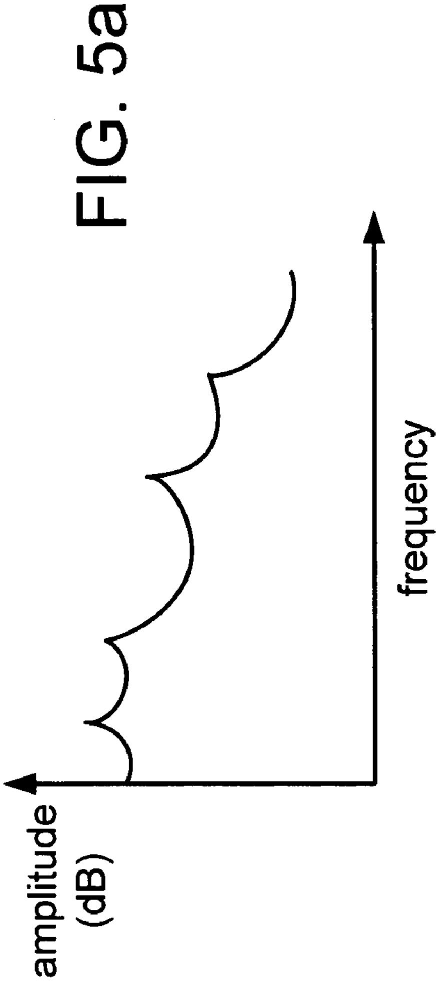
FIG. 5*a* shows an example of a plot of log amplitude vs. frequency for a speech signal.

Narrowband encoder A120 is implemented according to a source-filter model that encodes the input speech signal as (A) a set of parameters that describe a filter and (B) an excitation signal that drives the described filter to produce a synthesized reproduction of the input speech signal. FIG. 5*a* shows an example of a spectral envelope of a speech signal. The peaks that characterize this spectral envelope represent resonances of the vocal tract and are called formants. Most speech coders encode at least this coarse spectral structure as a set of parameters such as filter coefficients.

Figure 5B:
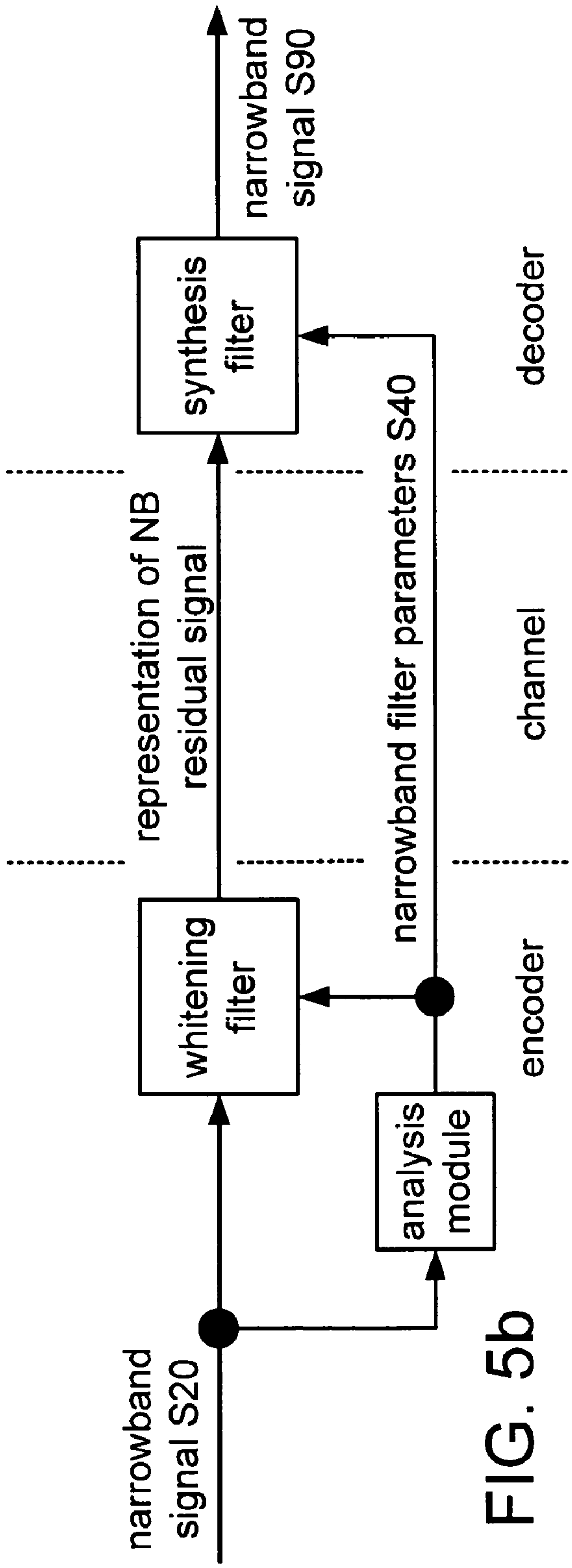
FIG. 5*b* shows a block diagram of a basic linear prediction coding system.

FIG. 5*b* shows an example of a basic source-filter arrangement as applied to coding of the spectral envelope of narrowband signal S20. An analysis module calculates a set of parameters that characterize a filter corresponding to the speech sound over a period of time (typically 20 msec). A whitening filter (also called an analysis or prediction error filter) configured according to those filter parameters removes the spectral envelope to spectrally flatten the signal. The resulting whitened signal (also called a residual) has less energy and thus less variance and is easier to encode than the original speech signal. Errors resulting from coding of the residual signal may also be spread more evenly over the spectrum. The filter parameters and residual are typically quantized for efficient transmission over the channel. At the decoder, a synthesis filter configured according to the filter parameters is excited by a signal based on the residual to produce a synthesized version of the original speech sound. The synthesis filter is typically configured to have a transfer function that is the inverse of the transfer function of the whitening filter.

Figure 6:
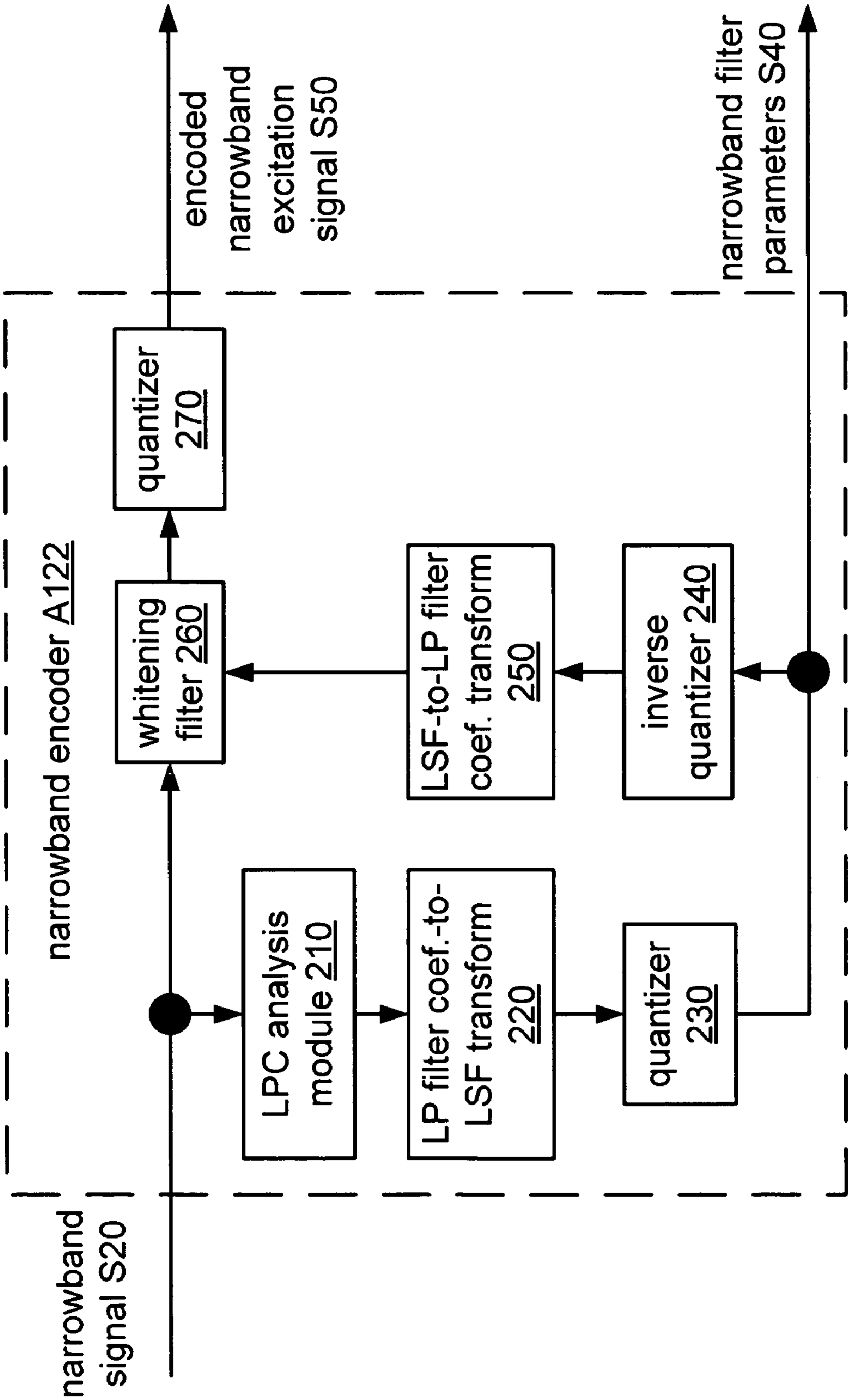
FIG. 6 shows a block diagram of an implementation A122 of narrowband encoder A120.

FIG. 6 shows a block diagram of a basic implementation A122 of narrowband encoder A120. In this example, a linear prediction coding (LPC) analysis module 210 encodes the spectral envelope of narrowband signal S20 as a set of linear prediction (LP) coefficients (e.g., coefficients of an all-pole filter 1/A(z)). The analysis module typically processes the input signal as a series of nonoverlapping frames, with a new set of coefficients being calculated for each frame. The frame period is generally a period over which the signal may be expected to be locally stationary; one common example is 20 milliseconds (equivalent to 160 samples at a sampling rate of 8 kHz). In one example, LPC analysis module 210 is configured to calculate a set of ten LP filter coefficients to characterize the formant structure of each 20-millisecond frame. It is also possible to implement the analysis module to process the input signal as a series of overlapping frames.

The analysis module may be configured to analyze the samples of each frame directly, or the samples may be weighted first according to a windowing function (for example, a Hamming window). The analysis may also be performed over a window that is larger than the frame, such as a 30-msec window. This window may be symmetric (e.g. 5-20-5, such that it includes the 5 milliseconds immediately before and after the 20-millisecond frame) or asymmetric (e.g. 10-20, such that it includes the last 10 milliseconds of the preceding frame). An LPC analysis module is typically configured to calculate the LP filter coefficients using a Levinson-Durbin recursion or the Leroux-Gueguen algorithm. In another implementation, the analysis module may be configured to calculate a set of cepstral coefficients for each frame instead of a set of LP filter coefficients.

The output rate of encoder A120 may be reduced significantly, with relatively little effect on reproduction quality, by quantizing the filter parameters. Linear prediction filter coefficients are difficult to quantize efficiently and are usually mapped into another representation, such as line spectral pairs (LSPs) or line spectral frequencies (LSFs), for quantization and/or entropy encoding. In the example of FIG. 6, LP filter coefficient-to-LSF transform 220 transforms the set of LP filter coefficients into a corresponding set of LSFs. Other one-to-one representations of LP filter coefficients include parcor coefficients; log-area-ratio values; immittance spectral pairs (ISPs); and immittance spectral frequencies (ISFs), which are used in the GSM (Global System for Mobile Communications) AMR-WB (Adaptive Multirate-Wideband) codec. Typically a transform between a set of LP filter coefficients and a corresponding set of LSFs is reversible, but embodiments also include implementations of encoder A120 in which the transform is not reversible without error.

Quantizer 230 is configured to quantize the set of narrowband LSFs (or other coefficient representation), and narrowband encoder A122 is configured to output the result of this quantization as the narrowband filter parameters S40. Such a quantizer typically includes a vector quantizer that encodes the input vector as an index to a corresponding vector entry in a table or codebook.

As seen in FIG. 6, narrowband encoder A122 also generates a residual signal by passing narrowband signal S20 through a whitening filter 260 (also called an analysis or prediction error filter) that is configured according to the set of filter coefficients. In this particular example, whitening filter 260 is implemented as a FIR filter, although IIR implementations may also be used. This residual signal will typically contain perceptually important information of the speech frame, such as long-term structure relating to pitch, that is not represented in narrowband filter parameters S40. Quantizer 270 is configured to calculate a quantized representation of this residual signal for output as encoded narrowband excitation signal S50. Such a quantizer typically includes a vector quantizer that encodes the input vector as an index to a corresponding vector entry in a table or codebook. Alternatively, such a quantizer may be configured to send one or more parameters from which the vector may be generated dynamically at the decoder, rather than retrieved from storage, as in a sparse codebook method. Such a method is used in coding schemes such as algebraic CELP (codebook excitation linear prediction) and codecs such as 3GPP2 (Third Generation Partnership 2) EVRC (Enhanced Variable Rate Codec).

It is desirable for narrowband encoder A120 to generate the encoded narrowband excitation signal according to the same filter parameter values that will be available to the corresponding narrowband decoder. In this manner, the resulting encoded narrowband excitation signal may already account to some extent for nonidealities in those parameter values, such as quantization error. Accordingly, it is desirable to configure the whitening filter using the same coefficient values that will be available at the decoder. In the basic example of encoder A122 as shown in FIG. 6, inverse quantizer 240 dequantizes narrowband coding parameters S40, LSF-to-LP filter coefficient transform 250 maps the resulting values back to a corresponding set of LP filter coefficients, and this set of coefficients is used to configure whitening filter 260 to generate the residual signal that is quantized by quantizer 270.

Some implementations of narrowband encoder A120 are configured to calculate encoded narrowband excitation signal S50 by identifying one among a set of codebook vectors that best matches the residual signal. It is noted, however, that narrowband encoder A120 may also be implemented to calculate a quantized representation of the residual signal without actually generating the residual signal. For example, narrowband encoder A120 may be configured to use a number of codebook vectors to generate corresponding synthesized signals (e.g., according to a current set of filter parameters), and to select the codebook vector associated with the generated signal that best matches the original narrowband signal S20 in a perceptually weighted domain.

Figure 7:
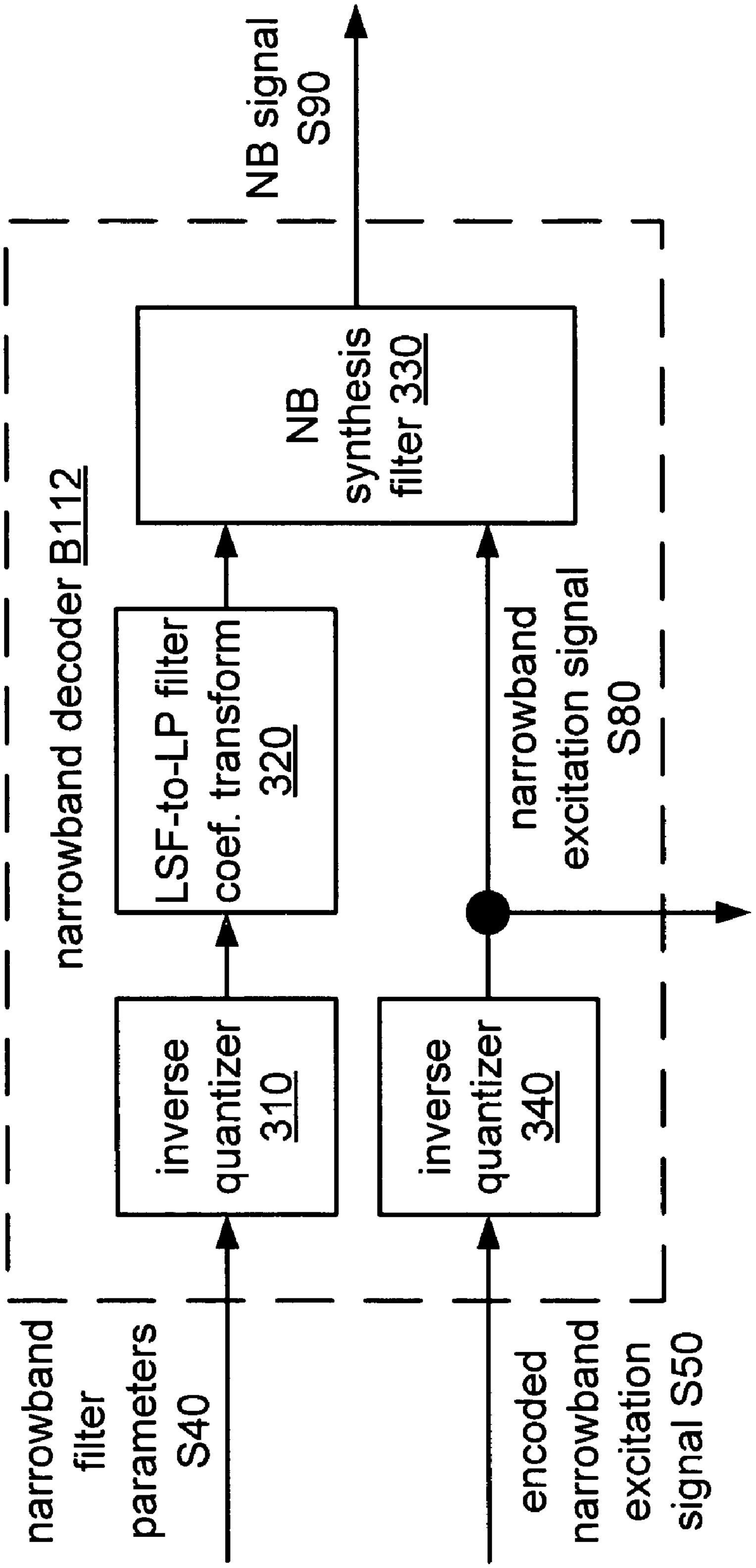
FIG. 7 shows a block diagram of an implementation B112 of narrowband decoder B110.

FIG. 7 shows a block diagram of an implementation B112 of narrowband decoder B110. Inverse quantizer 310 dequantizes narrowband filter parameters S40 (in this case, to a set of LSFs), and LSF-to-LP filter coefficient transform 320 transforms the LSFs into a set of filter coefficients (for example, as described above with reference to inverse quantizer 240 and transform 250 of narrowband encoder A122). Inverse quantizer 340 dequantizes encoded narrowband excitation signal S50 to produce a narrowband excitation signal S80. Based on the filter coefficients and narrowband excitation signal S80, narrowband synthesis filter 330 synthesizes narrowband signal S90. In other words, narrowband synthesis filter 330 is configured to spectrally shape narrowband excitation signal S80 according to the dequantized filter coefficients to produce narrowband signal S90. Narrowband decoder B112 also provides narrowband excitation signal S80 to highband encoder A200, which uses it to derive the highband excitation signal S120 as described herein. In some implementations as described below, narrowband decoder B110 may be configured to provide additional information to highband decoder B200 that relates to the narrowband signal, such as spectral tilt, pitch gain and lag, and speech mode.

The system of narrowband encoder A122 and narrowband decoder B112 is a basic example of an analysis-by-synthesis speech codec. Codebook excitation linear prediction (CELP) coding is one popular family of analysis-by-synthesis coding, and implementations of such coders may perform waveform encoding of the residual, including such operations as selection of entries from fixed and adaptive codebooks, error minimization operations, and/or perceptual weighting operations. Other implementations of analysis-by-synthesis coding include mixed excitation linear prediction (MELP), algebraic CELP (ACELP), relaxation CELP (RCELP), regular pulse excitation (RPE), multi-pulse CELP (MPE), and vector-sum excited linear prediction (VSELP) coding. Related coding methods include multi-band excitation (MBE) and prototype waveform interpolation (PWI) coding. Examples of standardized analysis-by-synthesis speech codecs include the ETSI (European Telecommunications Standards Institute)-GSM full rate codec (GSM 06.10), which uses residual excited linear prediction (RELP); the GSM enhanced full rate codec (ETSI-GSM 06.60); the ITU (International Telecommunication Union) standard 11.8 kb/s G.729 Annex E coder; the IS (Interim Standard)-641 codecs for IS-136 (a time-division multiple access scheme); the GSM adaptive multirate (GSM-AMR) codecs; and the 4 GV™ (Fourth-Generation Vocoder™) codec (QUALCOMM Incorporated, San Diego, Calif.). Narrowband encoder A120 and corresponding decoder B110 may be implemented according to any of these technologies, or any other speech coding technology (whether known or to be developed) that represents a speech signal as (A) a set of parameters that describe a filter and (B) an excitation signal used to drive the described filter to reproduce the speech signal.

Figure 8A:
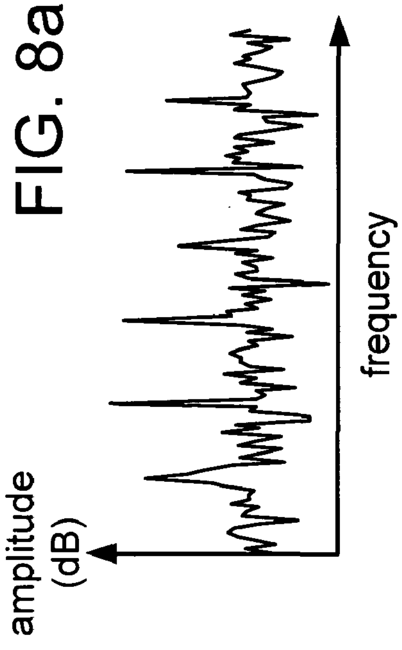
FIG. 8*a* shows an example of a plot of log amplitude vs. frequency for a residual signal for voiced speech.
Figure 8B:
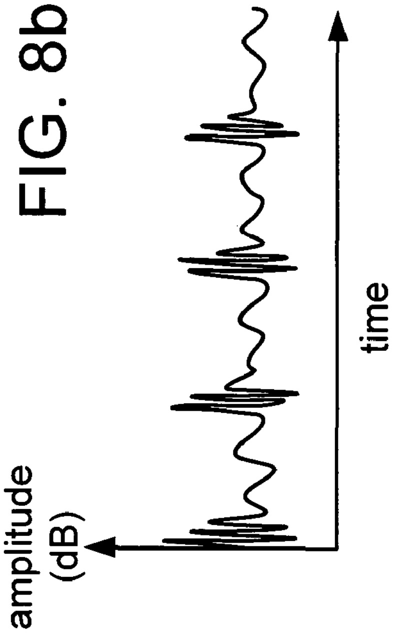
FIG. 8*b* shows an example of a plot of log amplitude vs. time for a residual signal for voiced speech.

Even after the whitening filter has removed the coarse spectral envelope from narrowband signal S20, a considerable amount of fine harmonic structure may remain, especially for voiced speech. FIG. 8*a* shows a spectral plot of one example of a residual signal, as may be produced by a whitening filter, for a voiced signal such as a vowel. The periodic structure visible in this example is related to pitch, and different voiced sounds spoken by the same speaker may have different formant structures but similar pitch structures. FIG. 8*b* shows a time-domain plot of an example of such a residual signal that shows a sequence of pitch pulses in time.

Coding efficiency and/or speech quality may be increased by using one or more parameter values to encode characteristics of the pitch structure. One important characteristic of the pitch structure is the frequency of the first harmonic (also called the fundamental frequency), which is typically in the range of 60 to 400 Hz. This characteristic is typically encoded as the inverse of the fundamental frequency, also called the pitch lag. The pitch lag indicates the number of samples in one pitch period and may be encoded as one or more codebook indices. Speech signals from male speakers tend to have larger pitch lags than speech signals from female speakers.

Another signal characteristic relating to the pitch structure is periodicity, which indicates the strength of the harmonic structure or, in other words, the degree to which the signal is harmonic or nonharmonic. Two typical indicators of periodicity are zero crossings and normalized autocorrelation functions (NACFs). Periodicity may also be indicated by the pitch gain, which is commonly encoded as a codebook gain (e.g., a quantized adaptive codebook gain).

Figure 9:
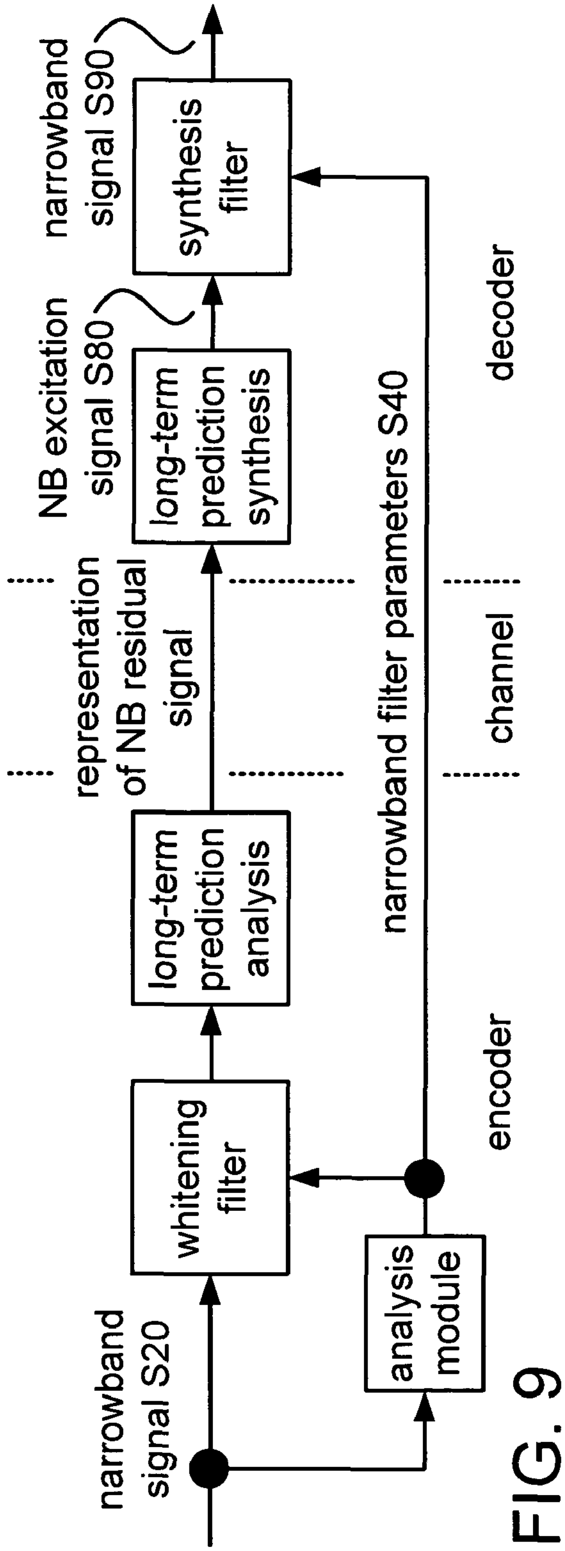
FIG. 9 shows a block diagram of a basic linear prediction coding system that also performs long-term prediction.

Narrowband encoder A120 may include one or more modules configured to encode the long-term harmonic structure of narrowband signal S20. As shown in FIG. 9, one typical CELP paradigm that may be used includes an open-loop LPC analysis module, which encodes the short-term characteristics or coarse spectral envelope, followed by a closed-loop long-term prediction analysis stage, which encodes the fine pitch or harmonic structure. The short-term characteristics are encoded as filter coefficients, and the long-term characteristics are encoded as values for parameters such as pitch lag and pitch gain. For example, narrowband encoder A120 may be configured to output encoded narrowband excitation signal S50 in a form that includes one or more codebook indices (e.g., a fixed codebook index and an adaptive codebook index) and corresponding gain values. Calculation of this quantized representation of the narrowband residual signal (e.g., by quantizer 270) may include selecting such indices and calculating such values. Encoding of the pitch structure may also include interpolation of a pitch prototype waveform, which operation may include calculating a difference between successive pitch pulses. Modeling of the long-term structure may be disabled for frames corresponding to unvoiced speech, which is typically noise-like and unstructured.

An implementation of narrowband decoder B110 according to a paradigm as shown in FIG. 9 may be configured to output narrowband excitation signal S80 to highband decoder B200 after the long-term structure (pitch or harmonic structure) has been restored. For example, such a decoder may be configured to output narrowband excitation signal S80 as a dequantized version of encoded narrowband excitation signal S50. Of course, it is also possible to implement narrowband decoder B110 such that highband decoder B200 performs dequantization of encoded narrowband excitation signal S50 to obtain narrowband excitation signal S80.

In an implementation of wideband speech encoder A100 according to a paradigm as shown in FIG. 9, highband encoder A200 may be configured to receive the narrowband excitation signal as produced by the short-term analysis or whitening filter. In other words, narrowband encoder A120 may be configured to output the narrowband excitation signal to highband encoder A200 before encoding the long-term structure. It is desirable, however, for highband encoder A200 to receive from the narrowband channel the same coding information that will be received by highband decoder B200, such that the coding parameters produced by highband encoder A200 may already account to some extent for nonidealities in that information. Thus it may be preferable for highband encoder A200 to reconstruct narrowband excitation signal S80 from the same parametrized and/or quantized encoded narrowband excitation signal S50 to be output by wideband speech encoder A100. One potential advantage of this approach is more accurate calculation of the highband gain factors S60*b* described below.

In addition to parameters that characterize the short-term and/or long-term structure of narrowband signal S20, narrowband encoder A120 may produce parameter values that relate to other characteristics of narrowband signal S20. These values, which may be suitably quantized for output by wideband speech encoder A100, may be included among the narrowband filter parameters S40 or outputted separately. Highband encoder A200 may also be configured to calculate highband coding parameters S60 according to one or more of these additional parameters (e.g., after dequantization). At wideband speech decoder B100, highband decoder B200 may be configured to receive the parameter values via narrowband decoder B110 (e.g., after dequantization). Alternatively, highband decoder B200 may be configured to receive (and possibly to dequantize) the parameter values directly.

In one example of additional narrowband coding parameters, narrowband encoder A120 produces values for spectral tilt and speech mode parameters for each frame. Spectral tilt relates to the shape of the spectral envelope over the passband and is typically represented by the quantized first reflection coefficient. For most voiced sounds, the spectral energy decreases with increasing frequency, such that the first reflection coefficient is negative and may approach −1. Most unvoiced sounds have a spectrum that is either flat, such that the first reflection coefficient is close to zero, or has more energy at high frequencies, such that the first reflection coefficient is positive and may approach +1.

Speech mode (also called voicing mode) indicates whether the current frame represents voiced or unvoiced speech. This parameter may have a binary value based on one or more measures of periodicity (e.g., zero crossings, NACFs, pitch gain) and/or voice activity for the frame, such as a relation between such a measure and a threshold value. In other implementations, the speech mode parameter has one or more other states to indicate modes such as silence or background noise, or a transition between silence and voiced speech.

Figure 10:
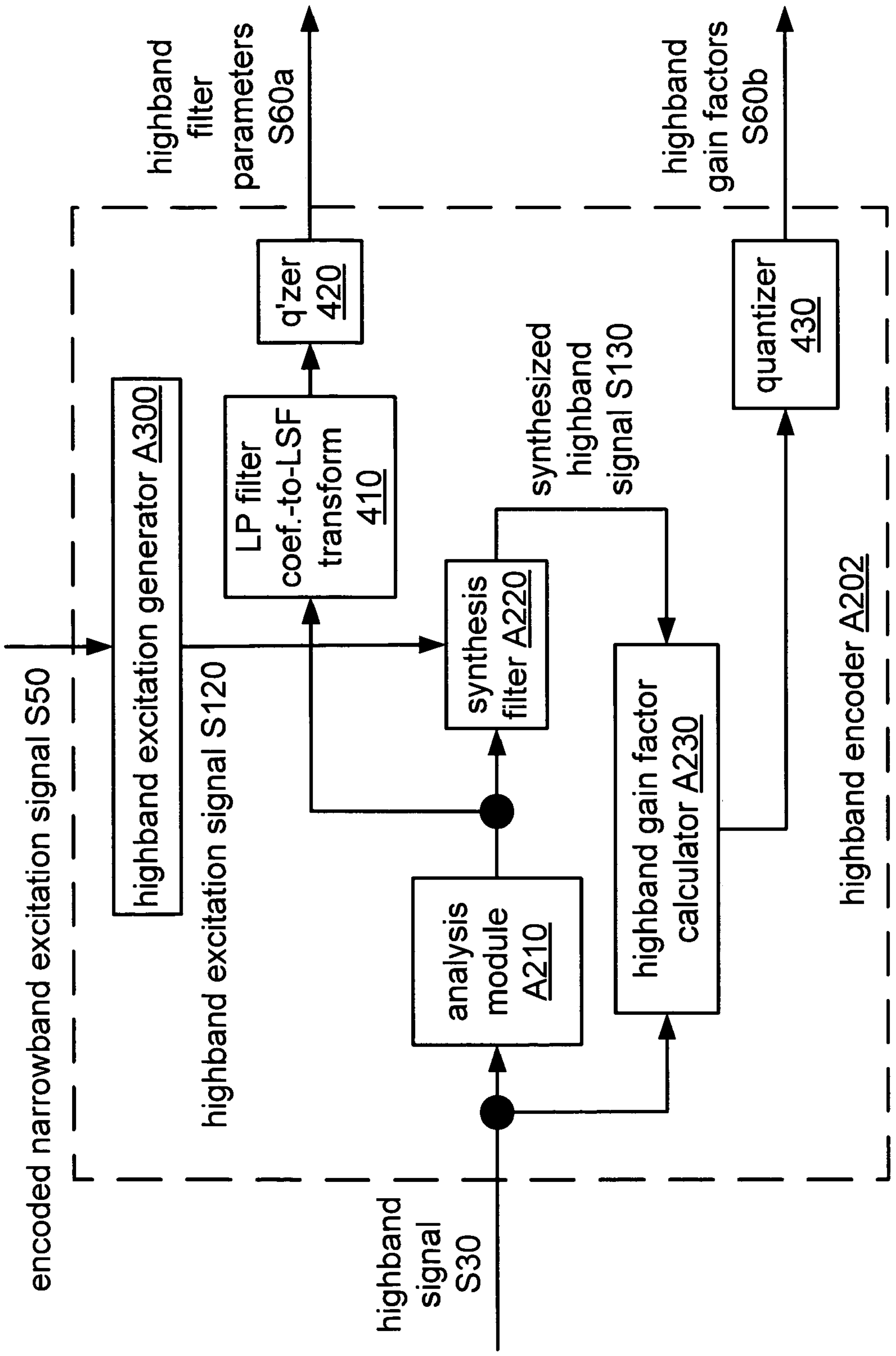
FIG. 10 shows a block diagram of an implementation A202 of highband encoder A200.

Highband encoder A200 is configured to encode highband signal S30 according to a source-filter model, with the excitation for this filter being based on the encoded narrowband excitation signal. FIG. 10 shows a block diagram of an implementation A202 of highband encoder A200 that is configured to produce a stream of highband coding parameters S60 including highband filter parameters S60*a* and highband gain factors S60*b*. Highband excitation generator A300 derives a highband excitation signal S120 from encoded narrowband excitation signal S50. Analysis module A210 produces a set of parameter values that characterize the spectral envelope of highband signal S30. In this particular example, analysis module A210 is configured to perform LPC analysis to produce a set of LP filter coefficients for each frame of highband signal S30. Linear prediction filter coefficient-to-LSF transform 410 transforms the set of LP filter coefficients into a corresponding set of LSFs. As noted above with reference to analysis module 210 and transform 220, analysis module A210 and/or transform 410 may be configured to use other coefficient sets (e.g., cepstral coefficients) and/or coefficient representations (e.g., ISPs).

Quantizer 420 is configured to quantize the set of highband LSFs (or other coefficient representation, such as ISPs), and highband encoder A202 is configured to output the result of this quantization as the highband filter parameters S60*a*. Such a quantizer typically includes a vector quantizer that encodes the input vector as an index to a corresponding vector entry in a table or codebook.

Highband encoder A202 also includes a synthesis filter A220 configured to produce a synthesized highband signal S130 according to highband excitation signal S120 and the encoded spectral envelope (e.g., the set of LP filter coefficients) produced by analysis module A210. Synthesis filter A220 is typically implemented as an IIR filter, although FIR implementations may also be used. In a particular example, synthesis filter A220 is implemented as a sixth-order linear autoregressive filter.

Highband gain factor calculator A230 calculates one or more differences between the levels of the original highband signal S30 and synthesized highband signal S130 to specify a gain envelope for the frame. Quantizer 430, which may be implemented as a vector quantizer that encodes the input vector as an index to a corresponding vector entry in a table or codebook, quantizes the value or values specifying the gain envelope, and highband encoder A202 is configured to output the result of this quantization as highband gain factors S60*b*.

In an implementation as shown in FIG. 10, synthesis filter A220 is arranged to receive the filter coefficients from analysis module A210. An alternative implementation of highband encoder A202 includes an inverse quantizer and inverse transform configured to decode the filter coefficients from highband filter parameters S60*a*, and in this case synthesis filter A220 is arranged to receive the decoded filter coefficients instead. Such an alternative arrangement may support more accurate calculation of the gain envelope by highband gain calculator A230.

In one particular example, analysis module A210 and highband gain calculator A230 output a set of six LSFs and a set of five gain values per frame, respectively, such that a wideband extension of the narrowband signal S20 may be achieved with only eleven additional values per frame. The ear tends to be less sensitive to frequency errors at high frequencies, such that highband coding at a low LPC order may produce a signal having a comparable perceptual quality to narrowband coding at a higher LPC order. A typical implementation of highband encoder A200 may be configured to output 8 to 12 bits per frame for high-quality reconstruction of the spectral envelope and another 8 to 12 bits per frame for high-quality reconstruction of the temporal envelope. In another particular example, analysis module A210 outputs a set of eight LSFs per frame.

Some implementations of highband encoder A200 are configured to produce highband excitation signal S120 by generating a random noise signal having highband frequency components and amplitude-modulating the noise signal according to the time-domain envelope of narrowband signal S20, narrowband excitation signal S80, or highband signal S30. While such a noise-based method may produce adequate results for unvoiced sounds, however, it may not be desirable for voiced sounds, whose residuals are usually harmonic and consequently have some periodic structure.

Figure 11:
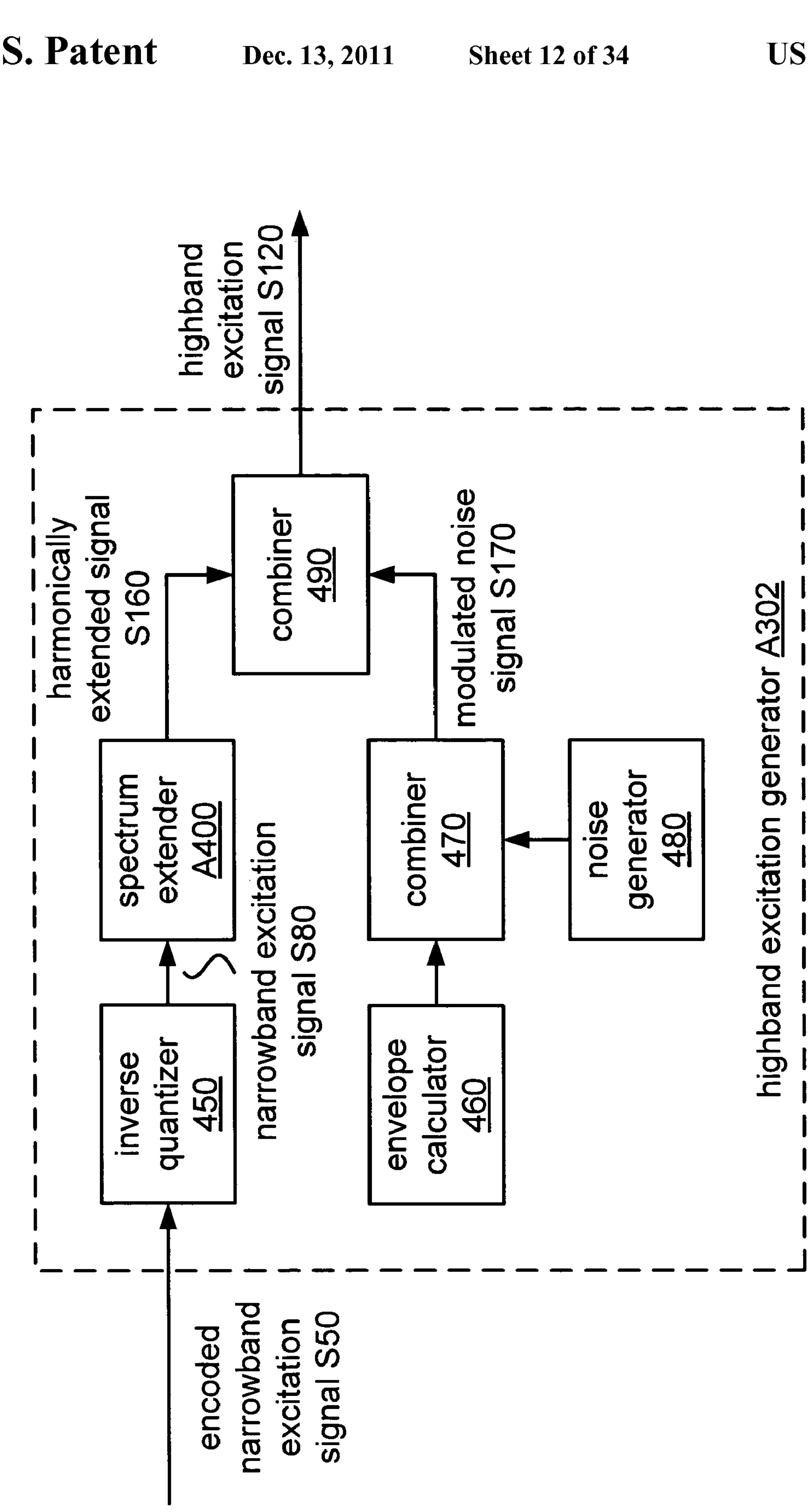
FIG. 11 shows a block diagram of an implementation A302 of highband excitation generator A300.

Highband excitation generator A300 is configured to generate highband excitation signal S120 by extending the spectrum of narrowband excitation signal S80 into the highband frequency range. FIG. 11 shows a block diagram of an implementation A302 of highband excitation generator A300. Inverse quantizer 450 is configured to dequantize encoded narrowband excitation signal S50 to produce narrowband excitation signal S80. Spectrum extender A400 is configured to produce a harmonically extended signal S160 based on narrowband excitation signal S80. Combiner 470 is configured to combine a random noise signal generated by noise generator 480 and a time-domain envelope calculated by envelope calculator 460 to produce a modulated noise signal S170. Combiner 490 is configured to mix harmonically extended signal S160 and modulated noise signal S170 to produce highband excitation signal S120.

In one example, spectrum extender A400 is configured to perform a spectral folding operation (also called mirroring) on narrowband excitation signal S80 to produce harmonically extended signal S160. Spectral folding may be performed by zero-stuffing excitation signal S80 and then applying a highpass filter to retain the alias. In another example, spectrum extender A400 is configured to produce harmonically extended signal S160 by spectrally translating narrowband excitation signal S80 into the highband (e.g., via upsampling followed by multiplication with a constant-frequency cosine signal).

Spectral folding and translation methods may produce spectrally extended signals whose harmonic structure is discontinuous with the original harmonic structure of narrowband excitation signal S80 in phase and/or frequency. For example, such methods may produce signals having peaks that are not generally located at multiples of the fundamental frequency, which may cause tinny-sounding artifacts in the reconstructed speech signal. These methods also tend to produce high-frequency harmonics that have unnaturally strong tonal characteristics. Moreover, because a PSTN signal may be sampled at 8 kHz but bandlimited to no more than 3400 Hz, the upper spectrum of narrowband excitation signal S80 may contain little or no energy, such that an extended signal generated according to a spectral folding or spectral translation operation may have a spectral hole above 3400 Hz.

Other methods of generating harmonically extended signal S160 include identifying one or more fundamental frequencies of narrowband excitation signal S80 and generating harmonic tones according to that information. For example, the harmonic structure of an excitation signal may be characterized by the fundamental frequency together with amplitude and phase information. Another implementation of highband excitation generator A300 generates a harmonically extended signal S160 based on the fundamental frequency and amplitude (as indicated, for example, by the pitch lag and pitch gain). Unless the harmonically extended signal is phase-coherent with narrowband excitation signal S80, however, the quality of the resulting decoded speech may not be acceptable.

A nonlinear function may be used to create a highband excitation signal that is phase-coherent with the narrowband excitation and preserves the harmonic structure without phase discontinuity. A nonlinear function may also provide an increased noise level between high-frequency harmonics, which tends to sound more natural than the tonal high-frequency harmonics produced by methods such as spectral folding and spectral translation. Typical memoryless nonlinear functions that may be applied by various implementations of spectrum extender A400 include the absolute value function (also called fullwave rectification), halfwave rectification, squaring, cubing, and clipping. Other implementations of spectrum extender A400 may be configured to apply a nonlinear function having memory.

Figure 12:
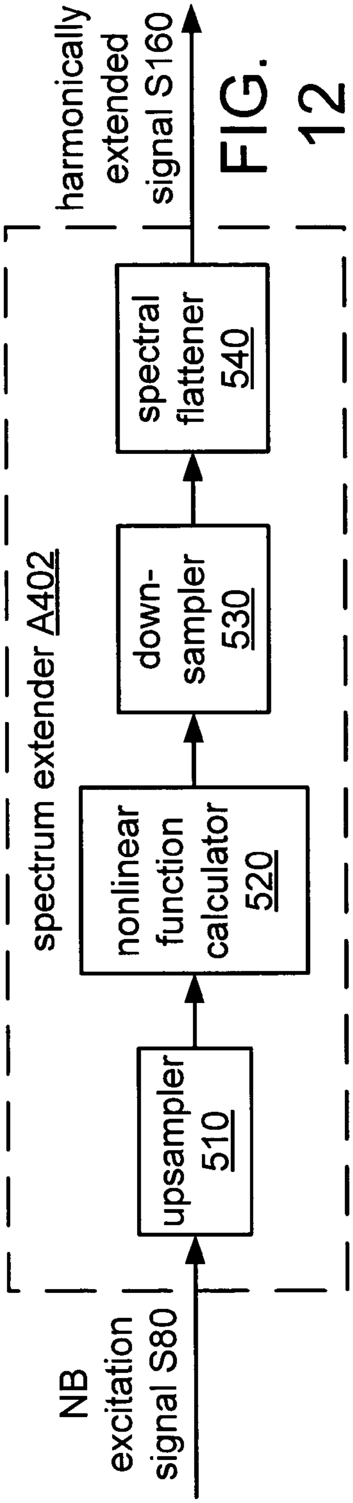
FIG. 12 shows a block diagram of an implementation A402 of spectrum extender A400.

FIG. 12 is a block diagram of an implementation A402 of spectrum extender A400 that is configured to apply a nonlinear function to extend the spectrum of narrowband excitation signal S80. Upsampler 510 is configured to upsample narrowband excitation signal S80. It may be desirable to upsample the signal sufficiently to minimize aliasing upon application of the nonlinear function. In one particular example, upsampler 510 upsamples the signal by a factor of eight. Upsampler 510 may be configured to perform the upsampling operation by zero-stuffing the input signal and lowpass filtering the result. Nonlinear function calculator 520 is configured to apply a nonlinear function to the upsampled signal. One potential advantage of the absolute value function over other nonlinear functions for spectral extension, such as squaring, is that energy normalization is not needed. In some implementations, the absolute value function may be applied efficiently by stripping or clearing the sign bit of each sample. Nonlinear function calculator 520 may also be configured to perform an amplitude warping of the upsampled or spectrally extended signal.

Downsampler 530 is configured to downsample the spectrally extended result of applying the nonlinear function. It may be desirable for downsampler 530 to perform a bandpass filtering operation to select a desired frequency band of the spectrally extended signal before reducing the sampling rate (for example, to reduce or avoid aliasing or corruption by an unwanted image). It may also be desirable for downsampler 530 to reduce the sampling rate in more than one stage.

Figure 12A:
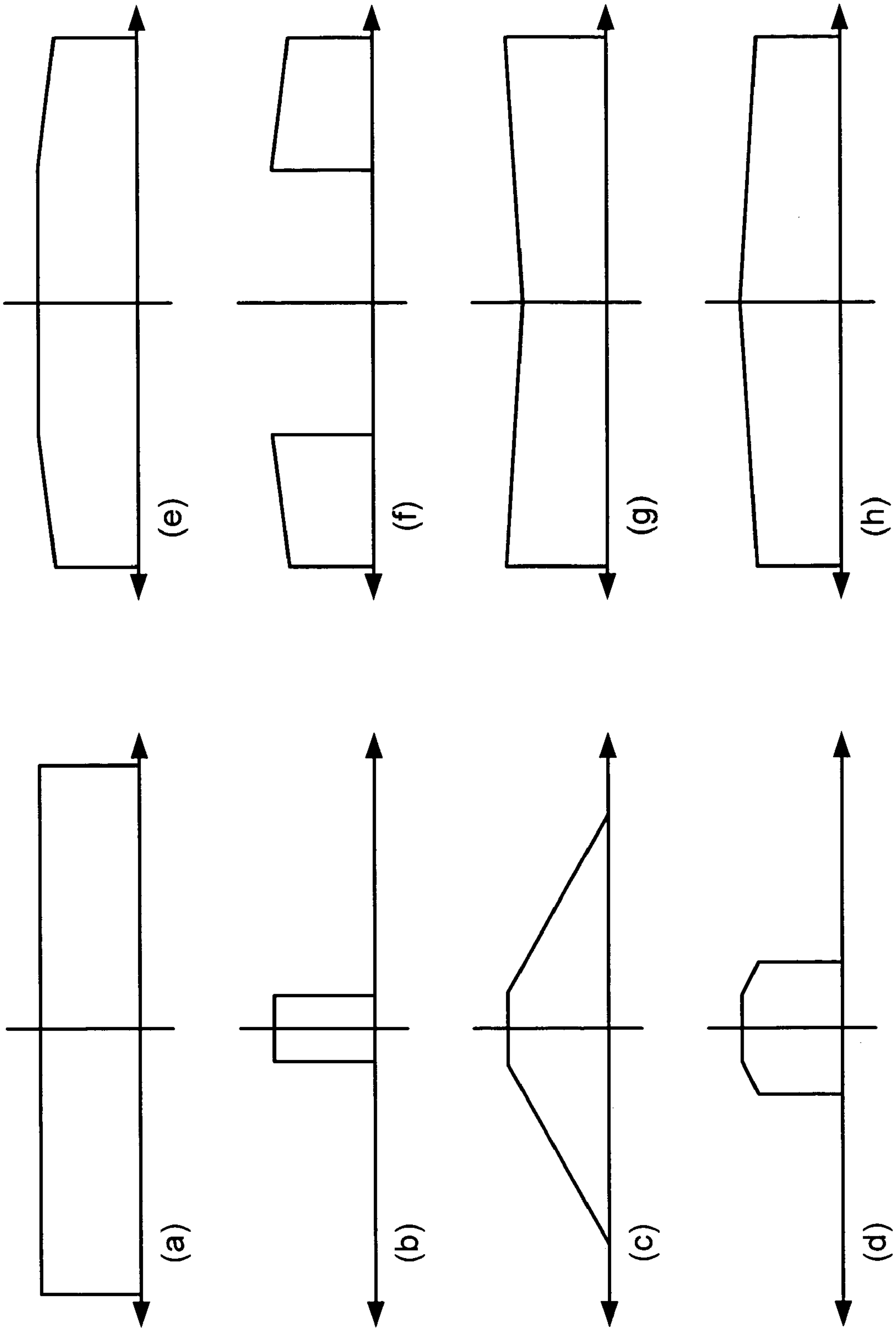
FIG. 12*a* shows plots of signal spectra at various points in one example of a spectral extension operation.

FIG. 12*a* is a diagram that shows the signal spectra at various points in one example of a spectral extension operation, where the frequency scale is the same across the various plots. Plot (a) shows the spectrum of one example of narrowband excitation signal S80. Plot (b) shows the spectrum after signal S80 has been upsampled by a factor of eight. Plot (c) shows an example of the extended spectrum after application of a nonlinear function. Plot (d) shows the spectrum after lowpass filtering. In this example, the passband extends to the upper frequency limit of highband signal S30 (e.g., 7 kHz or 8 kHz).

Plot (e) shows the spectrum after a first stage of downsampling, in which the sampling rate is reduced by a factor of four to obtain a wideband signal. Plot (f) shows the spectrum after a highpass filtering operation to select the highband portion of the extended signal, and plot (g) shows the spectrum after a second stage of downsampling, in which the sampling rate is reduced by a factor of two. In one particular example, downsampler 530 performs the highpass filtering and second stage of downsampling by passing the wideband signal through highpass filter 130 and downsampler 140 of filter bank A112 (or other structures or routines having the same response) to produce a spectrally extended signal having the frequency range and sampling rate of highband signal S30.

As may be seen in plot (g), downsampling of the highpass signal shown in plot (f) causes a reversal of its spectrum. In this example, downsampler 530 is also configured to perform a spectral flipping operation on the signal. Plot (h) shows a result of applying the spectral flipping operation, which may be performed by multiplying the signal with the function $e^{jn\pi}$ or the sequence $(-1)^n$, whose values alternate between +1 and −1. Such an operation is equivalent to shifting the digital spectrum of the signal in the frequency domain by a distance of π, It is noted that the same result may also be obtained by applying the downsampling and spectral flipping operations in a different order. The operations of upsampling and/or downsampling may also be configured to include resampling to obtain a spectrally extended signal having the sampling rate of highband signal S30 (e.g., 7 kHz).

As noted above, filter banks A110 and B120 may be implemented such that one or both of the narrowband and highband signals S20, S30 has a spectrally reversed form at the output of filter bank A110, is encoded and decoded in the spectrally reversed form, and is spectrally reversed again at filter bank B120 before being output in wideband speech signal S110. In such case, of course, a spectral flipping operation as shown in FIG. 12*a* would not be necessary, as it would be desirable for highband excitation signal S120 to have a spectrally reversed form as well.

Figure 12B:
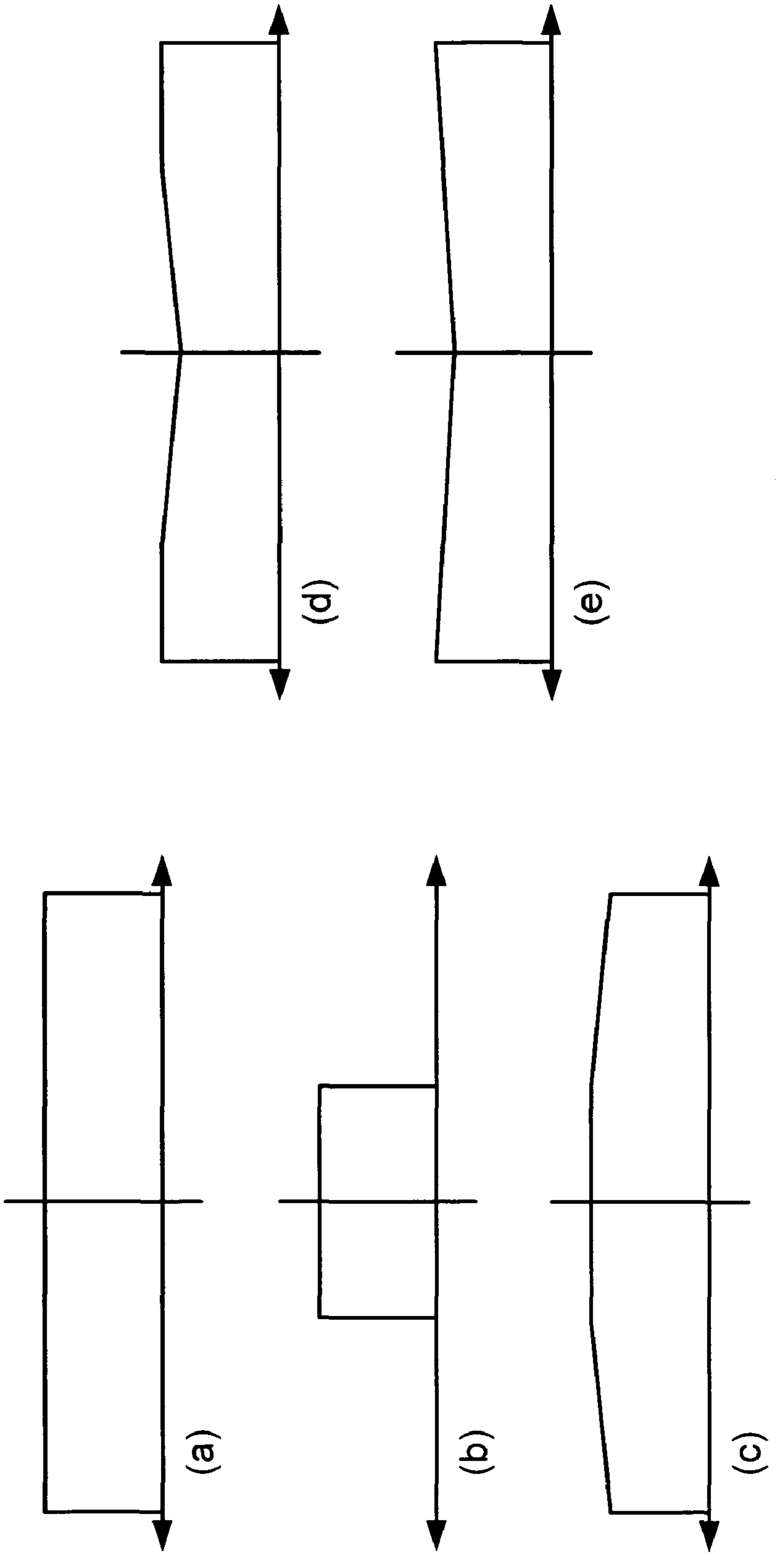
FIG. 12*b* shows plots of signal spectra at various points in another example of a spectral extension operation.

The various tasks of upsampling and downsampling of a spectral extension operation as performed by spectrum extender A402 may be configured and arranged in many different ways. For example, FIG. 12*b* is a diagram that shows the signal spectra at various points in another example of a spectral extension operation, where the frequency scale is the same across the various plots. Plot (a) shows the spectrum of one example of narrowband excitation signal S80. Plot (b) shows the spectrum after signal S80 has been upsampled by a factor of two. Plot (c) shows an example of the extended spectrum after application of a nonlinear function. In this case, aliasing that may occur in the higher frequencies is accepted.

Plot (d) shows the spectrum after a spectral reversal operation. Plot (e) shows the spectrum after a single stage of downsampling, in which the sampling rate is reduced by a factor of two to obtain the desired spectrally extended signal. In this example, the signal is in spectrally reversed form and may be used in an implementation of highband encoder A200 which processed highband signal S30 in such a form.

The spectrally extended signal produced by nonlinear function calculator 520 is likely to have a pronounced dropoff in amplitude as frequency increases. Spectral extender A402 includes a spectral flattener 540 configured to perform a whitening operation on the downsampled signal. Spectral flattener 540 may be configured to perform a fixed whitening operation or to perform an adaptive whitening operation. In a particular example of adaptive whitening, spectral flattener 540 includes an LPC analysis module configured to calculate a set of four filter coefficients from the downsampled signal and a fourth-order analysis filter configured to whiten the signal according to those coefficients. Other implementations of spectrum extender A400 include configurations in which spectral flattener 540 operates on the spectrally extended signal before downsampler 530.

Highband excitation generator A300 may be implemented to output harmonically extended signal S160 as highband excitation signal S120. In some cases, however, using only a harmonically extended signal as the highband excitation may result in audible artifacts. The harmonic structure of speech is generally less pronounced in the highband than in the low band, and using too much harmonic structure in the highband excitation signal can result in a buzzy sound. This artifact may be especially noticeable in speech signals from female speakers.

Embodiments include implementations of highband excitation generator A300 that are configured to mix harmonically extended signal S160 with a noise signal. As shown in FIG. 11, highband excitation generator A302 includes a noise generator 480 that is configured to produce a random noise signal. In one example, noise generator 480 is configured to produce a unit-variance white pseudorandom noise signal, although in other implementations the noise signal need not be white and may have a power density that varies with frequency. It may be desirable for noise generator 480 to be configured to output the noise signal as a deterministic function such that its state may be duplicated at the decoder. For example, noise generator 480 may be configured to output the noise signal as a deterministic function of information coded earlier within the same frame, such as the narrowband filter parameters S40 and/or encoded narrowband excitation signal S50.

Before being mixed with harmonically extended signal S160, the random noise signal produced by noise generator 480 may be amplitude-modulated to have a time-domain envelope that approximates the energy distribution over time of narrowband signal S20, highband signal S30, narrowband excitation signal S80, or harmonically extended signal S160. As shown in FIG. 11, highband excitation generator A302 includes a combiner 470 configured to amplitude-modulate the noise signal produced by noise generator 480 according to a time-domain envelope calculated by envelope calculator 460. For example, combiner 470 may be implemented as a multiplier arranged to scale the output of noise generator 480 according to the time-domain envelope calculated by envelope calculator 460 to produce modulated noise signal S170.

Figure 13:
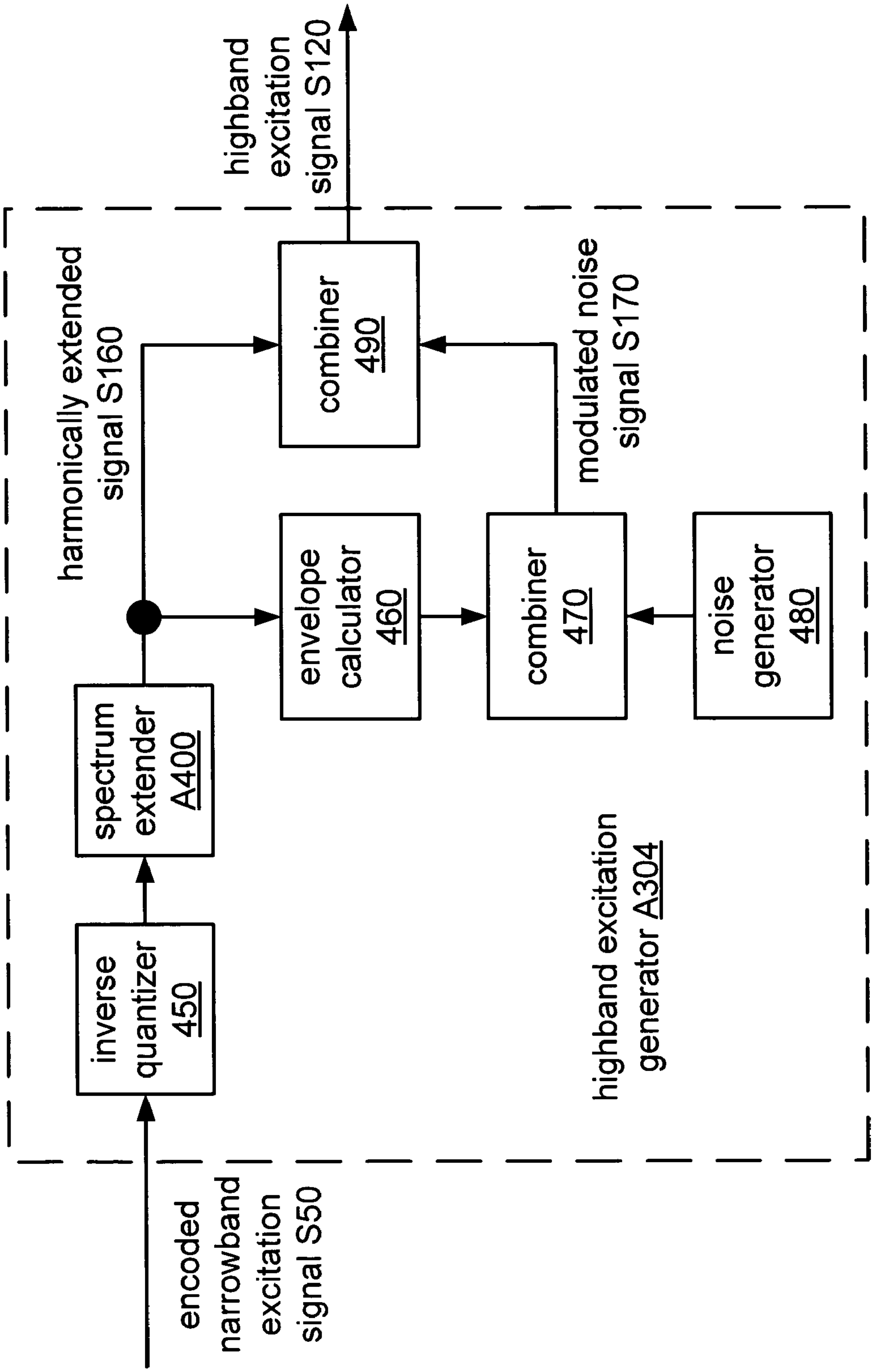
FIG. 13 shows a block diagram of an implementation A304 of highband excitation generator A302.
Figure 14:
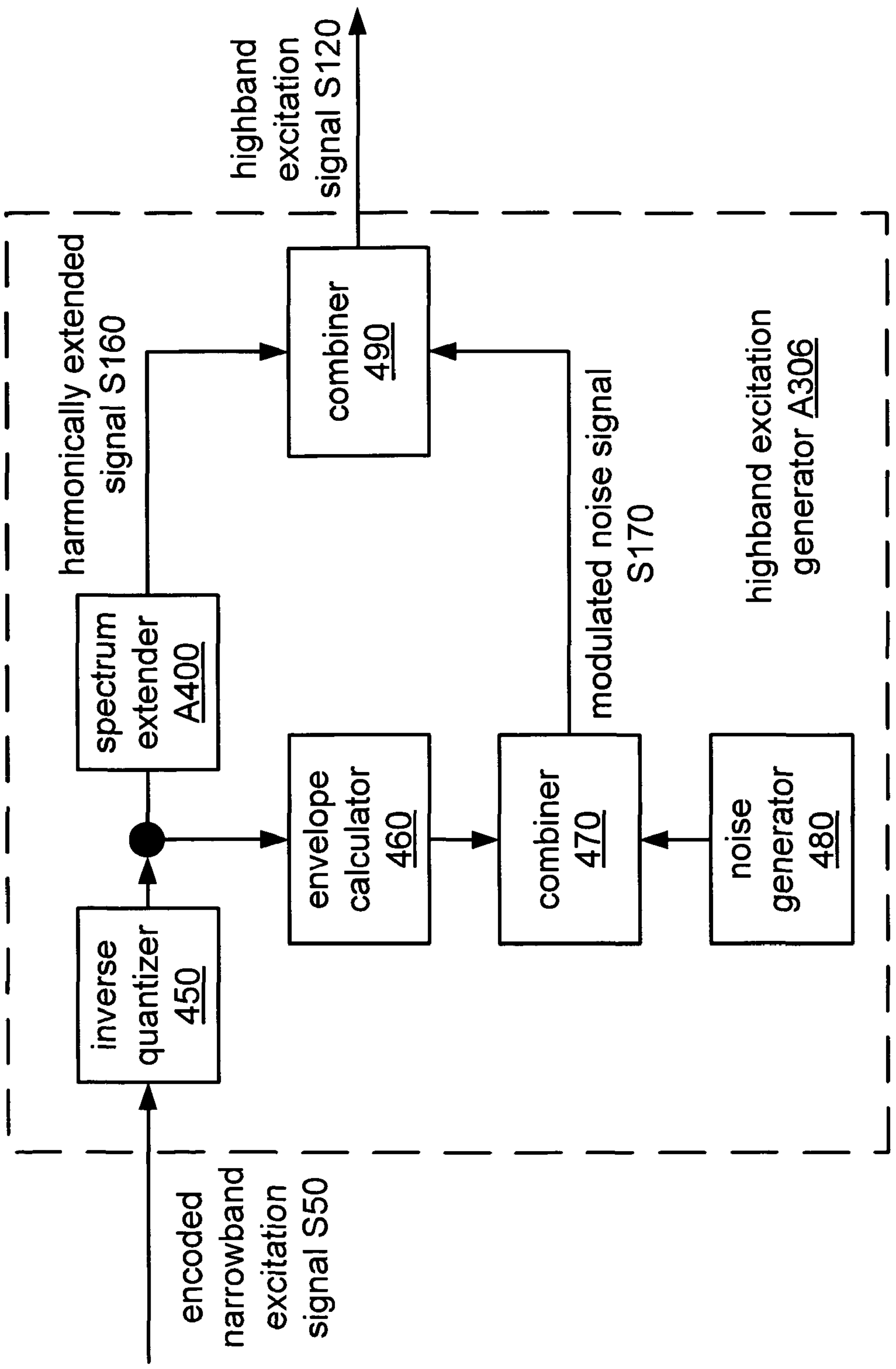
FIG. 14 shows a block diagram of an implementation A306 of highband excitation generator A302.

In an implementation A304 of highband excitation generator A302, as shown in the block diagram of FIG. 13, envelope calculator 460 is arranged to calculate the envelope of harmonically extended signal S160. In an implementation A306 of highband excitation generator A302, as shown in the block diagram of FIG. 14, envelope calculator 460 is arranged to calculate the envelope of narrowband excitation signal S80. Further implementations of highband excitation generator A302 may be otherwise configured to add noise to harmonically extended signal S160 according to locations of the narrowband pitch pulses in time.

Figure 15:
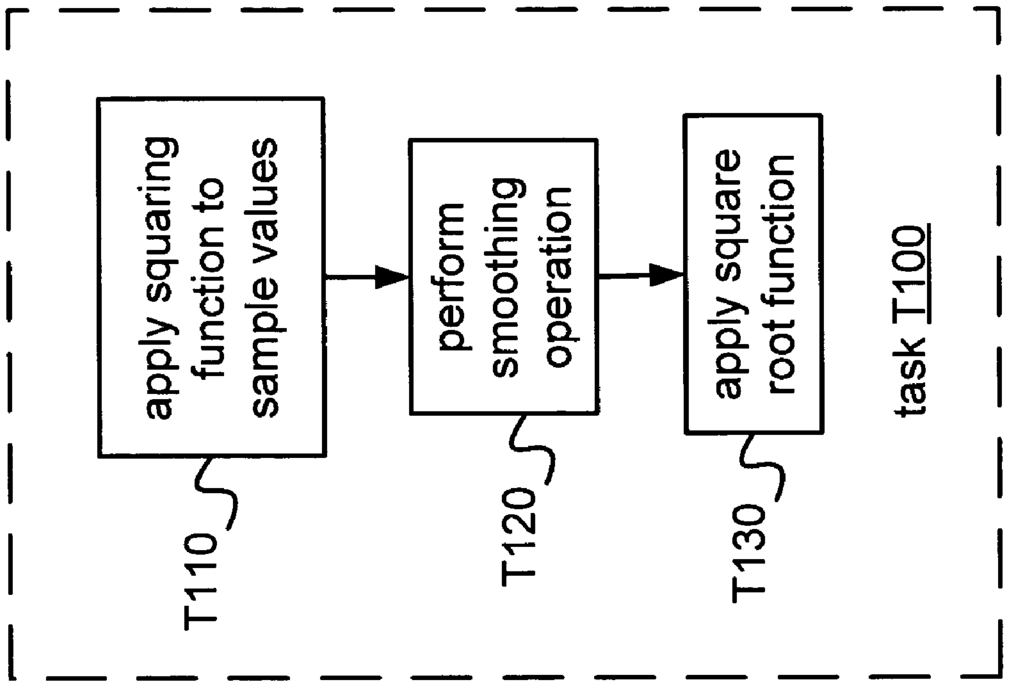
FIG. 15 shows a flowchart for an envelope calculation task T100.

Envelope calculator 460 may be configured to perform an envelope calculation as a task that includes a series of subtasks. FIG. 15 shows a flowchart of an example T100 of such a task. Subtask T110 calculates the square of each sample of the frame of the signal whose envelope is to be modeled (for example, narrowband excitation signal S80 or harmonically extended signal S160) to produce a sequence of squared values. Subtask T120 performs a smoothing operation on the sequence of squared values. In one example, subtask T120 applies a first-order IIR lowpass filter to the sequence according to the expression $$y(n)=ax(n)+(1-a)y(n-1), \tag{1}$$

where x is the filter input, y is the filter output, n is a time-domain index, and a is a smoothing coefficient having a value between 0.5 and 1. The value of the smoothing coefficient a may be fixed or, in an alternative implementation, may be adaptive according to an indication of noise in the input signal, such that a is closer to 1 in the absence of noise and closer to 0.5 in the presence of noise. Subtask T130 applies a square root function to each sample of the smoothed sequence to produce the time-domain envelope.

Such an implementation of envelope calculator 460 may be configured to perform the various subtasks of task T100 in serial and/or parallel fashion. In further implementations of task T100, subtask T110 may be preceded by a bandpass operation configured to select a desired frequency portion of the signal whose envelope is to be modeled, such as the range of 3-4 kHz.

Combiner 490 is configured to mix harmonically extended signal S160 and modulated noise signal S170 to produce highband excitation signal S120. Implementations of combiner 490 may be configured, for example, to calculate highband excitation signal S120 as a sum of harmonically extended signal S160 and modulated noise signal S170. Such an implementation of combiner 490 may be configured to calculate highband excitation signal S120 as a weighted sum by applying a weighting factor to harmonically extended signal S160 and/or to modulated noise signal S170 before the summation. Each such weighting factor may be calculated according to one or more criteria and may be a fixed value or, alternatively, an adaptive value that is calculated on a frame-by-frame or subframe-by-subframe basis.

Figure 16:
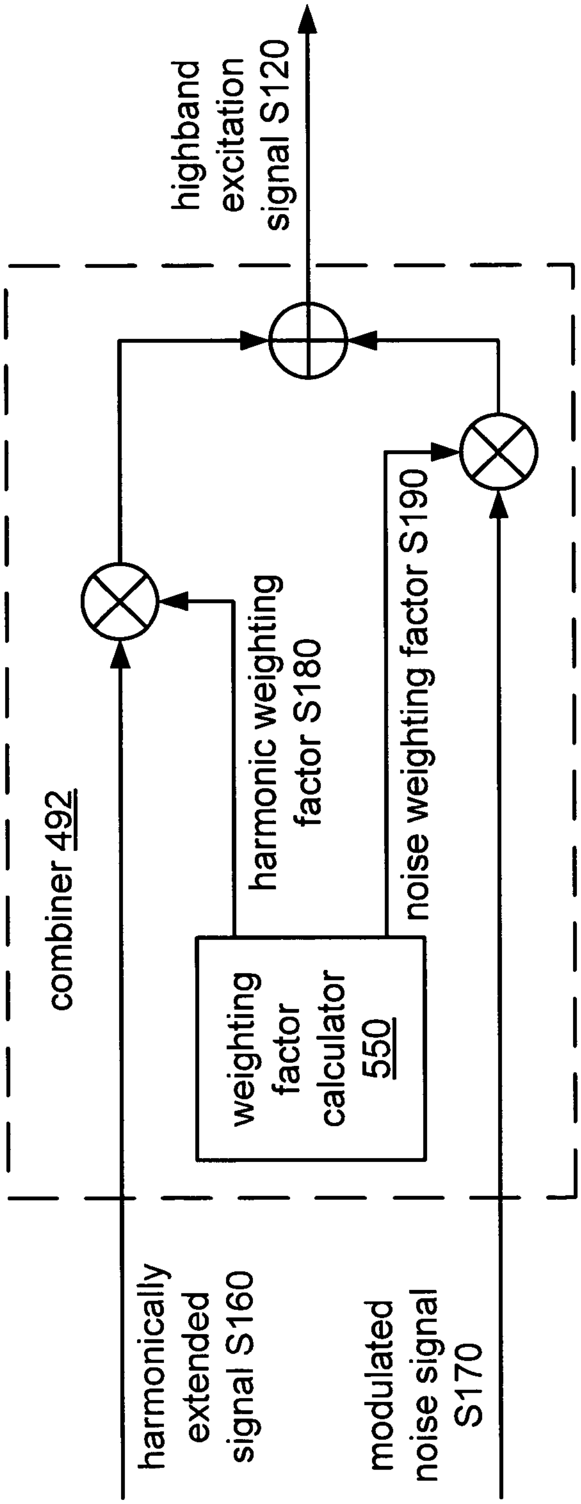
FIG. 16 shows a block diagram of an implementation 492 of combiner 490.

FIG. 16 shows a block diagram of an implementation 492 of combiner 490 that is configured to calculate highband excitation signal S120 as a weighted sum of harmonically extended signal S160 and modulated noise signal S170. Combiner 492 is configured to weight harmonically extended signal S160 according to harmonic weighting factor S180, to weight modulated noise signal S170 according to noise weighting factor S190, and to output highband excitation signal S120 as a sum of the weighted signals. In this example, combiner 492 includes a weighting factor calculator 550 that is configured to calculate harmonic weighting factor S180 and noise weighting factor S190.

Weighting factor calculator 550 may be configured to calculate weighting factors S180 and S190 according to a desired ratio of harmonic content to noise content in highband excitation signal S120. For example, it may be desirable for combiner 492 to produce highband excitation signal S120 to have a ratio of harmonic energy to noise energy similar to that of highband signal S30. In some implementations of weighting factor calculator 550, weighting factors S180, S190 are calculated according to one or more parameters relating to a periodicity of narrowband signal S20 or of the narrowband residual signal, such as pitch gain and/or speech mode. Such an implementation of weighting factor calculator 550 may be configured to assign a value to harmonic weighting factor S180 that is proportional to the pitch gain, for example, and/or to assign a higher value to noise weighting factor S190 for unvoiced speech signals than for voiced speech signals.

Figure 17:
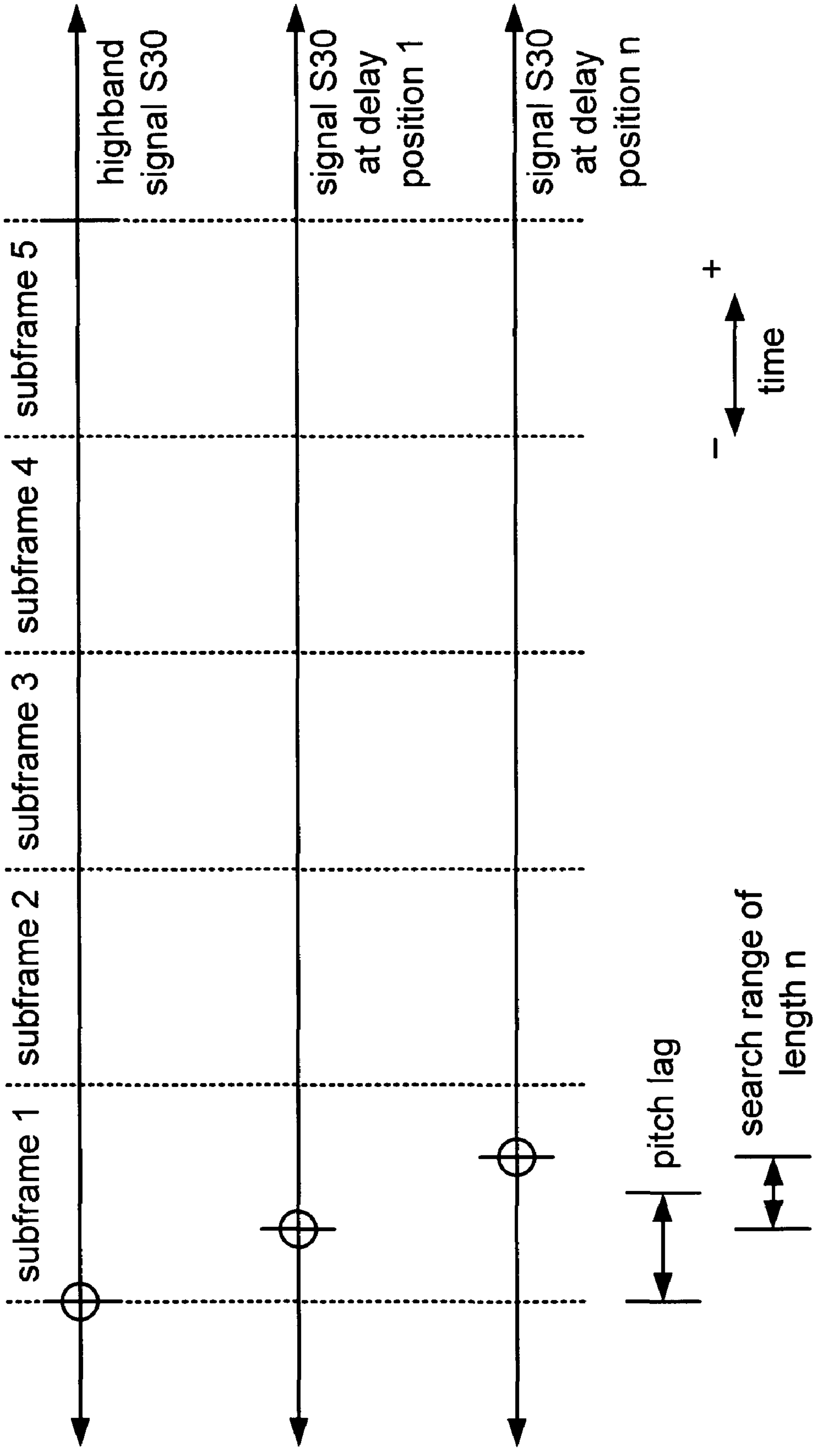
FIG. 17 illustrates an approach to calculating a measure of periodicity of highband signal S30.

In other implementations, weighting factor calculator 550 is configured to calculate values for harmonic weighting factor S180 and/or noise weighting factor S190 according to a measure of periodicity of highband signal S30. In one such example, weighting factor calculator 550 calculates harmonic weighting factor S180 as the maximum value of the autocorrelation coefficient of highband signal S30 for the current frame or subframe, where the autocorrelation is performed over a search range that includes a delay of one pitch lag and does not include a delay of zero samples. FIG. 17 shows an example of such a search range of length n samples that is centered about a delay of one pitch lag and has a width not greater than one pitch lag.

FIG. 17 also shows an example of another approach in which weighting factor calculator 550 calculates a measure of periodicity of highband signal S30 in several stages. In a first stage, the current frame is divided into a number of subframes, and the delay for which the autocorrelation coefficient is maximum is identified separately for each subframe. As mentioned above, the autocorrelation is performed over a search range that includes a delay of one pitch lag and does not include a delay of zero samples.

In a second stage, a delayed frame is constructed by applying the corresponding identified delay to each subframe, concatenating the resulting subframes to construct an optimally delayed frame, and calculating harmonic weighting factor S180 as the correlation coefficient between the original frame and the optimally delayed frame. In a further alternative, weighting factor calculator 550 calculates harmonic weighting factor S180 as an average of the maximum autocorrelation coefficients obtained in the first stage for each subframe. Implementations of weighting factor calculator 550 may also be configured to scale the correlation coefficient, and/or to combine it with another value, to calculate the value for harmonic weighting factor S180.

It may be desirable for weighting factor calculator 550 to calculate a measure of periodicity of highband signal S30 only in cases where a presence of periodicity in the frame is otherwise indicated. For example, weighting factor calculator 550 may be configured to calculate a measure of periodicity of highband signal S30 according to a relation between another indicator of periodicity of the current frame, such as pitch gain, and a threshold value. In one example, weighting factor calculator 550 is configured to perform an autocorrelation operation on highband signal S30 only if the frame's pitch gain (e.g., the adaptive codebook gain of the narrowband residual) has a value of more than 0.5 (alternatively, at least 0.5). In another example, weighting factor calculator 550 is configured to perform an autocorrelation operation on highband signal S30 only for frames having particular states of speech mode (e.g., only for voiced signals). In such cases, weighting factor calculator 550 may be configured to assign a default weighting factor for frames having other states of speech mode and/or lesser values of pitch gain.

Embodiments include further implementations of weighting factor calculator 550 that are configured to calculate weighting factors according to characteristics other than or in addition to periodicity. For example, such an implementation may be configured to assign a higher value to noise gain factor S190 for speech signals having a large pitch lag than for speech signals having a small pitch lag. Another such implementation of weighting factor calculator 550 is configured to determine a measure of harmonicity of wideband speech signal S10, or of highband signal S30, according to a measure of the energy of the signal at multiples of the fundamental frequency relative to the energy of the signal at other frequency components.

Some implementations of wideband speech encoder A100 are configured to output an indication of periodicity or harmonicity (e.g. a one-bit flag indicating whether the frame is harmonic or nonharmonic) based on the pitch gain and/or another measure of periodicity or harmonicity as described herein. In one example, a corresponding wideband speech decoder B100 uses this indication to configure an operation such as weighting factor calculation. In another example, such an indication is used at the encoder and/or decoder in calculating a value for a speech mode parameter.

It may be desirable for highband excitation generator A302 to generate highband excitation signal S120 such that the energy of the excitation signal is substantially unaffected by the particular values of weighting factors S180 and S190. In such case, weighting factor calculator 550 may be configured to calculate a value for harmonic weighting factor S180 or for noise weighting factor S190 (or to receive such a value from storage or another element of highband encoder A200) and to derive a value for the other weighting factor according to an expression such as $$(W_{harmonic})^2+(W_{noise})^2=1, \tag{2}$$

where $W_{harmonic}$ denotes harmonic weighting factor S180 and $W_{noise}$ denotes noise weighting factor S190. Alternatively, weighting factor calculator 550 may be configured to select, according to a value of a periodicity measure for the current frame or subframe, a corresponding one among a plurality of pairs of weighting factors S180, S190, where the pairs are precalculated to satisfy a constant-energy ratio such as expression (2). For an implementation of weighting factor calculator 550 in which expression (2) is observed, typical values for harmonic weighting factor S180 range from about 0.7 to about 1.0, and typical values for noise weighting factor S190 range from about 0.1 to about 0.7. Other implementations of weighting factor calculator 550 may be configured to operate according to a version of expression (2) that is modified according to a desired baseline weighting between harmonically extended signal S1160 and modulated noise signal S170.

Artifacts may occur in a synthesized speech signal when a sparse codebook (one whose entries are mostly zero values) has been used to calculate the quantized representation of the residual. Codebook sparseness occurs especially when the narrowband signal is encoded at a low bit rate. Artifacts caused by codebook sparseness are typically quasi-periodic in time and occur mostly above 3 kHz. Because the human ear has better time resolution at higher frequencies, these artifacts may be more noticeable in the highband.

Figure 18:
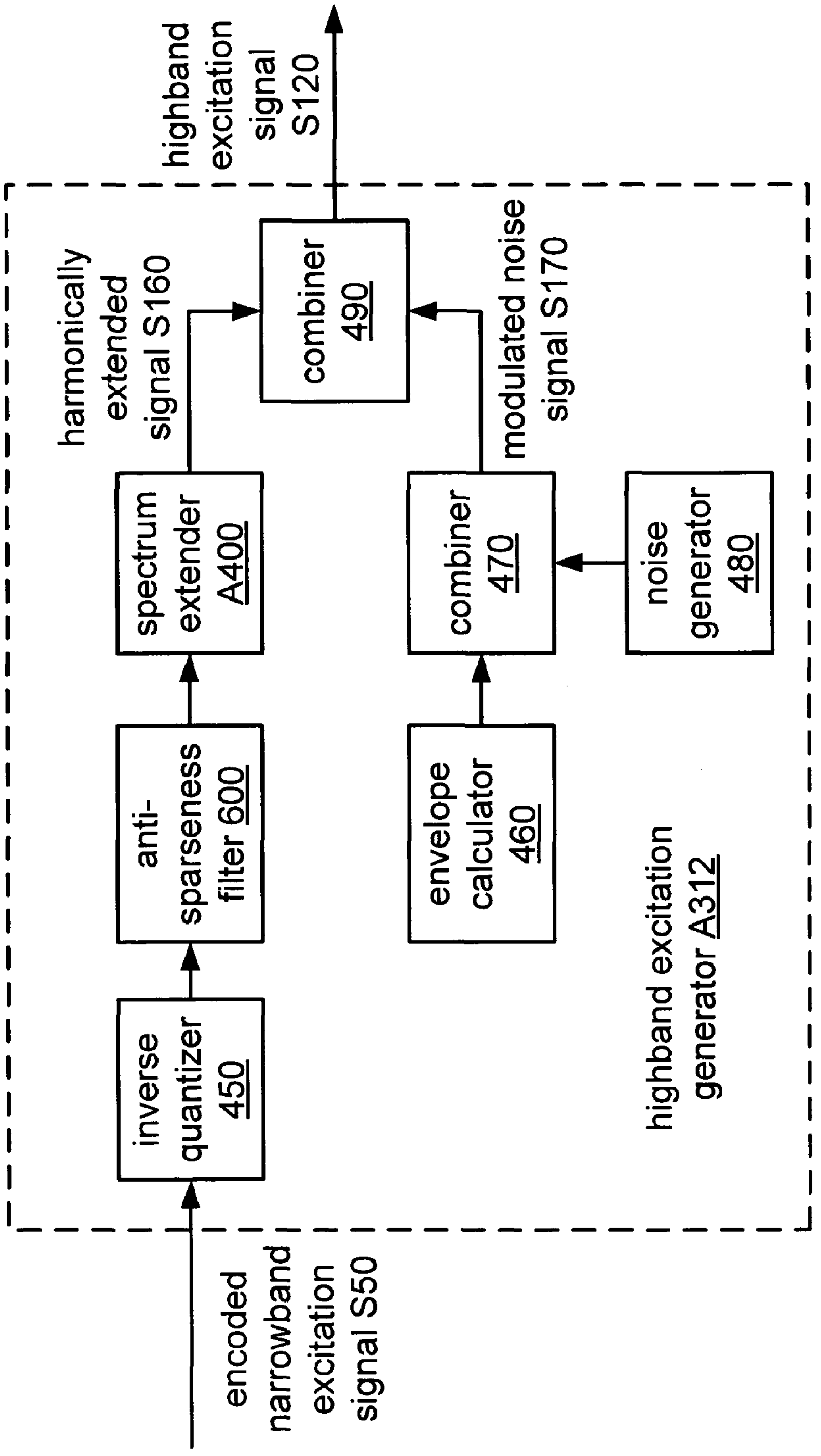
FIG. 18 shows a block diagram of an implementation A312 of highband excitation generator A302.
Figure 19:
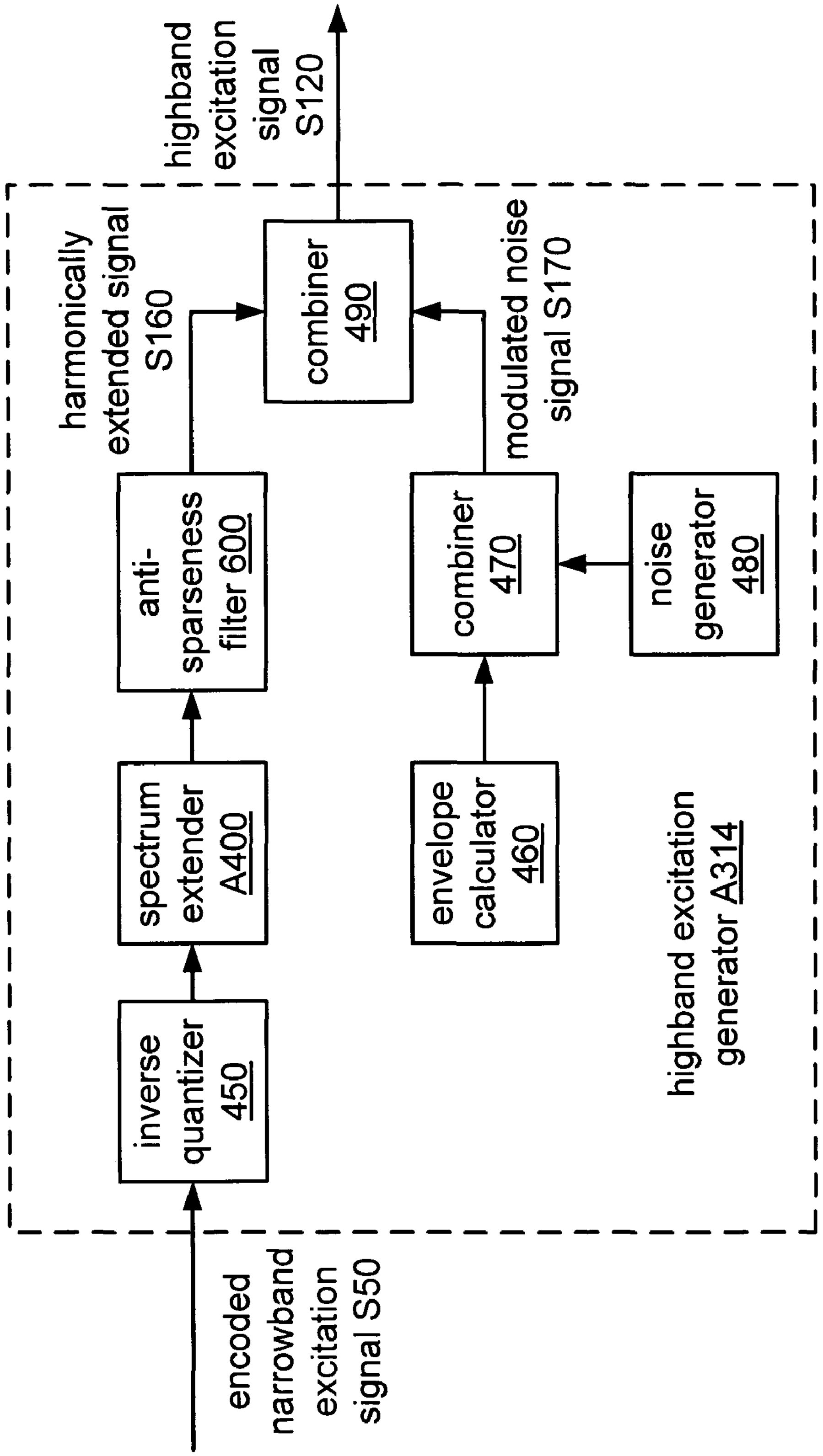
FIG. 19 shows a block diagram of an implementation A314 of highband excitation generator A302.
Figure 20:
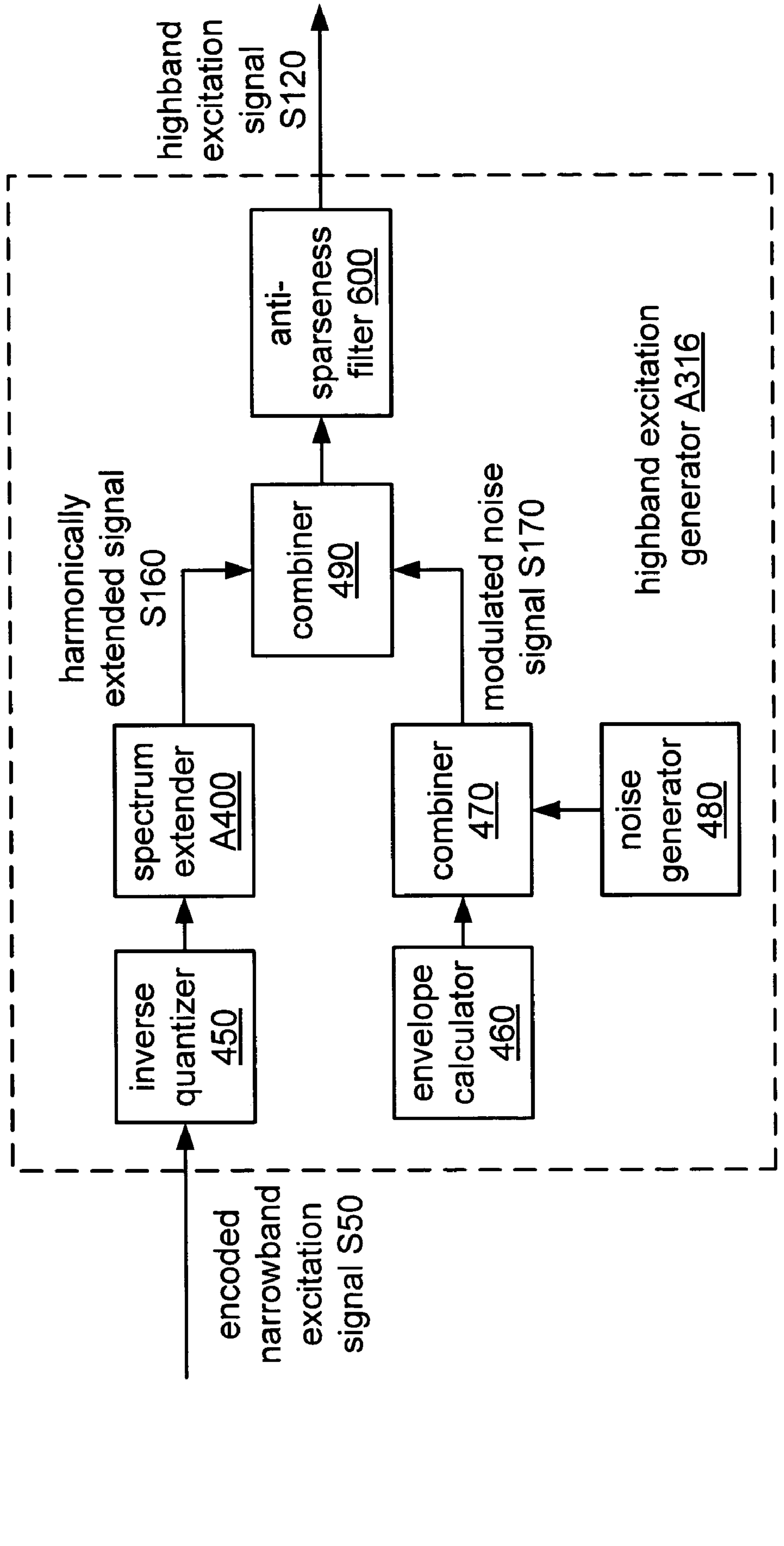
FIG. 20 shows a block diagram of an implementation A316 of highband excitation generator A302.

Embodiments include implementations of highband excitation generator A300 that are configured to perform anti-sparseness filtering. FIG. 18 shows a block diagram of an implementation A312 of highband excitation generator A302 that includes an anti-sparseness filter 600 arranged to filter the dequantized narrowband excitation signal produced by inverse quantizer 450. FIG. 19 shows a block diagram of an implementation A314 of highband excitation generator A302 that includes an anti-sparseness filter 600 arranged to filter the spectrally extended signal produced by spectrum extender A400. FIG. 20 shows a block diagram of an implementation A316 of highband excitation generator A302 that includes an anti-sparseness filter 600 arranged to filter the output of combiner 490 to produce highband excitation signal S120. Of course, implementations of highband excitation generator A300 that combine the features of any of implementations A304 and A306 with the features of any of implementations A312, A314, and A316 are contemplated and hereby expressly disclosed. Anti-sparseness filter 600 may also be arranged within spectrum extender A400: for example, after any of the elements 510, 520, 530, and 540 in spectrum extender A402. It is expressly noted that anti-sparseness filter 600 may also be used with implementations of spectrum extender A400 that perform spectral folding, spectral translation, or harmonic extension.

Anti-sparseness filter 600 may be configured to alter the phase of its input signal. For example, it may be desirable for anti-sparseness filter 600 to be configured and arranged such that the phase of highband excitation signal S120 is randomized, or otherwise more evenly distributed, over time. It may also be desirable for the response of anti-sparseness filter 600 to be spectrally flat, such that the magnitude spectrum of the filtered signal is not appreciably changed. In one example, anti-sparseness filter 600 is implemented as an all-pass filter having a transfer function according to the following expression:

$$H(z) = \frac{-0.7+z^{-4}}{1-0.7z^{-4}} \cdot \frac{0.6+z^{-6}}{1+0.6z^{-6}}. \tag{3}$$

One effect of such a filter may be to spread out the energy of the input signal so that it is no longer concentrated in only a few samples.

Artifacts caused by codebook sparseness are usually more noticeable for noise-like signals, where the residual includes less pitch information, and also for speech in background noise. Sparseness typically causes fewer artifacts in cases where the excitation has long-term structure, and indeed phase modification may cause noisiness in voiced signals. Thus it may be desirable to configure anti-sparseness filter 600 to filter unvoiced signals and to pass at least some voiced signals without alteration. Unvoiced signals are characterized by a low pitch gain (e.g. quantized narrowband adaptive codebook gain) and a spectral tilt (e.g. quantized first reflection coefficient) that is close to zero or positive, indicating a spectral envelope that is flat or tilted upward with increasing frequency. Typical implementations of anti-sparseness filter 600 are configured to filter unvoiced sounds (e.g., as indicated by the value of the spectral tilt), to filter voiced sounds when the pitch gain is below a threshold value (alternatively, not greater than the threshold value), and otherwise to pass the signal without alteration.

Further implementations of anti-sparseness filter 600 include two or more filters that are configured to have different maximum phase modification angles (e.g., up to 180 degrees). In such case, anti-sparseness filter 600 may be configured to select among these component filters according to a value of the pitch gain (e.g., the quantized adaptive codebook or LTP gain), such that a greater maximum phase modification angle is used for frames having lower pitch gain values. An implementation of anti-sparseness filter 600 may also include different component filters that are configured to modify the phase over more or less of the frequency spectrum, such that a filter configured to modify the phase over a wider frequency range of the input signal is used for frames having lower pitch gain values.

For accurate reproduction of the encoded speech signal, it may be desirable for the ratio between the levels of the highband and narrowband portions of the synthesized wideband speech signal S100 to be similar to that in the original wideband speech signal S10. In addition to a spectral envelope as represented by highband coding parameters S60*a*, highband encoder A200 may be configured to characterize highband signal S30 by specifying a temporal or gain envelope. As shown in FIG. 10, highband encoder A202 includes a highband gain factor calculator A230 that is configured and arranged to calculate one or more gain factors according to a relation between highband signal S30 and synthesized highband signal S130, such as a difference or ratio between the energies of the two signals over a frame or some portion thereof. In other implementations of highband encoder A202, highband gain calculator A230 may be likewise configured but arranged instead to calculate the gain envelope according to such a time-varying relation between highband signal S30 and narrowband excitation signal S80 or highband excitation signal S120.

The temporal envelopes of narrowband excitation signal S80 and highband signal S30 are likely to be similar. Therefore, encoding a gain envelope that is based on a relation between highband signal S30 and narrowband excitation signal S80 (or a signal derived therefrom, such as highband excitation signal S120 or synthesized highband signal S130) will generally be more efficient than encoding a gain envelope based only on highband signal S30. In a typical implementation, highband encoder A202 is configured to output a quantized index of eight to twelve bits that specifies five gain factors for each frame.

Figure 21:
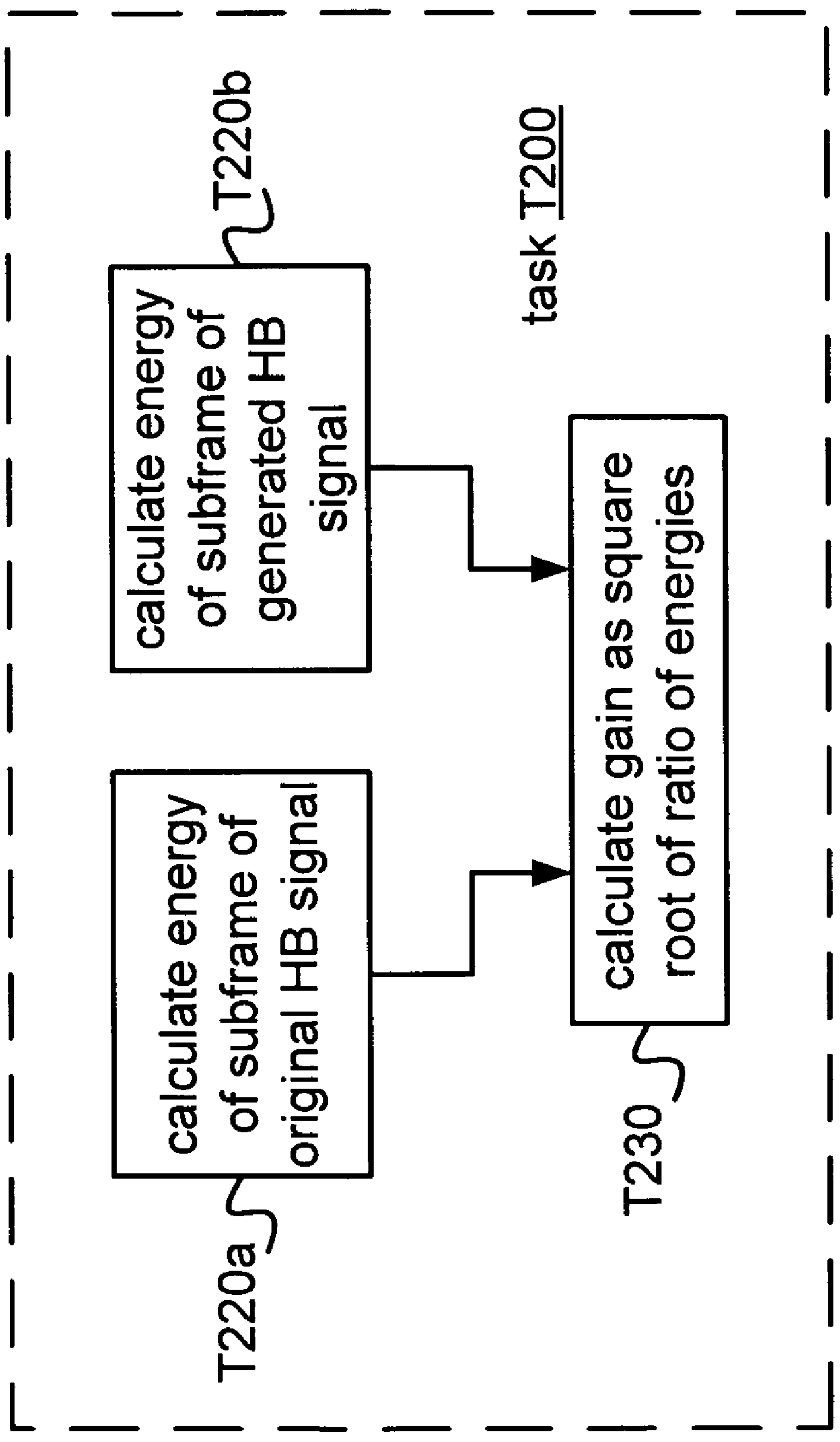
FIG. 21 shows a flowchart for a gain calculation task T200.

Highband gain factor calculator A230 may be configured to perform gain factor calculation as a task that includes one or more series of subtasks. FIG. 21 shows a flowchart of an example T200 of such a task that calculates a gain value for a corresponding subframe according to the relative energies of highband signal S30 and synthesized highband signal S130. Tasks 220*a* and 220*b* calculate the energies of the corresponding subframes of the respective signals. For example, tasks 220*a* and 220*b* may be configured to calculate the energy as a sum of the squares of the samples of the respective subframe. Task T230 calculates a gain factor for the subframe as the square root of the ratio of those energies. In this example, task T230 calculates the gain factor as the square root of the ratio of the energy of highband signal S30 to the energy of synthesized highband signal S130 over the subframe.

Figure 22:
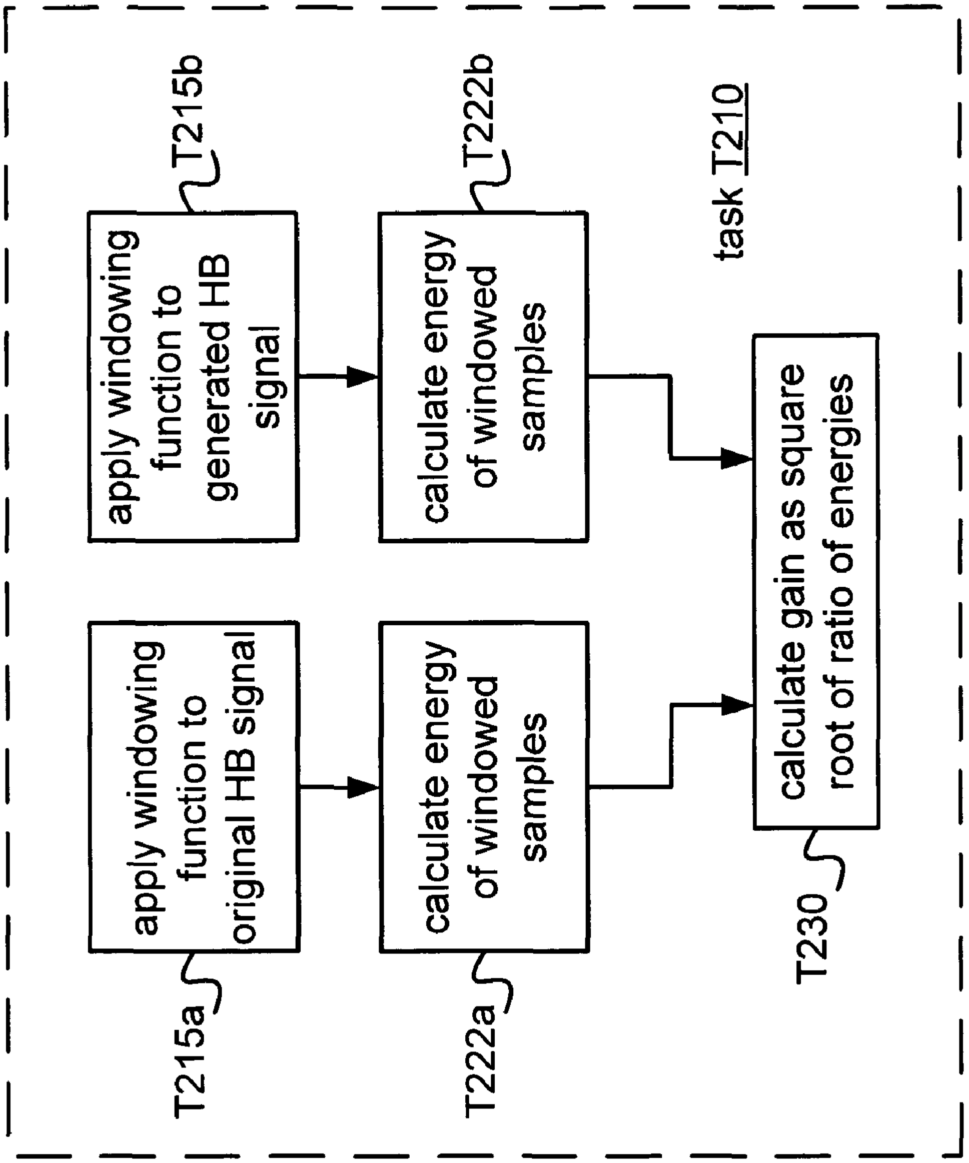
FIG. 22 shows a flowchart for an implementation T210 of gain calculation task T200.

It may be desirable for highband gain factor calculator A230 to be configured to calculate the subframe energies according to a windowing function. FIG. 22 shows a flowchart of such an implementation T210 of gain factor calculation task T200. Task T215*a* applies a windowing function to highband signal S30, and task T215*b* applies the same windowing function to synthesized highband signal S130. Implementations 222*a* and 222*b* of tasks 220*a* and 220*b* calculate the energies of the respective windows, and task T230 calculates a gain factor for the subframe as the square root of the ratio of the energies.

Figure 23A:
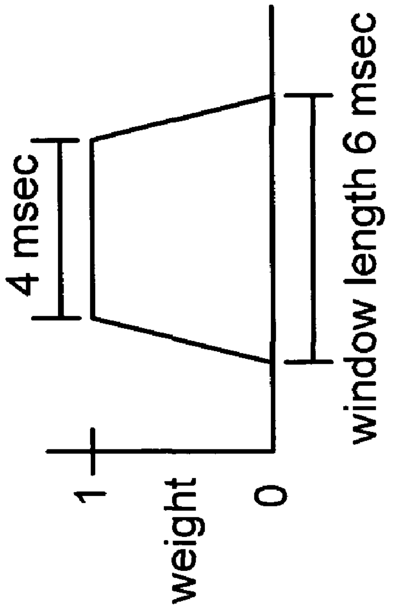
FIG. 23*a* shows a diagram of a windowing function.
Figure 23B:
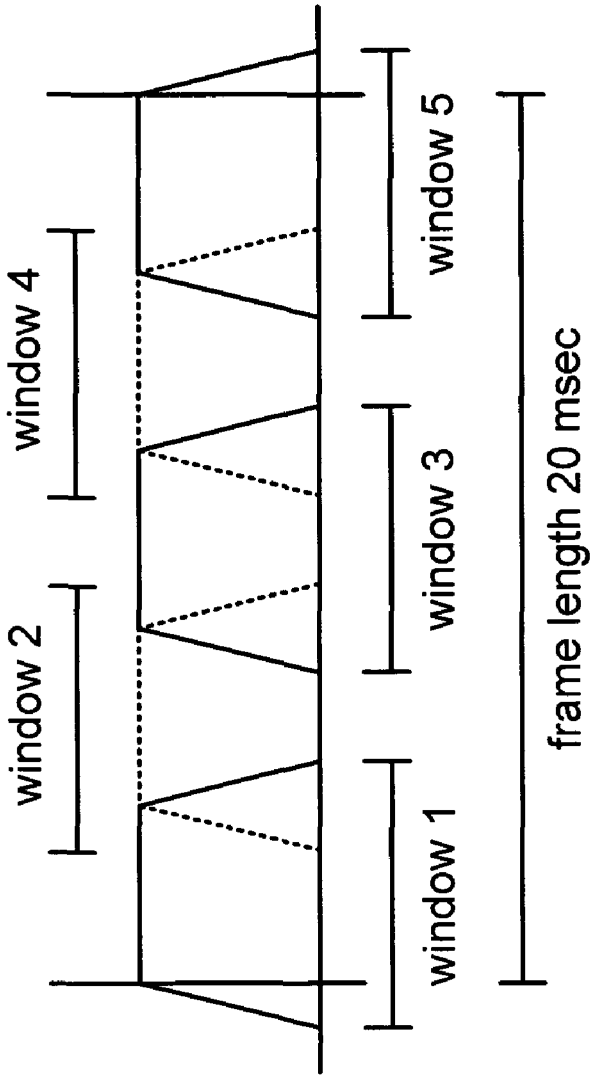
FIG. 23*b* shows an application of a windowing function as shown in FIG. 23*a* to subframes of a speech signal.

It may be desirable to apply a windowing function that overlaps adjacent subframes. For example, a windowing function that produces gain factors which may be applied in an overlap-add fashion may help to reduce or avoid discontinuity between subframes. In one example, highband gain factor calculator A230 is configured to apply a trapezoidal windowing function as shown in FIG. 23*a*, in which the window overlaps each of the two adjacent subframes by one millisecond. FIG. 23*b* shows an application of this windowing function to each of the five subframes of a 20-millisecond frame. Other implementations of highband gain factor calculator A230 may be configured to apply windowing functions having different overlap periods and/or different window shapes (e.g., rectangular, Hamming) that may be symmetrical or asymmetrical. It is also possible for an implementation of highband gain factor calculator A230 to be configured to apply different windowing functions to different subframes within a frame and/or for a frame to include subframes of different lengths.

Without limitation, the following values are presented as examples for particular implementations. A 20-msec frame is assumed for these cases, although any other duration may be used. For a highband signal sampled at 7 kHz, each frame has 140 samples. If such a frame is divided into five subframes of equal length, each subframe will have 28 samples, and the window as shown in FIG. 23*a* will be 42 samples wide. For a highband signal sampled at 8 kHz, each frame has 160 samples. If such frame is divided into five subframes of equal length, each subframe will have 32 samples, and the window as shown in FIG. 23*a* will be 48 samples wide. In other implementations, subframes of any width may be used, and it is even possible for an implementation of highband gain calculator A230 to be configured to produce a different gain factor for each sample of a frame.

Figure 24:
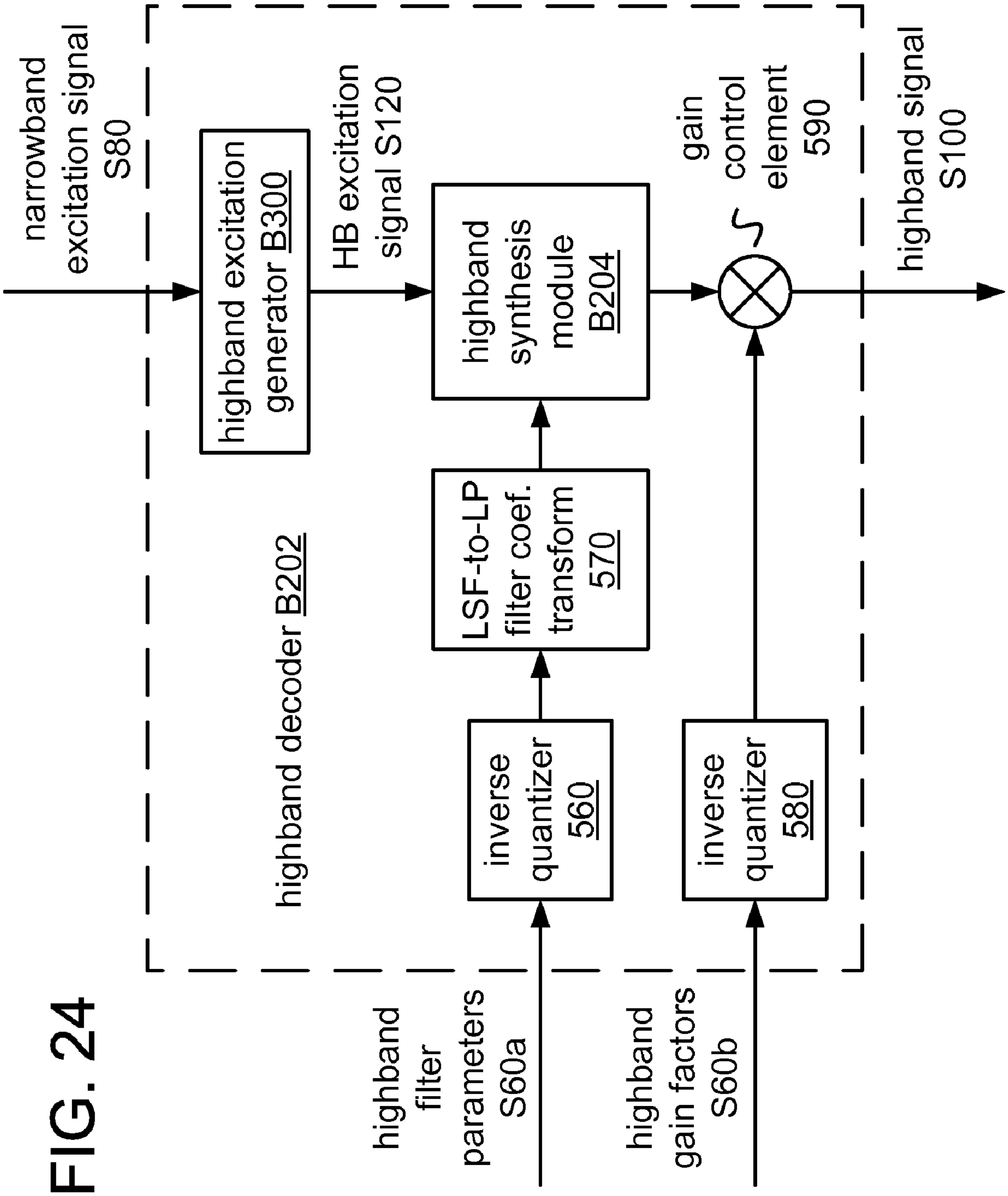
FIG. 24 shows a block diagram for an implementation B202 of highband decoder B200.

FIG. 24 shows a block diagram of an implementation B202 of highband decoder B200. Highband decoder B202 includes a highband excitation generator B300 that is configured to produce highband excitation signal S120 based on narrowband excitation signal S80. Depending on the particular system design choices, highband excitation generator B300 may be implemented according to any of the implementations of highband excitation generator A300 as described herein. Typically it is desirable to implement highband excitation generator B300 to have the same response as the highband excitation generator of the highband encoder of the particular coding system. Because narrowband decoder B110 will typically perform dequantization of encoded narrowband excitation signal S50, however, in most cases highband excitation generator B300 may be implemented to receive narrowband excitation signal S80 from narrowband decoder B110 and need not include an inverse quantizer configured to dequantize encoded narrowband excitation signal S50. It is also possible for narrowband decoder B110 to be implemented to include an instance of anti-sparseness filter 600 arranged to filter the dequantized narrowband excitation signal before it is input to a narrowband synthesis filter such as filter 330.

Inverse quantizer 560 is configured to dequantize highband filter parameters S60*a* (in this example, to a set of LSFs), and LSF-to-LP filter coefficient transform 570 is configured to transform the LSFs into a set of filter coefficients (for example, as described above with reference to inverse quantizer 240 and transform 250 of narrowband encoder A122). In other implementations, as mentioned above, different coefficient sets (e.g., cepstral coefficients) and/or coefficient representations (e.g., ISPs) may be used. Highband synthesis filter B204 is configured to produce a synthesized highband signal according to highband excitation signal S120 and the set of filter coefficients. For a system in which the highband encoder includes a synthesis filter (e.g., as in the example of encoder A202 described above), it may be desirable to implement highband synthesis filter B204 to have the same response (e.g., the same transfer function) as that synthesis filter.

Highband decoder B202 also includes an inverse quantizer 580 configured to dequantize highband gain factors S60*b*, and a gain control element 590 (e.g., a multiplier or amplifier) configured and arranged to apply the dequantized gain factors to the synthesized highband signal to produce highband signal S100. For a case in which the gain envelope of a frame is specified by more than one gain factor, gain control element 590 may include logic configured to apply the gain factors to the respective subframes, possibly according to a windowing function that may be the same or a different windowing function as applied by a gain calculator (e.g., highband gain calculator A230) of the corresponding highband encoder. In other implementations of highband decoder B202, gain control element 590 is similarly configured but is arranged instead to apply the dequantized gain factors to narrowband excitation signal S80 or to highband excitation signal S120.

As mentioned above, it may be desirable to obtain the same state in the highband encoder and highband decoder (e.g., by using dequantized values during encoding). Thus it may be desirable in a coding system according to such an implementation to ensure the same state for corresponding noise generators in highband excitation generators A300 and B300. For example, highband excitation generators A300 and B300 of such an implementation may be configured such that the state of the noise generator is a deterministic function of information already coded within the same frame (e.g., narrowband filter parameters S40 or a portion thereof and/or encoded narrowband excitation signal S50 or a portion thereof).

One or more of the quantizers of the elements described herein (e.g., quantizer 230, 420, or 430) may be configured to perform classified vector quantization. For example, such a quantizer may be configured to select one of a set of codebooks based on information that has already been coded within the same frame in the narrowband channel and/or in the highband channel. Such a technique typically provides increased coding efficiency at the expense of additional codebook storage.

As discussed above with reference to, e.g., FIGS. 8 and 9, a considerable amount of periodic structure may remain in the residual signal after removal of the coarse spectral envelope from narrowband speech signal S20. For example, the residual signal may contain a sequence of roughly periodic pulses or spikes over time. Such structure, which is typically related to pitch, is especially likely to occur in voiced speech signals. Calculation of a quantized representation of the narrowband residual signal may include encoding of this pitch structure according to a model of long-term periodicity as represented by, for example, one or more codebooks.

The pitch structure of an actual residual signal may not match the periodicity model exactly. For example, the residual signal may include small jitters in the regularity of the locations of the pitch pulses, such that the distances between successive pitch pulses in a frame are not exactly equal and the structure is not quite regular. These irregularities tend to reduce coding efficiency.

Some implementations of narrowband encoder A120 are configured to perform a regularization of the pitch structure by applying an adaptive time warping to the residual before or during quantization, or by otherwise including an adaptive time warping in the encoded excitation signal. For example, such an encoder may be configured to select or otherwise calculate a degree of warping in time (e.g., according to one or more perceptual weighting and/or error minimization criteria) such that the resulting excitation signal optimally fits the model of long-term periodicity. Regularization of pitch structure is performed by a subset of CELP encoders called Relaxation Code Excited Linear Prediction (RCELP) encoders.

An RCELP encoder is typically configured to perform the time warping as an adaptive time shift. This time shift may be a delay ranging from a few milliseconds negative to a few milliseconds positive, and it is usually varied smoothly to avoid audible discontinuities. In some implementations, such an encoder is configured to apply the regularization in a piecewise fashion, wherein each frame or subframe is warped by a corresponding fixed time shift. In other implementations, the encoder is configured to apply the regularization as a continuous warping function, such that a frame or subframe is warped according to a pitch contour (also called a pitch trajectory). In some cases (e.g., as described in U.S. Pat. Appl. Publ. 2004/0098255), the encoder is configured to include a time warping in the encoded excitation signal by applying the shift to a perceptually weighted input signal that is used to calculate the encoded excitation signal.

The encoder calculates an encoded excitation signal that is regularized and quantized, and the decoder dequantizes the encoded excitation signal to obtain an excitation signal that is used to synthesize the decoded speech signal. The decoded output signal thus exhibits the same varying delay that was included in the encoded excitation signal by the regularization. Typically, no information specifying the regularization amounts is transmitted to the decoder.

Regularization tends to make the residual signal easier to encode, which improves the coding gain from the long-term predictor and thus boosts overall coding efficiency, generally without generating artifacts. It may be desirable to perform regularization only on frames that are voiced. For example, narrowband encoder A124 may be configured to shift only those frames or subframes having a long-term structure, such as voiced signals. It may even be desirable to perform regularization only on subframes that include pitch pulse energy. Various implementations of RCELP coding are described in U.S. Pat. No. 5,704,003 (Kleijn et al.) and U.S. Pat. No. 6,879,955 (Rao) and in U.S. Pat. Appl. Publ. 2004/0098255 (Kovesi et al.). Existing implementations of RCELP coders include the Enhanced Variable Rate Codec (EVRC), as described in Telecommunications Industry Association (TIA) IS-127, and the Third Generation Partnership Project 2 (3GPP2) Selectable Mode Vocoder (SMV).

Unfortunately, regularization may cause problems for a wideband speech coder in which the highband excitation is derived from the encoded narrowband excitation signal (such as a system including wideband speech encoder A100 and wideband speech decoder B100). Due to its derivation from a time-warped signal, the highband excitation signal will generally have a time profile that is different from that of the original highband speech signal. In other words, the highband excitation signal will no longer be synchronous with the original highband speech signal.

A misalignment in time between the warped highband excitation signal and the original highband speech signal may cause several problems. For example, the warped highband excitation signal may no longer provide a suitable source excitation for a synthesis filter that is configured according to the filter parameters extracted from the original highband speech signal. As a result, the synthesized highband signal may contain audible artifacts that reduce the perceived quality of the decoded wideband speech signal.

The misalignment in time may also cause inefficiencies in gain envelope encoding. As mentioned above, a correlation is likely to exist between the temporal envelopes of narrowband excitation signal S80 and highband signal S30. By encoding the gain envelope of the highband signal according to a relation between these two temporal envelopes, an increase in coding efficiency may be realized as compared to encoding the gain envelope directly. When the encoded narrowband excitation signal is regularized, however, this correlation may be weakened. The misalignment in time between narrowband excitation signal S80 and highband signal S30 may cause fluctuations to appear in highband gain factors S60*b*, and coding efficiency may drop.

Embodiments include methods of wideband speech encoding that perform time warping of a highband speech signal according to a time warping included in a corresponding encoded narrowband excitation signal. Potential advantages of such methods include improving the quality of a decoded wideband speech signal and/or improving the efficiency of coding a highband gain envelope.

Figure 25:
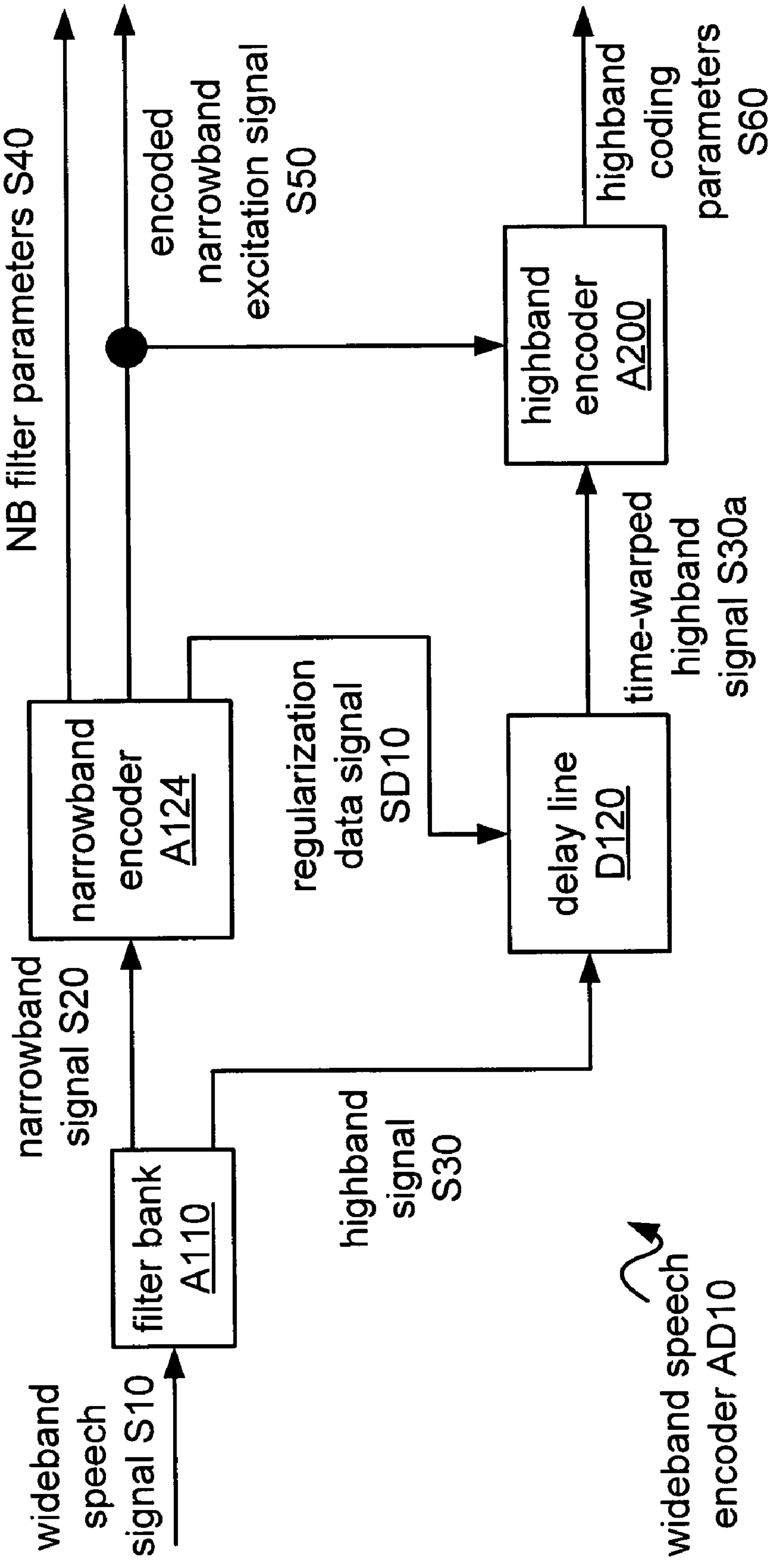
FIG. 25 shows a block diagram of an implementation AD10 of wideband speech encoder A100.

FIG. 25 shows a block diagram of an implementation AD10 of wideband speech encoder A100. Encoder AD10 includes an implementation A124 of narrowband encoder A120 that is configured to perform regularization during calculation of the encoded narrowband excitation signal S50. For example, narrowband encoder A124 may be configured according to one or more of the RCELP implementations discussed above.

Narrowband encoder A124 is also configured to output a regularization data signal SD10 that specifies the degree of time warping applied. For various cases in which narrowband encoder A124 is configured to apply a fixed time shift to each frame or subframe, regularization data signal SD10 may include a series of values indicating each time shift amount as an integer or non-integer value in terms of samples, milliseconds, or some other time increment. For a case in which narrowband encoder A124 is configured to otherwise modify the time scale of a frame or other sequence of samples (e.g., by compressing one portion and expanding another portion), regularization information signal SD10 may include a corresponding description of the modification, such as a set of function parameters. In one particular example, narrowband encoder A124 is configured to divide a frame into three subframes and to calculate a fixed time shift for each subframe, such that regularization data signal SD10 indicates three time shift amounts for each regularized frame of the encoded narrowband signal.

Wideband speech encoder AD10 includes a delay line D120 configured to advance or retard portions of highband speech signal S30, according to delay amounts indicated by an input signal, to produce time-warped highband speech signal S30*a*. In the example shown in FIG. 25, delay line D120 is configured to time warp highband speech signal S30 according to the warping indicated by regularization data signal SD10. In such manner, the same amount of time warping that was included in encoded narrowband excitation signal S50 is also applied to the corresponding portion of highband speech signal S30 before analysis. Although this example shows delay line D120 as a separate element from highband encoder A200, in other implementations delay line D120 is arranged as part of the highband encoder.

Further implementations of highband encoder A200 may be configured to perform spectral analysis (e.g., LPC analysis) of the unwarped highband speech signal S30 and to perform time warping of highband speech signal S30 before calculation of highband gain parameters S60*b*. Such an encoder may include, for example, an implementation of delay line D120 arranged to perform the time warping. In such cases, however, highband filter parameters S60*a* based on the analysis of unwarped signal S30 may describe a spectral envelope that is misaligned in time with highband excitation signal S120.

Figure 26A:
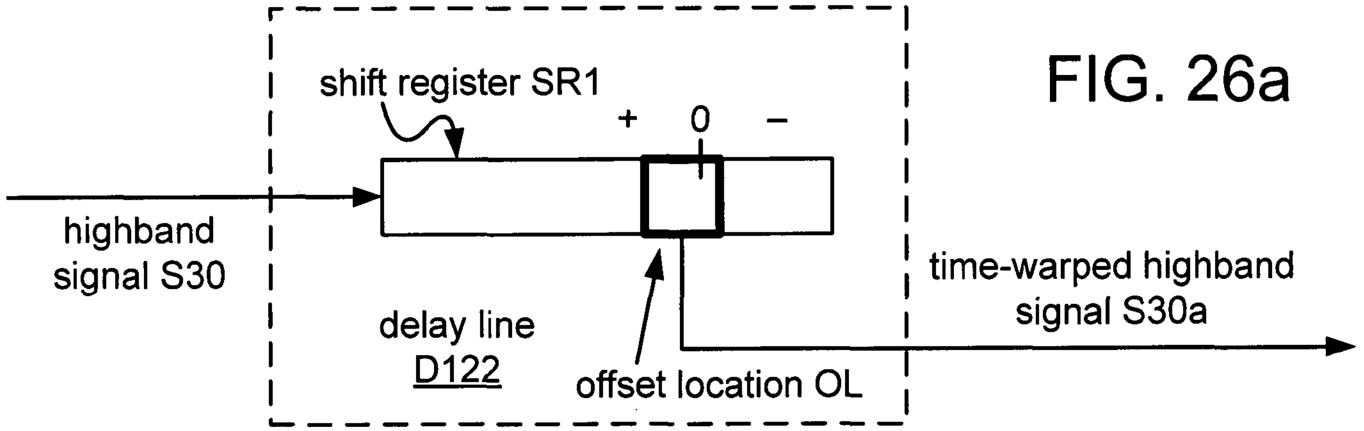
FIG. 26*a* shows a schematic diagram of an implementation D122 of delay line D120.

Delay line D120 may be configured according to any combination of logic elements and storage elements suitable for applying the desired time warping operations to highband speech signal S30. For example, delay line D120 may be configured to read highband speech signal S30 from a buffer according to the desired time shifts. FIG. 26*a* shows a schematic diagram of such an implementation D122 of delay line D120 that includes a shift register SR1. Shift register SR1 is a buffer of some length m that is configured to receive and store the m most recent samples of highband speech signal S30. The value m is equal to at least the sum of the maximum positive (or "advance") and negative (or "retard") time shifts to be supported. It may be convenient for the value m to be equal to the length of a frame or subframe of highband signal S30.

Delay line D122 is configured to output the time-warped highband signal S30*a* from an offset location OL of shift register SR1. The position of offset location OL varies about a reference position (zero time shift) according to the current time shift as indicated by, for example, regularization data signal SD10. Delay line D122 may be configured to support equal advance and retard limits or, alternatively, one limit larger than the other such that a greater shift may be performed in one direction than in the other. FIG. 26*a* shows a particular example that supports a larger positive than negative time shift. Delay line D122 may be configured to output one or more samples at a time (depending on an output bus width, for example).

A regularization time shift having a magnitude of more than a few milliseconds may cause audible artifacts in the decoded signal. Typically the magnitude of a regularization time shift as performed by a narrowband encoder A124 will not exceed a few milliseconds, such that the time shifts indicated by regularization data signal SD10 will be limited. However, it may be desired in such cases for delay line D122 to be configured to impose a maximum limit on time shifts in the positive and/or negative direction (for example, to observe a tighter limit than that imposed by the narrowband encoder).

Figure 26B:
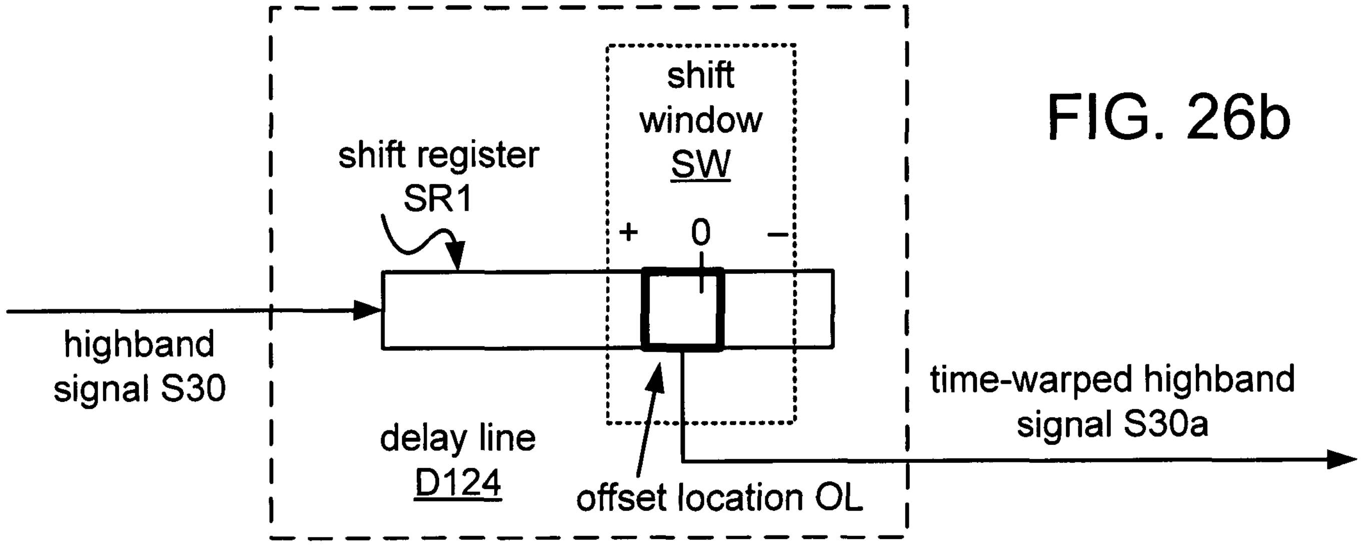
FIG. 26*b* shows a schematic diagram of an implementation D124 of delay line D120.

FIG. 26*b* shows a schematic diagram of an implementation D124 of delay line D122 that includes a shift window SW. In this example, the position of offset location OL is limited by the shift window SW. Although FIG. 26*b* shows a case in which the buffer length m is greater than the width of shift window SW, delay line D124 may also be implemented such that the width of shift window SW is equal to m.

Figure 27:
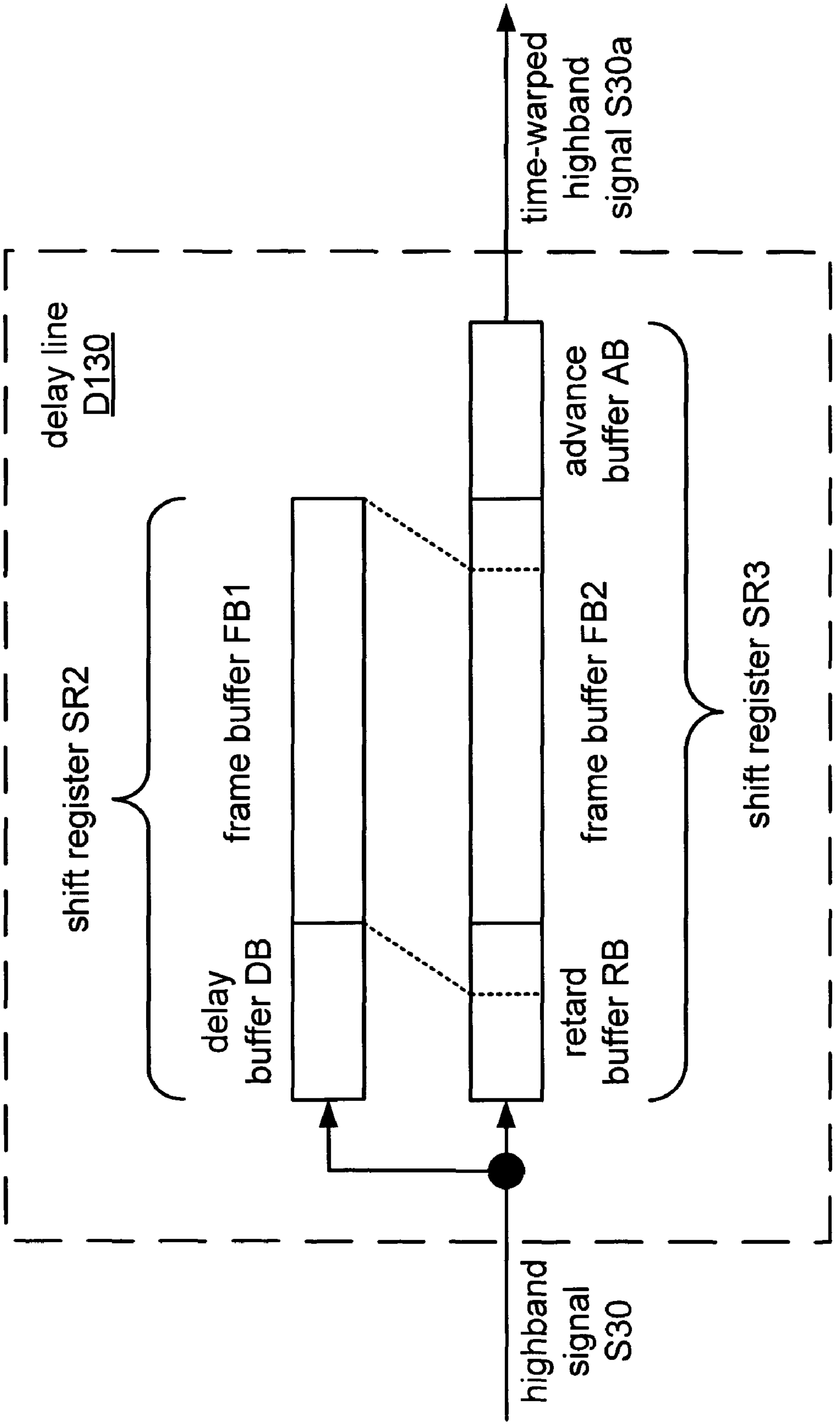
FIG. 27 shows a schematic diagram of an implementation D130 of delay line D120.

In other implementations, delay line D120 is configured to write highband speech signal S30 to a buffer according to the desired time shifts. FIG. 27 shows a schematic diagram of such an implementation D130 of delay line D120 that includes two shift registers SR2 and SR3 configured to receive and store highband speech signal S30. Delay line D130 is configured to write a frame or subframe from shift register SR2 to shift register SR3 according to a time shift as indicated by, for example, regularization data signal SD10. Shift register SR3 is configured as a FIFO buffer arranged to output time-warped highband signal S30*a*.

In the particular example shown in FIG. 27, shift register SR2 includes a frame buffer portion FB1 and a delay buffer portion DB, and shift register SR3 includes a frame buffer portion FB2, an advance buffer portion AB, and a retard buffer portion RB. The lengths of advance buffer AB and retard buffer RB may be equal, or one may be larger than the other, such that a greater shift in one direction is supported than in the other. Delay buffer DB and retard buffer portion RB may be configured to have the same length. Alternatively, delay buffer DB may be shorter than retard buffer RB to account for a time interval required to transfer samples from frame buffer FB1 to shift register SR3, which may include other processing operations such as warping of the samples before storage to shift register SR3.

In the example of FIG. 27, frame buffer FB1 is configured to have a length equal to that of one frame of highband signal S30. In another example, frame buffer FB1 is configured to have a length equal to that of one subframe of highband signal S30. In such case, delay line D130 may be configured to include logic to apply the same (e.g., an average) delay to all subframes of a frame to be shifted. Delay line D130 may also include logic to average values from frame buffer FB1 with values to be overwritten in retard buffer RB or advance buffer AB. In a further example, shift register SR3 may be configured to receive values of highband signal S30 only via frame buffer FB1, and in such case delay line D130 may include logic to interpolate across gaps between successive frames or subframes written to shift register SR3. In other implementations, delay line D130 may be configured to perform a warping operation on samples from frame buffer FB1 before writing them to shift register SR3 (e.g., according to a function described by regularization data signal SD10).

Figure 28:
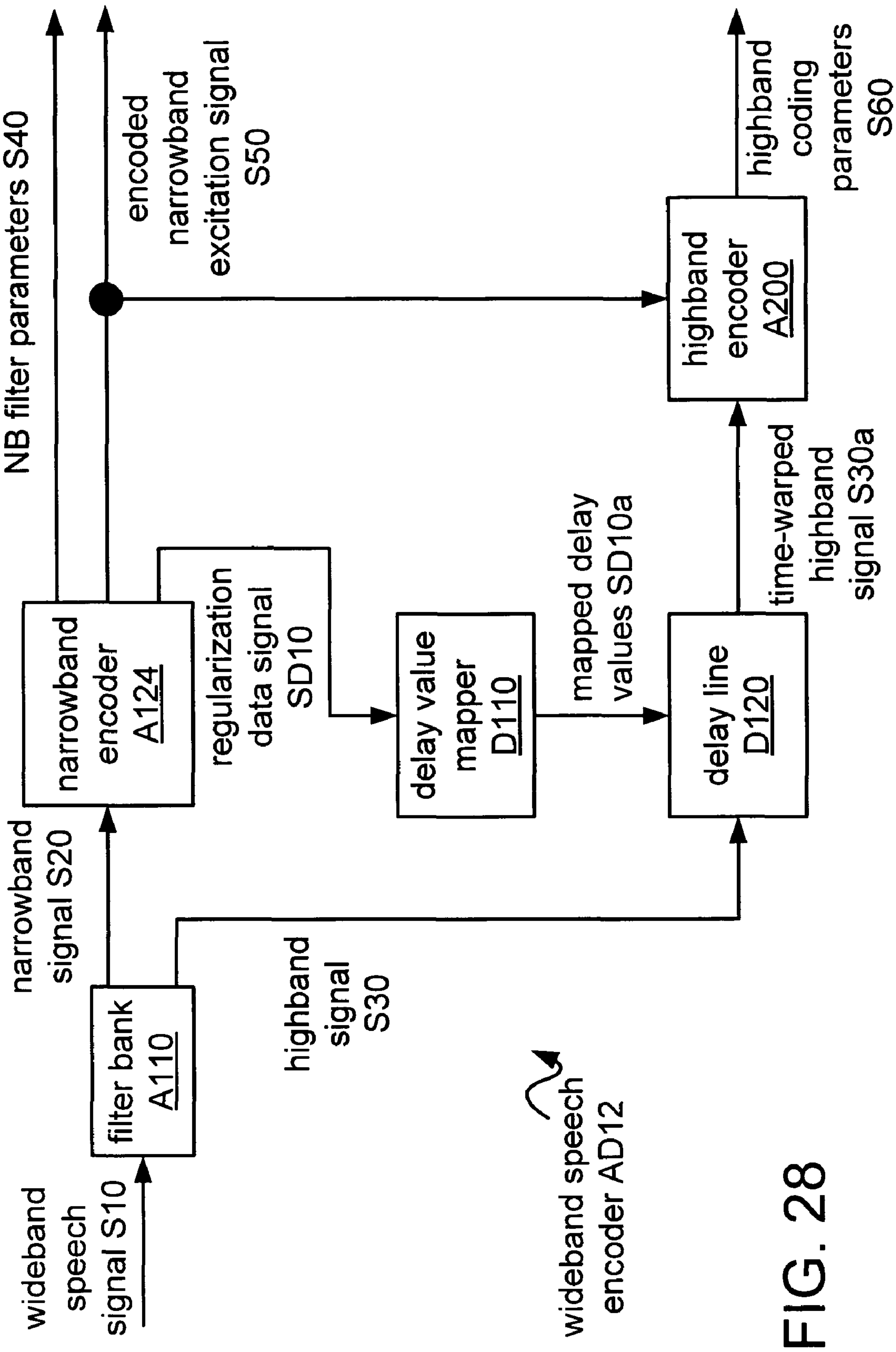
FIG. 28 shows a block diagram of an implementation AD12 of wideband speech encoder AD10.

It may be desirable for delay line D120 to apply a time warping that is based on, but is not identical to, the warping specified by regularization data signal SD10. FIG. 28 shows a block diagram of an implementation AD12 of wideband speech encoder AD10 that includes a delay value mapper D110. Delay value mapper D110 is configured to map the warping indicated by regularization data signal SD10 into mapped delay values SD10*a*. Delay line D120 is arranged to produce time-warped highband speech signal S30*a* according to the warping indicated by mapped delay values SD10*a*.

The time shift applied by the narrowband encoder may be expected to evolve smoothly over time. Therefore, it is typically sufficient to compute the average narrowband time shift applied to the subframes during a frame of speech, and to shift a corresponding frame of highband speech signal S30 according to this average. In one such example, delay value mapper D110 is configured to calculate an average of the subframe delay values for each frame, and delay line D120 is configured to apply the calculated average to a corresponding frame of highband signal S30. In other examples, an average over a shorter period (such as two subframes, or half of a frame) or a longer period (such as two frames) may be calculated and applied. In a case where the average is a non-integer value of samples, delay value mapper D110 may be configured to round the value to an integer number of samples before outputting it to delay line D120.

Narrowband encoder A124 may be configured to include a regularization time shift of a non-integer number of samples in the encoded narrowband excitation signal. In such a case, it may be desirable for delay value mapper D110 to be configured to round the narrowband time shift to an integer number of samples and for delay line D120 to apply the rounded time shift to highband speech signal S30.

In some implementations of wideband speech encoder AD10, the sampling rates of narrowband speech signal S20 and highband speech signal S30 may differ. In such cases, delay value mapper D110 may be configured to adjust time shift amounts indicated in regularization data signal SD10 to account for a difference between the sampling rates of narrowband speech signal S20 (or narrowband excitation signal S80) and highband speech signal S30. For example, delay value mapper D110 may be configured to scale the time shift amounts according to a ratio of the sampling rates. In one particular example as mentioned above, narrowband speech signal S20 is sampled at 8 kHz, and highband speech signal S30 is sampled at 7 kHz. In this case, delay value mapper D110 is configured to multiply each shift amount by ⅞. Implementations of delay value mapper D110 may also be configured to perform such a scaling operation together with an integer-rounding and/or a time shift averaging operation as described herein.

In further implementations, delay line D120 is configured to otherwise modify the time scale of a frame or other sequence of samples (e.g., by compressing one portion and expanding another portion). For example, narrowband encoder A124 may be configured to perform the regularization according to a function such as a pitch contour or trajectory. In such case, regularization data signal SD10 may include a corresponding description of the function, such as a set of parameters, and delay line D120 may include logic configured to warp frames or subframes of highband speech signal S30 according to the function. In other implementations, delay value mapper D110 is configured to average, scale, and/or round the function before it is applied to highband speech signal S30 by delay line D120. For example, delay value mapper D110 may be configured to calculate one or more delay values according to the function, each delay value indicating a number of samples, which are then applied by delay line D120 to time warp one or more corresponding frames or subframes of highband speech signal S30.

Figure 29:
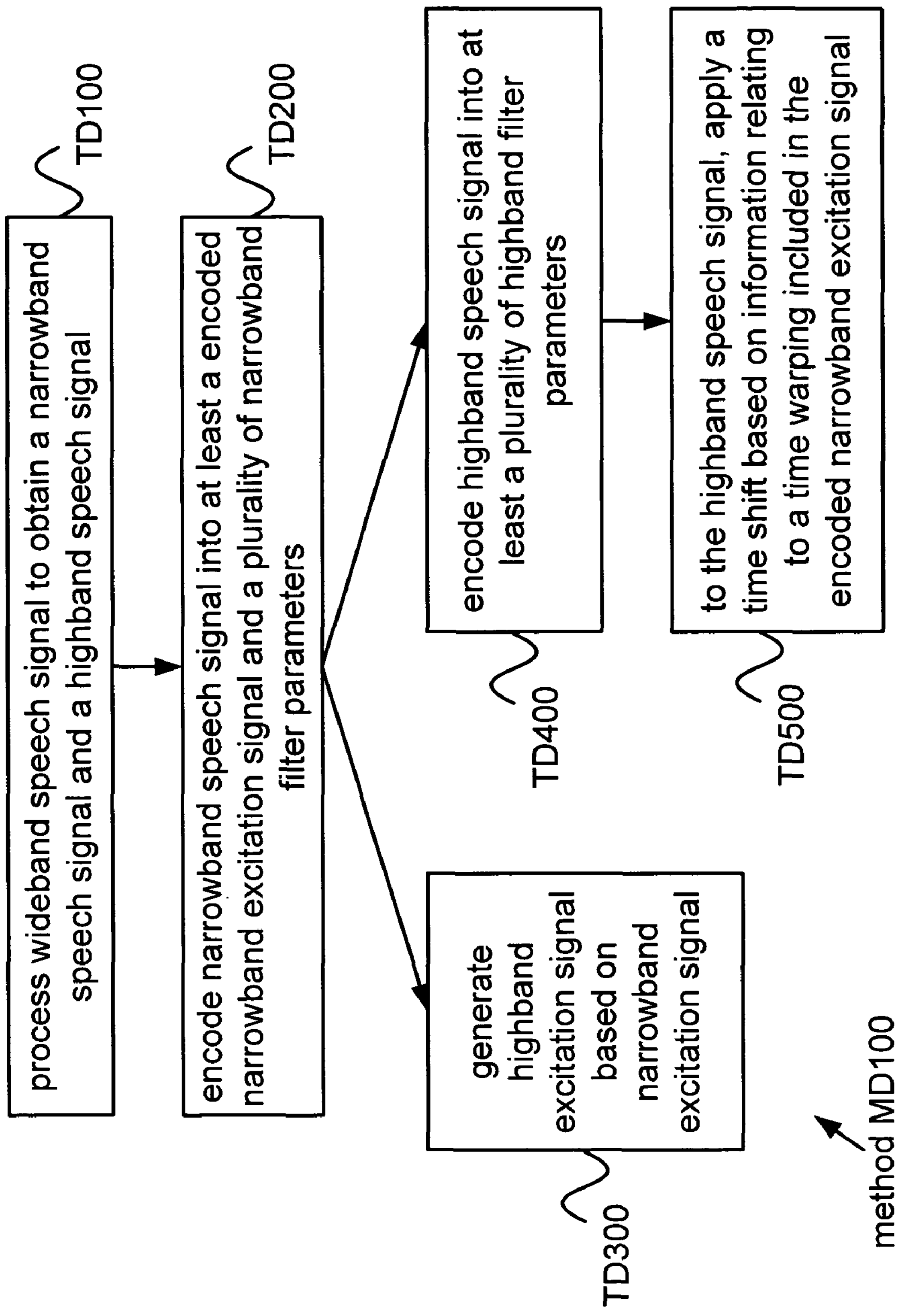
FIG. 29 shows a flowchart of a method of signal processing MD100 according to an embodiment.

FIG. 29 shows a flowchart for a method MD100 of time warping a highband speech signal according to a time warping included in a corresponding encoded narrowband excitation signal. Task TD100 processes a wideband speech signal to obtain a narrowband speech signal and a highband speech signal. For example, task TD100 may be configured to filter the wideband speech signal using a filter bank having lowpass and highpass filters, such as an implementation of filter bank A110. Task TD200 encodes the narrowband speech signal into at least a encoded narrowband excitation signal and a plurality of narrowband filter parameters. The encoded narrowband excitation signal and/or filter parameters may be quantized, and the encoded narrowband speech signal may also include other parameters such as a speech mode parameter. Task TD200 also includes a time warping in the encoded narrowband excitation signal.

Task TD300 generates a highband excitation signal based on a narrowband excitation signal. In this case, the narrowband excitation signal is based on the encoded narrowband excitation signal. Task TD400 encodes the highband speech signal into at least a plurality of highband filter parameters. For example, task TD400 may be configured to encode the highband speech signal into a plurality of quantized LSFs. Task TD500 applies a time shift to the highband speech signal that is based on information relating to a time warping included in the encoded narrowband excitation signal.

Task TD400 may be configured to perform a spectral analysis (such as an LPC analysis) on the highband speech signal, and/or to calculate a gain envelope of the highband speech signal. In such cases, task TD500 may be configured to apply the time shift to the highband speech signal prior to the analysis and/or the gain envelope calculation.

Other implementations of wideband speech encoder A100 are configured to reverse a time warping of highband excitation signal S120 caused by a time warping included in the encoded narrowband excitation signal. For example, highband excitation generator A300 may be implemented to include an implementation of delay line D120 that is configured to receive regularization data signal SD10 or mapped delay values SD10*a*, and to apply a corresponding reverse time shift to narrowband excitation signal S80, and/or to a subsequent signal based on it such as harmonically extended signal S160 or highband excitation signal S120.

Further wideband speech encoder implementations may be configured to encode narrowband speech signal S20 and highband speech signal S30 independently from one another, such that highband speech signal S30 is encoded as a representation of a highband spectral envelope and a highband excitation signal. Such an implementation may be configured to perform time warping of the highband residual signal, or to otherwise include a time warping in an encoded highband excitation signal, according to information relating to a time warping included in the encoded narrowband excitation signal. For example, the highband encoder may include an implementation of delay line D120 and/or delay value mapper D110 as described herein that are configured to apply a time warping to the highband residual signal. Potential advantages of such an operation include more efficient encoding of the highband residual signal and a better match between the synthesized narrowband and highband speech signals.

As mentioned above, embodiments as described herein include implementations that may be used to perform embedded coding, supporting compatibility with narrowband systems and avoiding a need for transcoding. Support for highband coding may also serve to differentiate on a cost basis between chips, chipsets, devices, and/or networks having wideband support with backward compatibility, and those having narrowband support only. Support for highband coding as described herein may also be used in conjunction with a technique for supporting lowband coding, and a system, method, or apparatus according to such an embodiment may support coding of frequency components from, for example, about 50 or 100 Hz up to about 7 or 8 kHz.

As mentioned above, adding highband support to a speech coder may improve intelligibility, especially regarding differentiation of fricatives. Although such differentiation may usually be derived by a human listener from the particular context, highband support may serve as an enabling feature in speech recognition and other machine interpretation applications, such as systems for automated voice menu navigation and/or automatic call processing.

An apparatus according to an embodiment may be embedded into a portable device for wireless communications such as a cellular telephone or personal digital assistant (PDA). Alternatively, such an apparatus may be included in another communications device such as a VoIP handset, a personal computer configured to support VoIP communications, or a network device configured to route telephonic or VoIP communications. For example, an apparatus according to an embodiment may be implemented in a chip or chipset for a communications device. Depending upon the particular application, such a device may also include such features as analog-to-digital and/or digital-to-analog conversion of a speech signal, circuitry for performing amplification and/or other signal processing operations on a speech signal, and/or radio-frequency circuitry for transmission and/or reception of the coded speech signal.

It is explicitly contemplated and disclosed that embodiments may include and/or be used with any one or more of the other features disclosed in the U.S. Provisional Pat. Appls. Nos. 60/667,901 and 60/673,965 (now U.S. Pub. Nos. 2006/0271356, 2006/0277038, 2006/0277039, 2006/0277042, 2006/0282262, 2007/0088541, 2007/0088542, 2007/0088558, and 2008/0126086) of which this application claims benefit. Such features include removal of high-energy bursts of short duration that occur in the highband and are substantially absent from the narrowband. Such features include fixed or adaptive smoothing of coefficient representations such as highband LSFs. Such features include fixed or adaptive shaping of noise associated with quantization of coefficient representations such as LSFs. Such features also include fixed or adaptive smoothing of a gain envelope, and adaptive attenuation of a gain envelope.

The foregoing presentation of the described embodiments is provided to enable any person skilled in the art to make or use the present invention. Various modifications to these embodiments are possible, and the generic principles presented herein may be applied to other embodiments as well. For example, an embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM (random-access memory), ROM (read-only memory), and/or flash RAM), or ferroelectric, magnetoresistive, ovonic, polymeric, or phase-change memory; or a disk medium such as a magnetic or optical disk. The term "software" should be understood to include source code, assembly language code, machine code, binary code, firmware, macrocode, microcode, any one or more sets or sequences of instructions executable by an array of logic elements, and any combination of such examples.

The various elements of implementations of highband excitation generators A300 and B300, highband encoder A200, highband decoder B200, wideband speech encoder A100, and wideband speech decoder B100 may be implemented as electronic and/or optical devices residing, for example, on the same chip or among two or more chips in a chipset, although other arrangements without such limitation are also contemplated. One or more elements of such an apparatus may be implemented in whole or in part as one or more sets of instructions arranged to execute on one or more fixed or programmable arrays of logic elements (e.g., transistors, gates) such as microprocessors, embedded processors, IP cores, digital signal processors, FPGAs (field-programmable gate arrays), ASSPs (application-specific standard products), and ASICs (application-specific integrated circuits). It is also possible for one or more such elements to have structure in common (e.g., a processor used to execute portions of code corresponding to different elements at different times, a set of instructions executed to perform tasks corresponding to different elements at different times, or an arrangement of electronic and/or optical devices performing operations for different elements at different times). Moreover, it is possible for one or more such elements to be used to perform tasks or execute other sets of instructions that are not directly related to an operation of the apparatus, such as a task relating to another operation of a device or system in which the apparatus is embedded.

Figure 30:
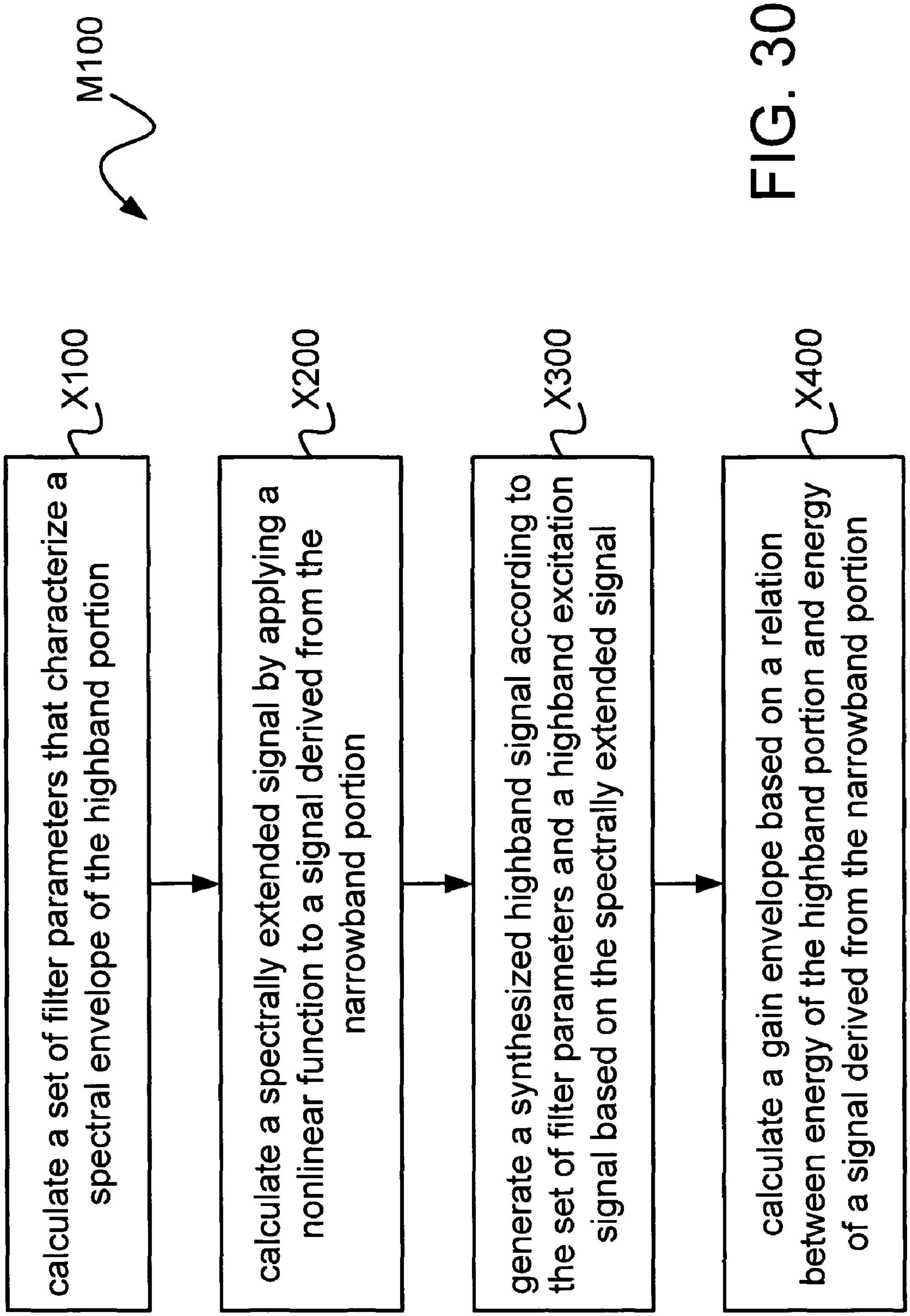
FIG. 30 shows a flowchart for a method M100 according to an embodiment.

FIG. 30 shows a flowchart of a method M100, according to an embodiment, of encoding a highband portion of a speech signal having a narrowband portion and the highband portion. Task X100 calculates a set of filter parameters that characterize a spectral envelope of the highband portion. Task X200 calculates a spectrally extended signal by applying a nonlinear function to a signal derived from the narrowband portion. Task X300 generates a synthesized highband signal according to (A) the set of filter parameters and (B) a highband excitation signal based on the spectrally extended signal. Task X400 calculates a gain envelope based on a relation between (C) energy of the highband portion and (D) energy of a signal derived from the narrowband portion.

Figure 31A:
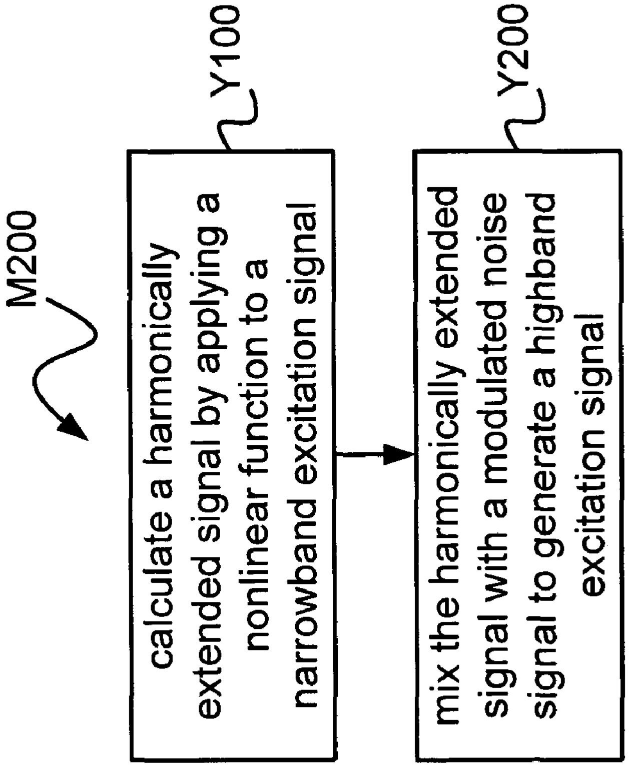
FIG. 31*a* shows a flowchart for a method M200 according to an embodiment.
Figure 31B:
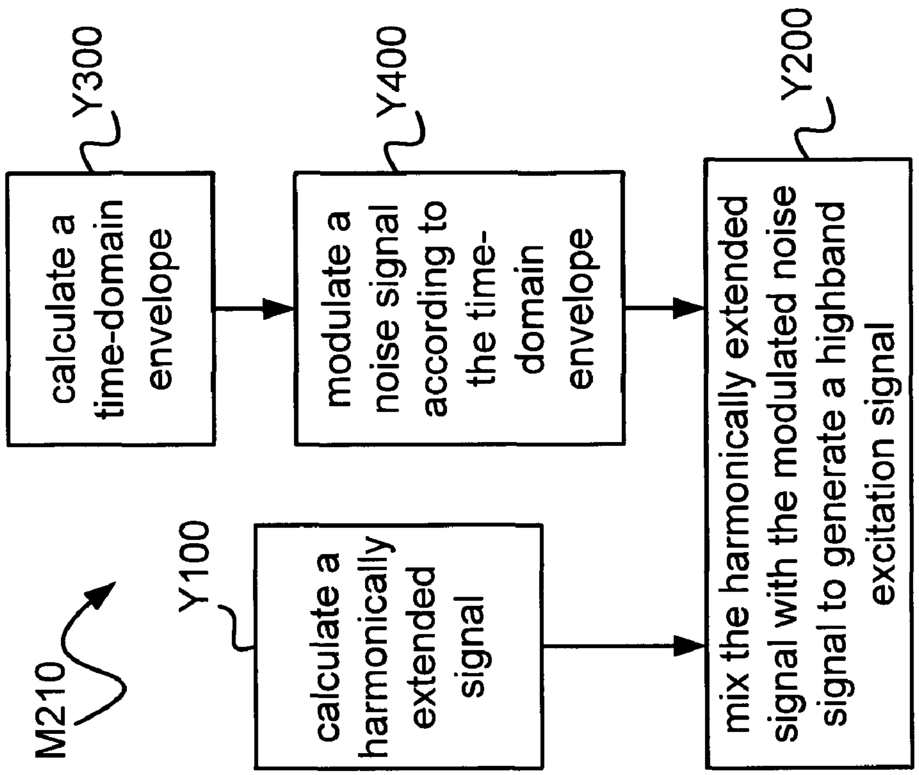
FIG. 31*b* shows a flowchart for an implementation M210 of method M200.

FIG. 31*a* shows a flowchart of a method M200 of generating a highband excitation signal according to an embodiment. Task Y100 calculates a harmonically extended signal by applying a nonlinear function to a narrowband excitation signal derived from a narrowband portion of a speech signal. Task Y200 mixes the harmonically extended signal with a modulated noise signal to generate a highband excitation signal. FIG. 31*b* shows a flowchart of a method M210 of generating a highband excitation signal according to another embodiment including tasks Y300 and Y400. Task Y300 calculates a time-domain envelope according to energy over time of one among the narrowband excitation signal and the harmonically extended signal. Task Y400 modulates a noise signal according to the time-domain envelope to produce the modulated noise signal.

Figure 32:
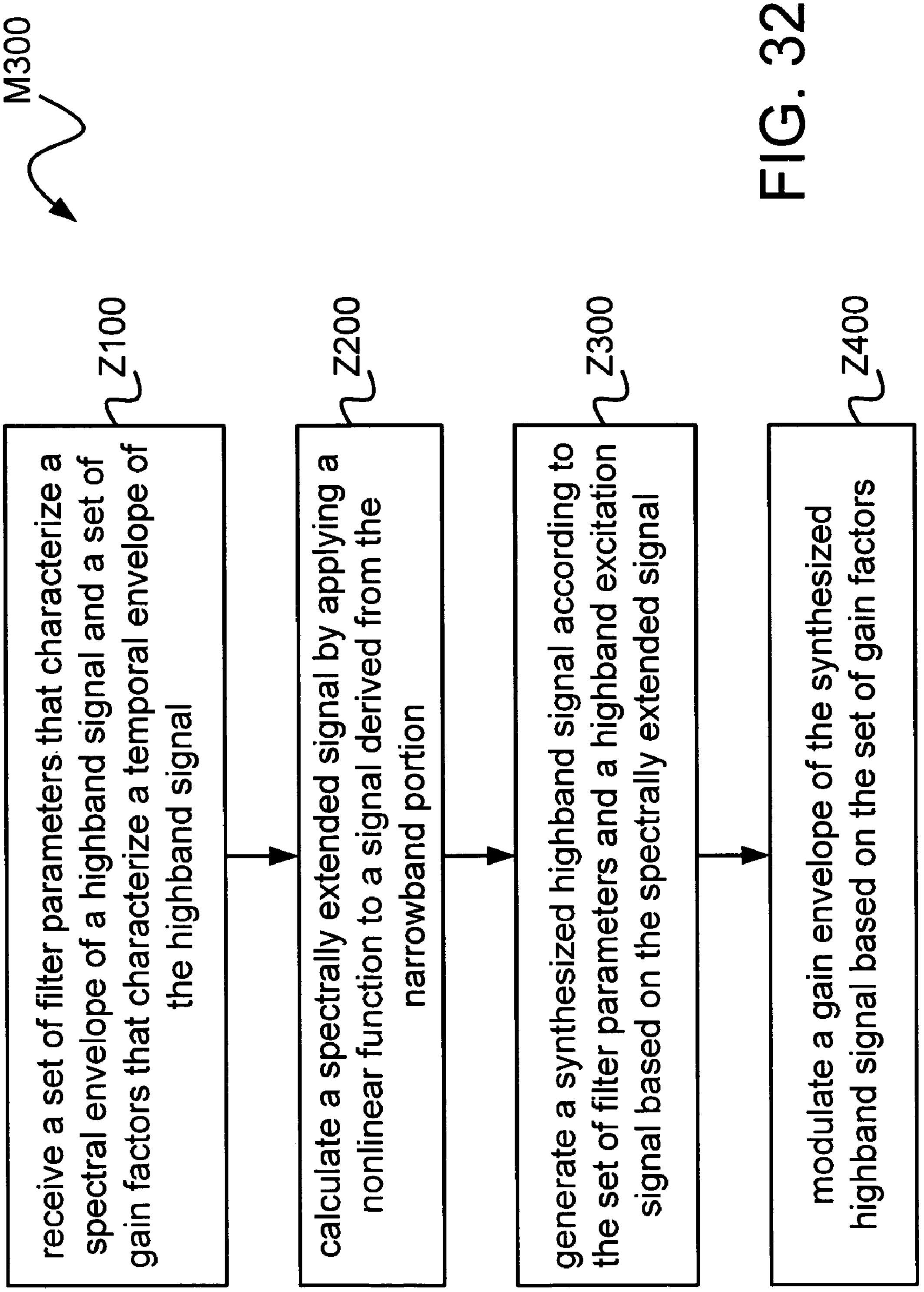
FIG. 32 shows a flowchart for a method M300 according to an embodiment.

FIG. 32 shows a flowchart of a method M300 according to an embodiment, of decoding a highband portion of a speech signal having a narrowband portion and the highband portion. Task Z100 receives a set of filter parameters that characterize a spectral envelope of the highband portion and a set of gain factors that characterize a temporal envelope of the highband portion. Task Z200 calculates a spectrally extended signal by applying a nonlinear function to a signal derived from the narrowband portion. Task Z300 generates a synthesized highband signal according to (A) the set of filter parameters and (B) a highband excitation signal based on the spectrally extended signal. Task Z400 modulates a gain envelope of the synthesized highband signal based on the set of gain factors. For example, task Z400 may be configured to modulate the gain envelope of the synthesized highband signal by applying the set of gain factors to an excitation signal derived from the narrowband portion, to the spectrally extended signal, to the highband excitation signal, or to the synthesized highband signal.

Embodiments also include additional methods of speech coding, encoding, and decoding as are expressly disclosed herein, e.g., by descriptions of structural embodiments configured to perform such methods. Each of these methods may also be tangibly embodied (for example, in one or more data storage media as listed above) as one or more sets of instructions readable and/or executable by a machine including an array of logic elements (e.g., a processor, microprocessor, microcontroller, or other finite state machine). Thus, the present invention is not intended to be limited to the embodiments shown above but rather is to be accorded the widest scope consistent with the principles and novel features disclosed in any fashion herein, including in the attached claims as filed, which form a part of the original disclosure.

What is claimed is:

1. A method of signal processing, said method comprising performing each of the following acts within a device that is configured to process speech signals:

encoding a low-frequency portion of a speech signal into at least an encoded narrowband excitation signal and a plurality of narrowband filter parameters; and generating a highband excitation signal based on the encoded narrowband excitation signal, wherein the encoded narrowband excitation signal describes a signal that is warped in time, with respect to the speech signal, according to a time-varying time warping, and wherein said method comprises, based on information relating to the time warping, applying a plurality of different time shifts to a corresponding plurality of successive portions in time of a high-frequency portion of the speech signal, and wherein said applying a plurality of different time shifts comprises calculating at least one of the plurality of different time shifts to account for differences between sampling rates of the low-frequency portion and the high-frequency portion.

2. The method of signal processing according to claim 1, wherein the encoded narrowband excitation signal describes a signal that is warped in time according to a model of a pitch structure of the low-frequency portion.

3. The method of signal processing according to claim 1, wherein said encoding a low-frequency portion includes applying a time shift to a narrowband residual according to a model of a pitch structure of the narrowband residual, and wherein the encoded narrowband excitation signal is based on the time-shifted narrowband residual.

4. The method of signal processing according to claim 1, wherein said time-varying time warping includes different respective time shifts for each of at least two consecutive subframes of said narrowband excitation signal that is warped in time, and wherein said applying a plurality of different time shifts to a corresponding plurality of successive portions in time of the high-frequency portion includes applying, to a frame of the high-frequency portion, a time shift based on an average of said different respective time shifts.

5. The method of signal processing according to claim 3, wherein said applying a plurality of different time shifts comprises receiving a value indicating a time shift applied to the narrowband residual, and rounding the received value to an integer value.

6. The method of signal processing according to claim 1, wherein said applying a plurality of different time shifts is based on information relating to a pitch structure of the low-frequency portion.

7. The method of signal processing according to claim 1, wherein said method comprises encoding the time-shifted high-frequency portion into at least a plurality of linear prediction filter coefficients.

8. The method of signal processing according to claim 1, wherein said method comprises, based on information from the time-shifted high-frequency portion, calculating a gain envelope of the high-frequency portion.

9. The method according to claim 8, wherein said calculating a gain envelope of the high-frequency portion, based on information from the time-shifted high-frequency portion, comprises calculating a plurality of highband gain factors according to a time-varying relation between the time-shifted high-frequency portion and a signal that is based on the encoded narrowband excitation signal.

10. The method of signal processing according to claim 1, wherein said method comprises producing a set of parameter values that characterize a spectral envelope of the high-frequency portion prior to said applying a plurality of different time shifts.

11. A non-transitory computer readable storage medium having machine-executable instructions describing the method of signal processing according to claim 1.

12. An apparatus comprising:

a processor connected to at least one memory;

a narrowband speech encoder configured to encode a low-frequency portion of a speech signal into at least an encoded narrowband excitation signal and a plurality of narrowband filter parameters; and a highband speech encoder configured to generate a highband excitation signal based on the encoded narrowband excitation signal, wherein said narrowband speech encoder is configured to output a regularization data signal describing a time-varying time warping, with respect to the speech signal, that is included in the encoded narrowband excitation signal, and wherein said apparatus comprises a delay line configured to apply a plurality of different time shifts to a corresponding plurality of successive portions in time of a high-frequency portion of the speech signal, wherein the different time shifts are based on information from the regularization data signal, and wherein said apparatus comprises a delay value mapper configured to calculate at least one of the plurality of different time shifts to account for differences between sampling rates of the low-frequency portion and the high-frequency portion.

13. The apparatus according to claim 12, wherein the encoded narrowband excitation signal describes a signal that is warped in time according to a model of a pitch structure of the low-frequency portion.

14. The apparatus according to claim 12, wherein said narrowband speech encoder is configured to apply a time shift to a narrowband residual according to a model of a pitch structure of the narrowband residual and to produce the encoded narrowband excitation signal based on the time-shifted narrowband residual.

15. The apparatus according to claim 14, wherein said narrowband speech encoder is configured to apply a different respective time shift to each of at least two consecutive subframes of the narrowband residual, and wherein said delay line is configured to apply, to a frame of the high-frequency portion, a time shift based on an average of the respective time shifts.

16. The apparatus according to claim 14, wherein said delay value mapper is configured to receive a value of a time shift of the narrowband residual and to round the received value to an integer value.

17. The apparatus according to claim 12, wherein said information from the regularization data signal is based on information relating to a pitch structure of the low-frequency portion.

18. The apparatus according to claim 12, wherein said highband speech encoder is configured to encode the time-shifted high-frequency portion into at least a plurality of linear prediction filter coefficients.

19. The apparatus according to claim 12, wherein said highband speech encoder is arranged to calculate, based on information from the time-shifted high-frequency portion, a gain envelope of the high-frequency portion.

20. The apparatus according to claim 12, wherein said highband speech encoder is configured to produce a set of parameter values that characterize a spectral envelope of the high-frequency portion upstream of said delay line.

21. The apparatus according to claim 12, said apparatus comprising a cellular telephone.

22. An apparatus comprising:

means for encoding a low-frequency portion of a speech signal into at least an encoded narrowband excitation signal and a plurality of narrowband filter parameters; and means for generating a highband excitation signal based on the encoded narrowband excitation signal, wherein the encoded narrowband excitation signal describes a signal that is warped in time, with respect to the speech signal, according to a time-varying time warping, and wherein said apparatus comprises means for applying, based on information relating to the time warping, a plurality of different time shifts to a corresponding plurality of successive portions in time of a high-frequency portion of the speech signal, and wherein said means for applying a plurality of different time shifts is configured to calculate at least one of the plurality of different time shifts to account for differences between-between sampling rates of the low-frequency portion and the high-frequency portion.

23. The apparatus according to claim 22, said apparatus comprising a cellular telephone.

24. The apparatus according to claim 22, wherein said means for encoding a low-frequency portion is configured to apply a time shift to a narrowband residual according to a model of the pitch structure of the narrowband residual, and wherein the encoded narrowband excitation signal is based on the time-shifted narrowband residual.

25. The apparatus according to claim 22, wherein said time-varying time warping includes different respective time shifts for each of at least two consecutive subframes of said signal that is warped in time, and wherein said means for applying a plurality of different time shifts to a corresponding plurality of successive portions in time of the high-frequency portion is configured to apply, to a frame of the high-frequency portion, a time shift based on an average of said different respective time shifts.

26. The apparatus according to claim 22, wherein said apparatus comprises means for producing a set of parameter values that characterize a spectral envelope of the high-frequency portion upstream of said means for applying a plurality of different time shifts.

* * * * *